AUTOMATIC TELEPHONE SYSTEM

Filed July 15, 1953 12 Sheets-Sheet 1

INVENTORS.
WILLIAM H. BLASHFIELD
JACK E. CALLENDER
BY BEN A. HARRIS
Brown, Jackson, Boettcher & Dienner
ATTYS.

AUTOMATIC TELEPHONE SYSTEM

Filed July 15, 1953 12 Sheets-Sheet 2

INVENTORS.
WILLIAM H. BLASHFIELD
JACK E. CALLENDER
BEN A. HARRIS
BY Brown, Jackson, Boettcher & Dienner
ATTYS.

Sept. 22, 1959 W. H. BLASHFIELD ET AL 2,905,764

AUTOMATIC TELEPHONE SYSTEM

Filed July 15, 1953 12 Sheets-Sheet 3

*INVENTORS.*
WILLIAM H. BLASHFIELD
JACK E. CALLENDER
*BY* BEN A. HARRIS
Brown, Jackson, Boettcher & Dienner
ATTYS.

INVENTORS.
WILLIAM H. BLASHFIELD
JACK E. CALLENDER
BEN A. HARRIS
BY Brown, Jackson, Boettcher & Dienner
ATTYS INVENTORS.
WILLIAM H. BLASHFIELD
JACK E. CALLENDER
BY BEN A. HARRIS
Brown, Jackson, Boettcher & Dienner
ATTYS.

INVENTORS.
WILLIAM H. BLASHFIELD
JACK E. CALLENDER
BY BEN A. HARRIS
Brown, Jackson
Boettcher & Dienner
ATTYS.

Sept. 22, 1959 W. H. BLASHFIELD ET AL 2,905,764

AUTOMATIC TELEPHONE SYSTEM

Filed July 15, 1953 12 Sheets-Sheet 7

INVENTORS.
WILLIAM H. BLASHFIELD
JACK E. CALLENDER
BY BEN A. HARRIS

Brown, Jackson, Boettcher & Dienner
ATTYS.

Sept. 22, 1959 W. H. BLASHFIELD ET AL 2,905,764

AUTOMATIC TELEPHONE SYSTEM

Filed July 15, 1953 12 Sheets-Sheet 8

INVENTORS.
WILLIAM H. BLASHFIELD
JACK E. CALLENDER
BY BEN A. HARRIS
Brown, Jackson, Boettcher & Dienner
ATTYS.

AUTOMATIC TELEPHONE SYSTEM

Filed July 15, 1953 12 Sheets-Sheet 9

INVENTORS.
WILLIAM H. BLASHFIELD
JACK E. CALLENDER
BY BEN A. HARRIS
Brown, Jackson, Boettcher & Dienner
ATTYS.

Sept. 22, 1959 W. H. BLASHFIELD ET AL 2,905,764

AUTOMATIC TELEPHONE SYSTEM

Filed July 15, 1953 12 Sheets-Sheet 10

INVENTORS.
WILLIAM H. BLASHFIELD
JACK E. CALLENDER
BY BEN A. HARRIS
Brown, Jackson,
Boettcher & Dienner
ATTYS.

INVENTORS.
WILLIAM H. BLASHFIELD
JACK E. CALLENDER
BY BEN A. HARRIS
Brown, Jackson, Boettcher & Dienner
ATTY.

AUTOMATIC TELEPHONE SYSTEM

Filed July 15, 1953 12 Sheets-Sheet 12

INVENTORS.
WILLIAM H. BLASHFIELD
JACK E. CALLENDER
BEN A. HARRIS
BY Brown, Jackson, Boettcher & Dienner
ATTYS.

United States Patent Office 2,905,764

Patented Sept. 22, 1959

2,905,764

AUTOMATIC TELEPHONE SYSTEM

William H. Blashfield and Jack E. Callender, Galion, Ohio, and Ben A. Harris, Rochester, N.Y., assignors to North Electric Company, a corporation of Ohio Application July 15, 1953, Serial No. 368,066

21 Claims. (Cl. 179—8)

TABLE OF CONTENTS

Figure 7:
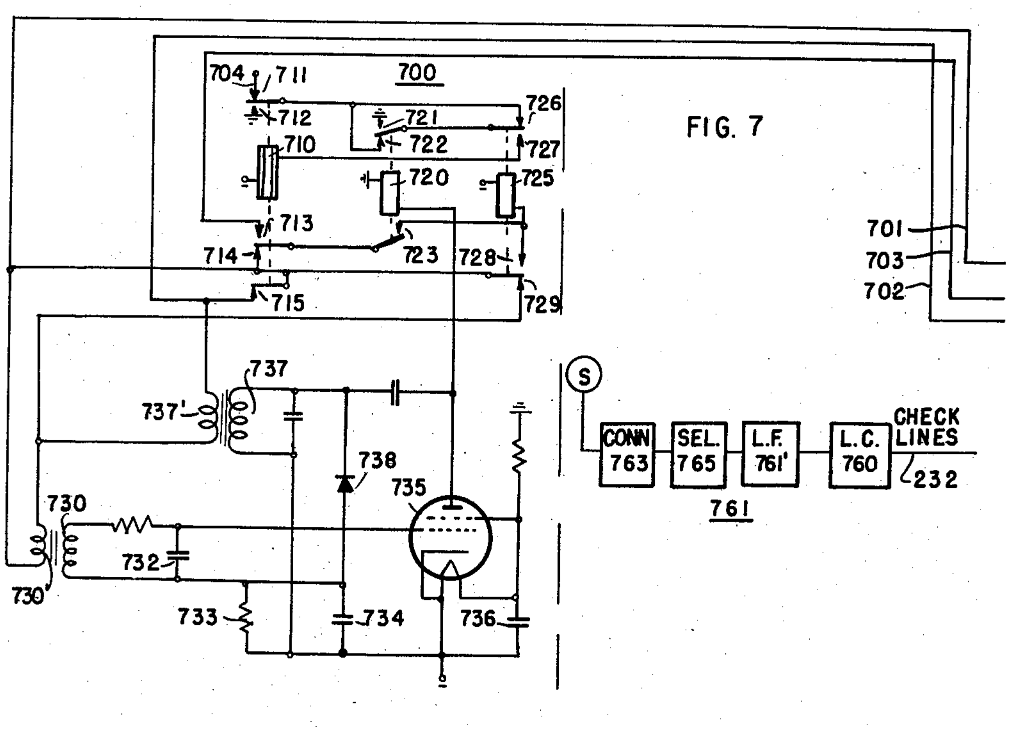

Introduction ---------- 2
General description ---------- 4
Establishment of calls between the various exchanges of the arrangement ---------- 8
General description of recorder-sender units ---------- 15
  Recorder relays ---------- 16
  Recorder to sender conductors ---------- 17
  Sender relays ---------- 17
Interexchange call initiated at recorder exchange (exchange A to exchange F)
  A. Seizing an idle link ---------- 18
  B. Seizure of recorder equipment by dialing first digit of called office code ---------- 18
  C. Recorder operation with seizure ---------- 19
  D. Timing out ---------- 20
  E. Seizure of sender by recorder ---------- 21
  F. Calling party dials second digit of called office code to register desired exchange ---------- 22
  G. Operation during interval between receipt of second digit of exchange code and first digit of calling party number ---------- 24
  H. Subscriber dials his own directory number—Transmission of first routing digit (digit 8) by sender apparatus ---------- 27
  I. Generation of pause period (as required) ---------- 31
  J. Transmission of the second routing digit (digit 0) by sender apparatus ---------- 33
  K. Receipt of first digit of calling party number ---------- 34
  L. Receipt of second digit of calling party number by recorder ---------- 36
  M. Receipt of third digit of calling party number ---------- 37
  N. Check tone circuit ---------- 39
  O. Receipt of fourth digit of calling party number ---------- 42
  P. Pause after dialing of calling party number ---------- 43
  Q. Sender release ---------- 43
  R. Subscriber dials called party number ---------- 46
  S. Answer by called party ---------- 48
  T. Release of connection ---------- 51
    T1. Called party releases first ---------- 51
    T2. Calling party releases first ---------- 53
Interexchange call initiated at non-recorder exchange (exchange B or C to exchange F) ---------- 53
  A. Trunk equipment ---------- 56
  B. Specific operation of trunk equipment ---------- 57
    B1. Receipt of second digit of called exchange code ---------- 58
    B2. Receipt of calling party line number ---------- 59
    B3. Receipt of calling party ring digit ---------- 61
    B4. Calling party dials called number ---------- 61
    B5. Answer by called party ---------- 61
    B6. Called party releases first ---------- 61
    B7. Calling party releases first ---------- 62
Trunk operation at non-recorder exchange responsive to incoming calls
  A. Calling party dials called exchange code ---------- 63
  B. Calling party dials the called number ---------- 63
  C. Answer ---------- 64
  D. Called party releases first ---------- 64
  E. Calling party releases first ---------- 64
Tone checking when private branch exchange lines are involved ---------- 64
Guarding against paystations making toll ticketing call ---------- 65

INTRODUCTION

The present invention relates in general to automatic telephone systems and in particular to automatic telephone systems having automatic toll ticketing equipment. There has been, in recent years, a definite trend toward the use of more and more automatic switching equipment, and there has developed with this growing trend, new and novel types of automatic toll ticketing equipment which accomplishes the automatic extension of a connection to other exchanges, and also automatically provides a ticket which includes thereon complete data concerning each such call established thereover.

Although such type system offers many obvious and practical advantages, the incorporation of many of the known types of automatic toll ticketing apparatus in existing automatic and manual exchanges has been extremely impractical by reason of the high cost of the conversion equipment. This is specifically true in short haul, low density type systems.

An arrangement which has proven successful in the field has been taught in the copending application to Blashfield et al., which was filed July 23, 1951, and received Serial No. 238,092 and was assigned to the assignee of this invention. In that arrangement toll ticketing equipment is provided at a cost level which permits and encourages the use of automatic toll ticketing in even the smaller size exchanges.

Minimization of initial cost and upkeep in such arrangement is at least partially attributable to the provision of equipment which records the calling party directory number as dialed by the calling party, and checks the calling line number dialed, prior to further extension of the connection. In this manner a large amount of automatic party and line identification equipment is eliminated, and the overall cost of the apparatus is substantially reduced.

The recorder circuits utilized in such arrangement record both the calling and called numbers received without requiring prior registration on expensive and complicated translating and storage equipment. As a result of such arrangement the data recording equipment may comprise a simple punch magnet and step magnet arrangement which perforates and advances the paper tape member in accordance with the information received. Provision of this more economical type equipment is especially adapted to use in the conversion of manual exchanges to completely automatic installations on a practical basis as well as to use in providing automatic toll ticketing in existing or new automatic exchanges.

It is the purpose of the present invention to provide an interexchange system in which each exchange utilizes the equipment of the basic arrangement set forth above, and particularly, to provide novel switching apparatus and arrangements wherein connections may be expeditiously effected between exchanges of this type with a minimum amount of equipment.

As will become apparent hereinafter, each of the exchanges connected in the network are assigned a predetermined directory code number, the code numbers for the several exchanges in the present example comprising two digits, such as 83, 84, 85, etc. A calling subscriber may extend a connection to a subscriber in any one of the exchanges in the network by merely dialing in sequence, the code number of the exchange of the desired subscriber, his own directory number, and thereafter the number of the desired subscriber.

According to the invention the recorder apparatus registers the code number of the desired exchange in the sender equipment as received, and during the period that the calling subscriber is dialing his own directory number, the sender equipment sends routing digits, if necessary, to extend the connection to the desired exchange. As the calling subscriber later dials the directory number of the called party, it is extended directly over the established connection to the switching apparatus thereat to control same in the extension of the connection to the desired party.

The advantages and features of such an arrangement from the standpoint of improved subscriber service are immediately obvious. It is an especial object of the invention to provide an improved type of recorder-sender unit for use in the exchanges which is operative to route the connection to the desired exchanges in this manner during the specified period of dialing by the calling subscriber.

It is a further object of the present invention to provide a novel recorder-sender apparatus which is operative to serve the exchange at which it is located, and additionally operative to serve associate non-recorder exchanges which have access thereto. Thus the larger exchanges of a network may include recorder equipment for serving both the local substation and the substation of neighboring exchanges.

A further feature of the arrangement is the manner in which the recorder-sender equipment is operative to record the exchange code digit and to translate the exchange code digit into the required number and value of digits necessary to control the switching in the various exchanges to establish the connection to the desired one of the exchanges.

A further feature of the arrangement is the manner in which each sender unit may be rendered common to a number of recorder units, and each sender unit is released following verification of the calling line number and the routing of the connection to the desired exchange, but prior to completion of the connection. In this manner fewer senders than recorders are required to serve an exchange.

A further feature of the novel recorder-sender arrangement is the manner in which counting chain in the sender which are used in the call routing operation are additionally employed to effect the advancement of the tape in the recorder a number of steps subsequent to the recording of various groups of information thereon. Thus additional counting equipment in the recorder unit is eliminated. The value of this arrangement is further amplified by the fact that the sender equipment is common to several recorders and is not tied up for as long a period as the recorder equipment.

A further feature of the arrangement is the manner in which the recorder equipment is operative to transmit a busy signal to the calling subscriber in the event that he has dialed his number inaccurately, and also in the event that he has completed the dialing of his own directory number prior to the establishment of the connection to the desired one of the exchanges by the sender equipment.

Another feature of the invention is the manner in which the sender equipment is operative to initiate transmission of the routing digit or digits responsive to receipt of the first impulse of the calling subscriber directory number, whereby a natural pause between the receipt of the last impulse of the second trunk digit and the initiation of sending of the routing digit is achieved without including special circuitry for inserting the required pause.

A special feature of the arrangement is the manner in which reliable and quick subscriber service is obtained by accomplishing different switching operations simultaneously, as for example, the simultaneous accomplishment of the recording of the calling number; the verification of the accuracy of the calling line number dialed, and the establishment of the connection to the desired exchange.

Another feature of the arrangement is the manner in which a check line is associated with each sender, rather than a check line per recorder. In this manner an economical use of lines is effected and selection of equipment for the check line equipment may be eliminated.

According to the invention a novel tone checking circuit is provided for determining the accuracy of the calling line number as dialed by the calling subscriber, a tone circuit being provided at each of the non-recorder exchanges as well as at the recorder exchanges, whereby the actual checking of the calling line number dialed by the calling party is accomplished by the switching equipment at the exchange initiating the call. As shown hereinafter, the signalling as to the time of initiating such checking operation is accomplished by the recorder equipment assigned to handle the calls of the calling exchange.

Another feature of the invention is the manner in which the sender determines whether no digits, one digit, or two digits are to be transmitted. An interdigit pause is transmitted after the first digit only if a second digit is to be sent, whereby a more rapid operating arrangement is effected.

The trunk equipment utilized in the establishment of the calls between the exchanges is somewhat conventional in nature, certain novel arrangements having been effected for the purpose of accomplishing calling line verification in a more simple, direct and economical manner. According to certain novel improvements set forth in the recorder and trunk equipment, checking is accomplished prior to transmission of the ring digit of the calling party number, and the ring digit is intercepted in toll ticketing equipment, preventing it from entering the check line. Thus, the need in the links of equipment for ticketing call discrimination for the purpose of disabling ringing on a check call is obviated. The specific features and novel characteristics of the tone circuit and trunk equipment are set forth in more detail hereinafter.

Figure 1:
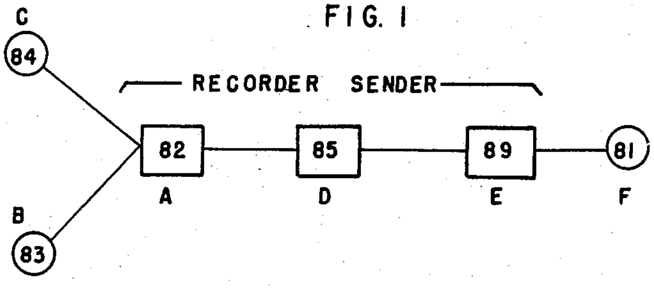
Figure 2:
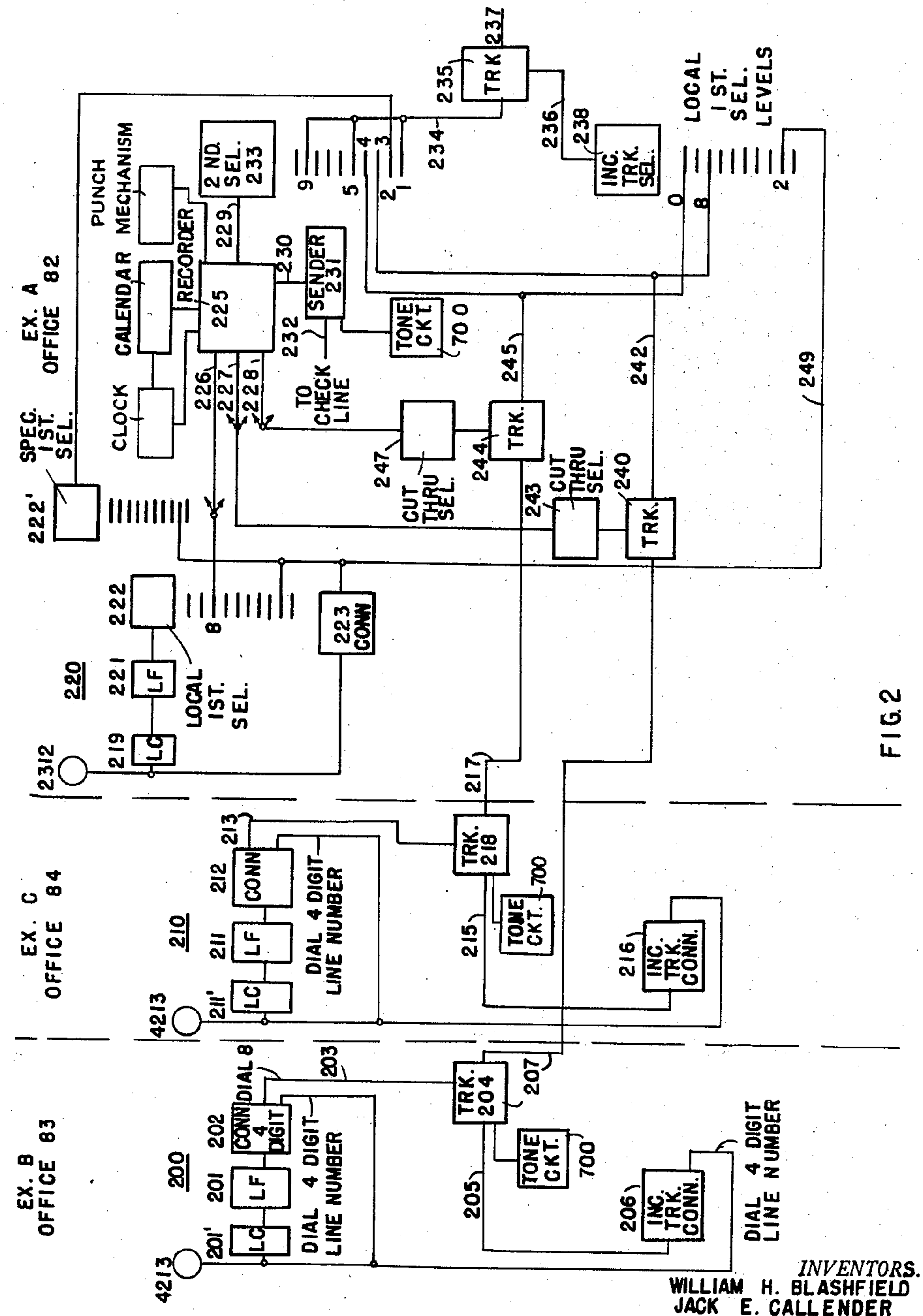
Figure 3:
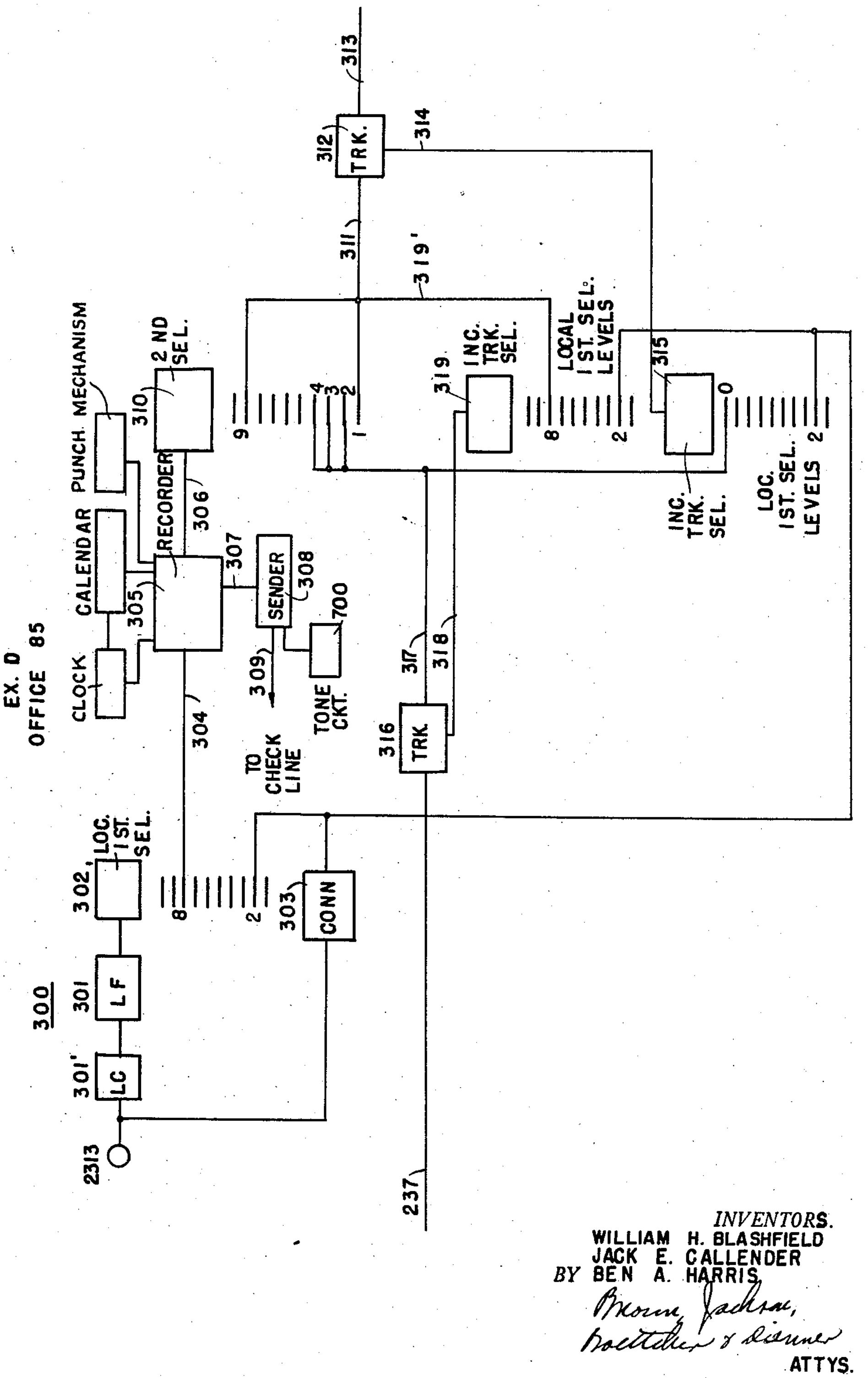
Figure 4:
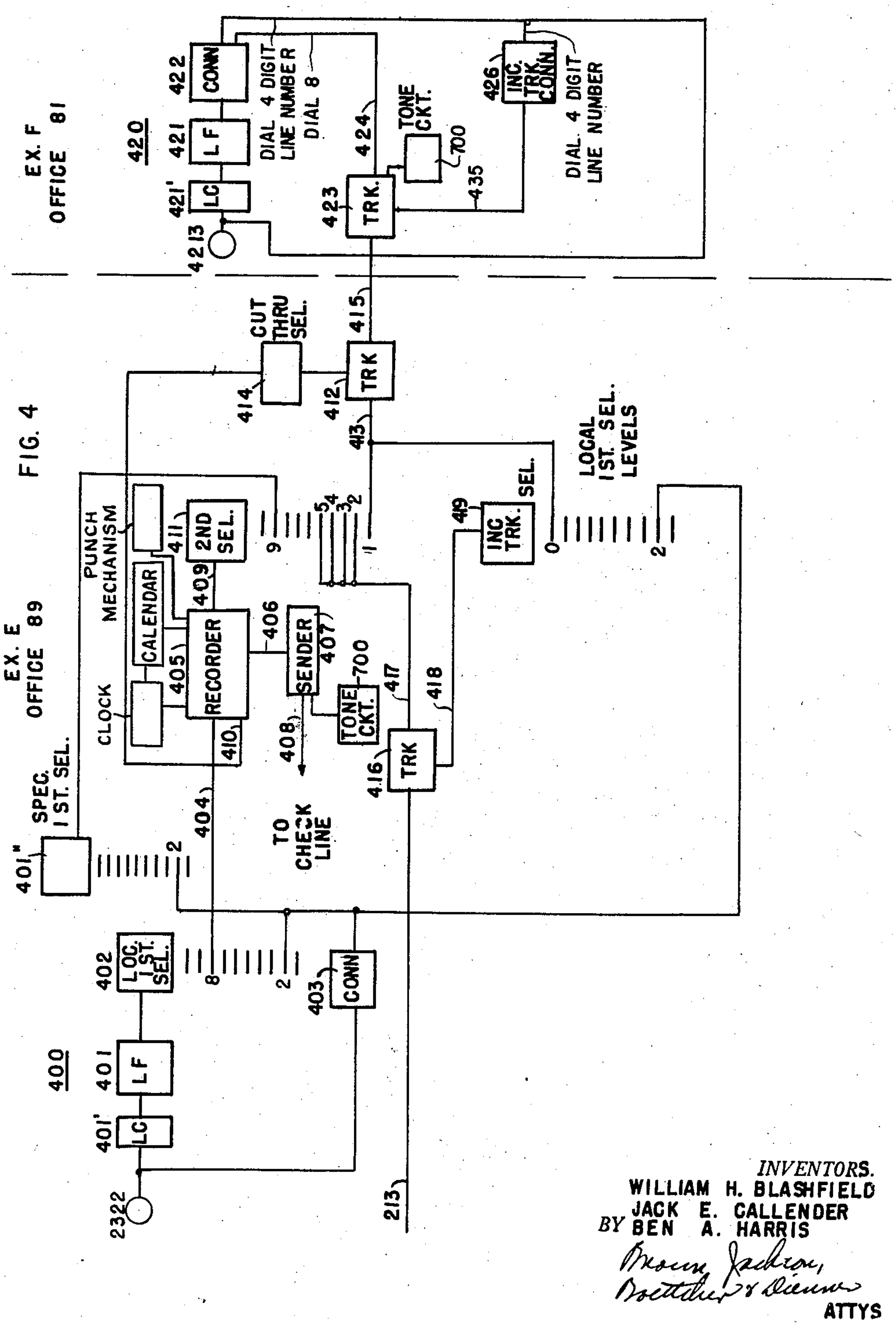
Figure 11:
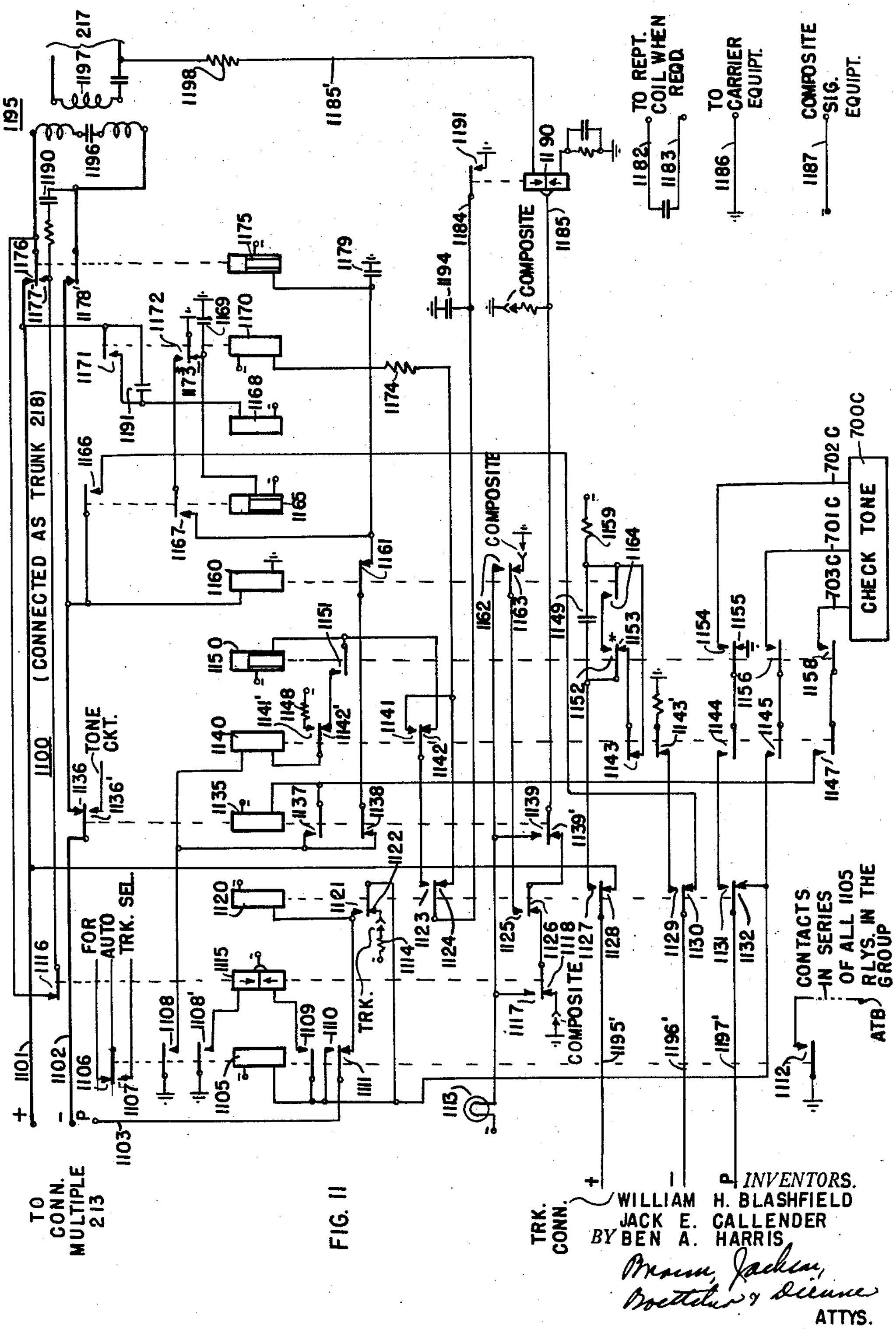
Figure 12:
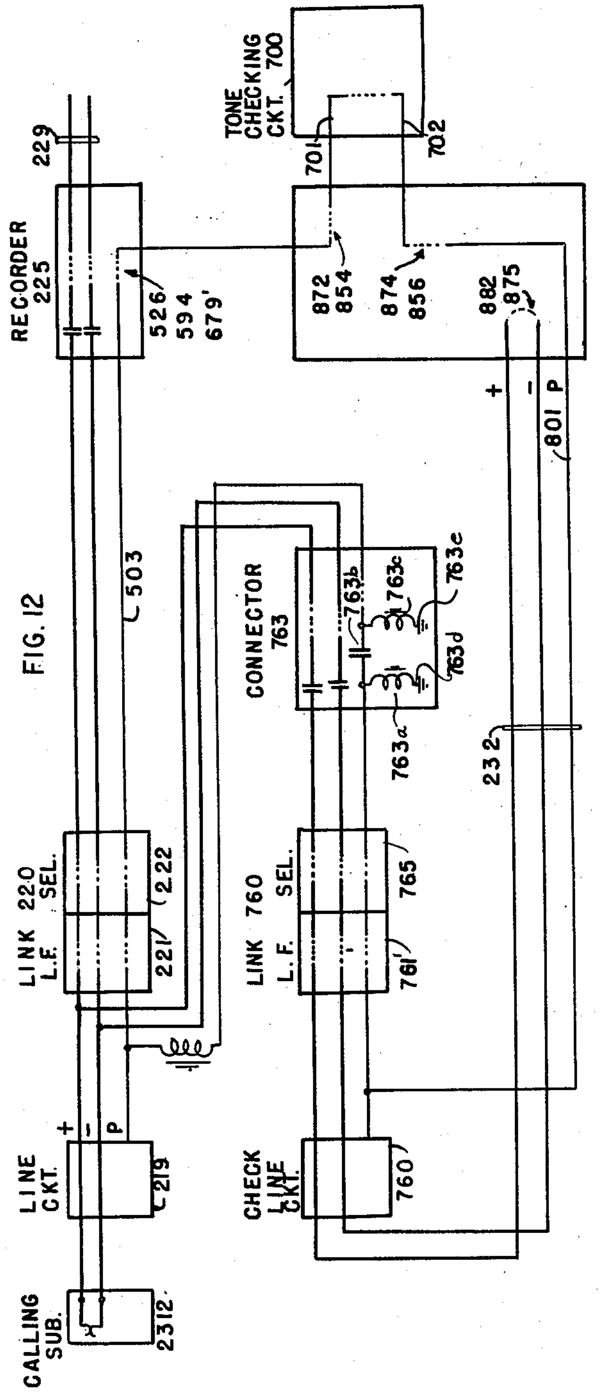
Figure 13:
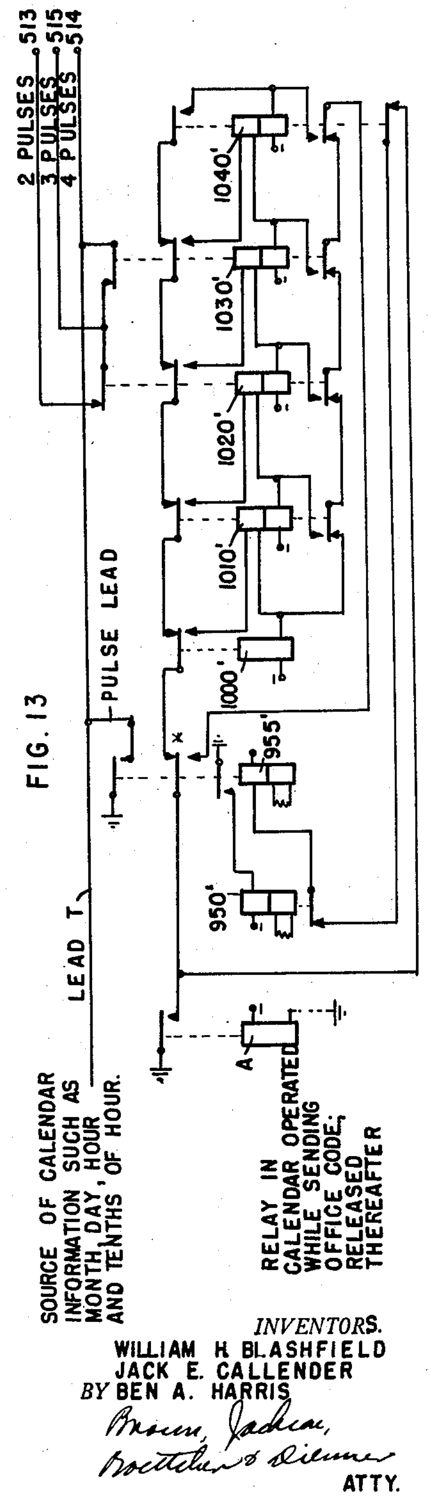
Figure 14:
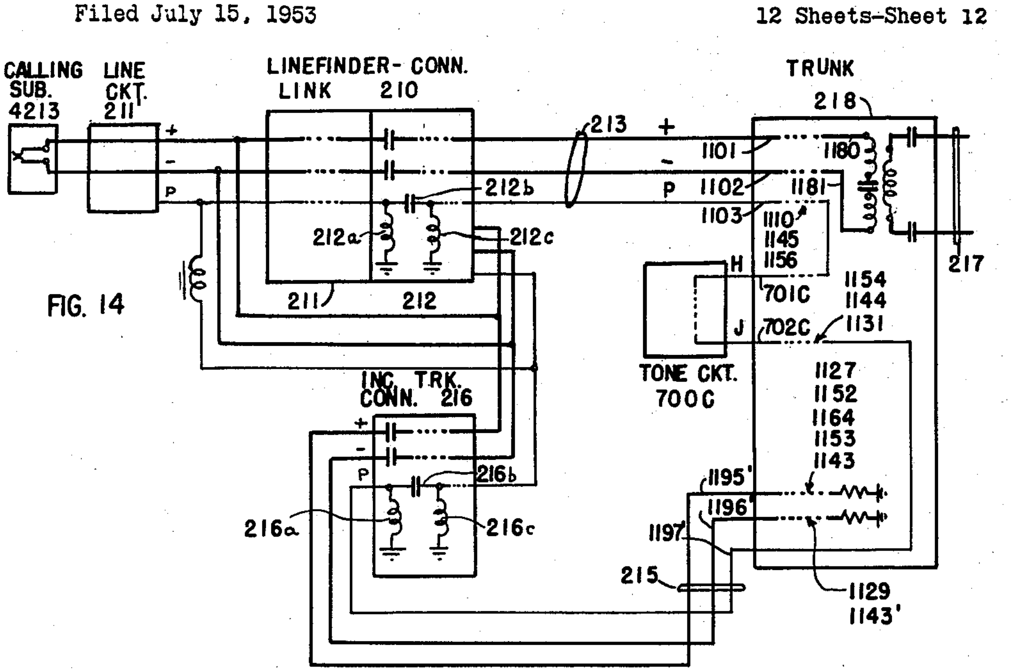
Figure 15:
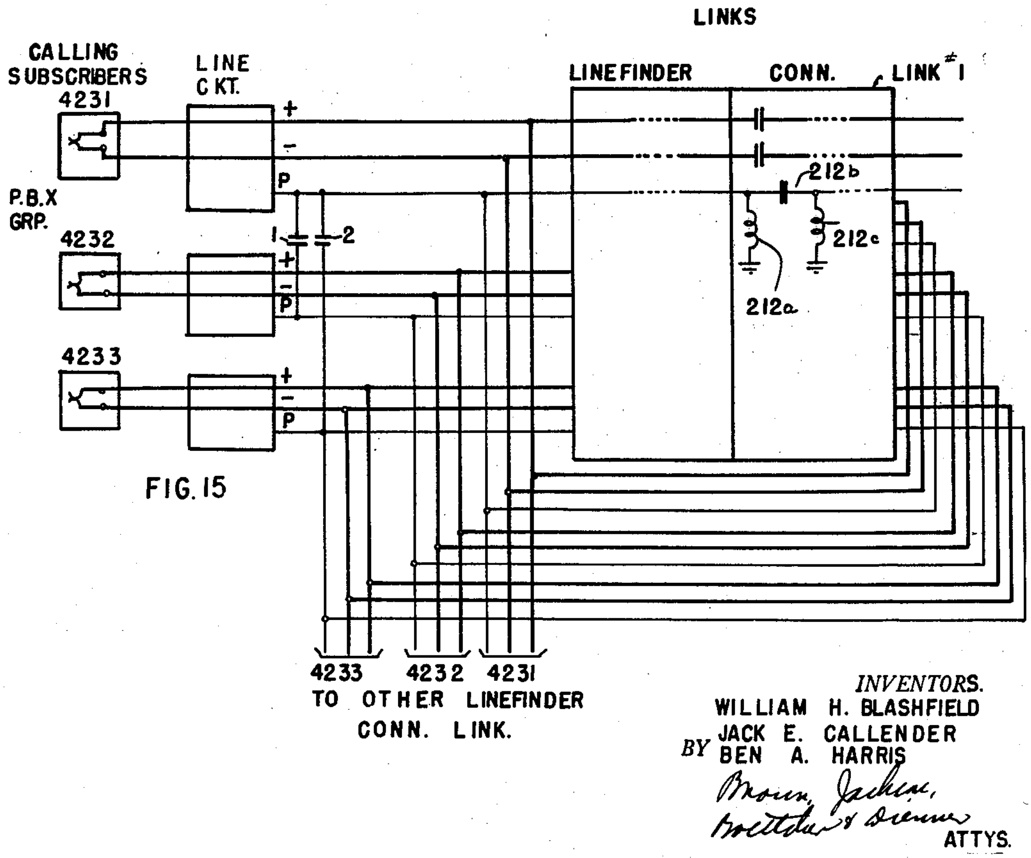

These and other features of the invention will become apparent with reference to the following specification and drawings in which Figure 1 illustrates in block form a series of recorder and non-recorder exchanges connected in a network arrangement;

Figures 2, 3 and 4 illustrate in block schematic form the arrangement of the switching equipment at each of the exchanges including the novel recorder-sender and trunk equipment of the invention;

Figures 5–10 inclusive illustrate in schematic form the novel recorder-sender apparatus of the invention including the novel tone circuit equipment;

Figure 11 sets forth in schematic form a trunk unit for use with certain of the exchanges in the network;

Figures 12 and 14 set forth the manner of preventing tone check from a paystation arrangement;

Figure 13 sets forth an arrangement for use with the calendar in identifying the calling office code to the recorder; and Figure 15 sets forth the circuit path for accomplishing tone check for calls extended over private branch exchange lines.

GENERAL DESCRIPTION

The major portion of the switching apparatus at the exchanges is conventional in structure and operation, and such apparatus is shown in block form. The apparatus which is new is shown in detail and in such manner as to be readily understood and used with the conventional disclosed switching apparatus by parties familiar with the art.

Referring now more particularly to Figure 1 of the drawings, the telephone network shown in schematic form thereat comprises a group of six automatic telephone exchanges interconnected for use with the novel toll ticketing equipment of the invention. It is to be understood that any number of exchanges may be so connected, the present arrangement being merely exemplary of the adaptation of the invention. Certain of the exchanges have been equipped with the novel recorder and sender equipment of the invention, and are indicated generally with a block symbol. Other offices which are not so equipped are connected to preassigned recorder offices whereby the recording equipment of one office serves the subscribers of several offices. The non-recorder offices are indicated by a circle symbol. Thus in Figure 1, offices A, D and E include recorder and sending units, and offices B, C and F are non-recorder offices.

Each of the exchanges has been assigned a two digit office code number in universal numbering fashion, the assigned numbers in the present example being:

| | |
|---|---|
| Exchange A—82 | Exchange D—85 |
| Exchange B—83 | Exchange E—89 |
| Exchange C—84 | Exchange F—81 |

As will become more apparent hereinafter, the calling subscriber initiates a call to a desired subscriber in another exchange by first dialing the code number of the desired party's exchange.

In the particular arrangement illustrated in the drawings, exchanges A, D and E are arranged to serve a larger number of subscribers, and accordingly include a number of finder-selector links for serving the trunk and subscriber lines, the number of links being calculated in accordance with the volume of telephone traffic which is extended thereover. Exchanges B, C and F being of a smaller size include a number of finder-connector links, the exact number of links included being again determined by the traffic volume. However, the determination as to whether an exchange is a recorder or non-recorder is not a size consideration but one of its relative position in the system.

In the event that universal type number is preferred whereby the subscribers in all of the exchanges having directory numbers of an equal number of digits, the link equipment of the smaller exchanges B, C and F will necessarily include conventional type digit absorbing equipment. In the present example, the finder connector links of these exchanges are operative to absorb the first local digit "4."

As is customary in most installations one or more predetermined levels are assigned for use in initiating interexchange calls at each of the exchanges. In the arrangement shown in Figures 2–4 inclusive, extension of a call over the eighth level will land the connection to the recorder equipment of one of the exchanges to initiate an interexchange connection.

Each of the exchanges A through F respectively are interconnected by means of trunk lines and trunk circuits for the calling and called subscribers of different exchanges to provide communication paths. Path 237, for example, extends between trunks 235 and 316 of exchange A and D to provide a communication path between these exchanges.

The recorder exchanges (A, D and E herein) include recording equipment for recording data concerning interexchange calls established by the subscribers at exchanges A, B and C respectively. For example, exchange D includes recording equipment for recording information concerning calls made by local subscribers to any of the other exchanges in the arrangement; and exchange E includes recording equipment for recording information for each interexchange call established by a subscriber of exchange E or exchange F.

In the interests of illustrating the basic invention more clearly, a minimum amount of switching equipment is illustrated at each of the exchanges, the arrangement of each exchange being set forth briefly hereat.

Exchange A, as shown, comprises a number of finder-selector links, second selectors, special selectors and three digit connector switches having their levels connected for use in reaching other exchanges and local subscribers, such as the illustrated subscriber 2312. First selector level 8 is assigned for use in interexchange connections, the level being connected over path 226 to the novel recorder-sender equipment of the invention. Each first selector level 8 has access to a plurality of recorders, each of which level has connected thereto an individual second selector switch such as 233, the levels of which have access to paths which extend to the other exchanges of the arrangement.

The first, fifth and ninth levels of second selector 233, for example, are connected to a two-way trunk circuit such as 235, which is operative to extend the calls in the direction of exchanges D, E and F. The second level is connected to local link equipment, such as special first selector 222' for extending calls received from the associated non-recorder exchanges B and C to the local subscriber. The third level is connected to a two-way trunk 240 which is operative to extend the calls in the direction of exchanges B and level 4 is connected to a trunk 244 to extend calls in the direction of exchange C.

The number of recorder units in an exchange will vary with the traffic volume as in the case of the other automatic switches. Each of the sender units such as 231 however, are common to several recorders (four in the present embodiment) and has access to a local line such as 232 for checking purposes. The number of trunk circuits such as 240 and 244 will also vary with the traffic volume.

Calls incoming to exchange A from exchanges D, E and F are received over trunk 235 and extended over a path such as 236 to an incoming trunk selector such as 238. Further controlling operations by the calling subscriber or by a remote sender extend the call over one of the assigned levels of selector 238 to the local connector switches and the called ones of the subscribers in exchange A or route the call to exchange B or C. As shown, levels 1–7 and 9 are assigned to local calls and are connected over paths such as 249 to connectors such as 223 extending to the local subscriber substations. Levels 8 and 0 of switch 238 are assigned for use in extending the calls which are made by subscribers in exchanges D, E and F through exchange A to subscribers in exchanges C and B, level 8 having access over trunk 240 to the equipment in exchange B and level 0 having access over trunk 244 to the equipment in exchange C.

Calls incoming to exchange A from exchange B are received over a path such as 207 and extended over trunk 240, and cut through selector 243 to a path 227 of a recorder-sender such as 225, 231 and selector 233. The call is further routed to the desired exchange in the manner of calls initiated at exchange A.

Calls incoming to exchange A from exchange C on a path such as 217 are extended over trunk such as 244 and cut through selector 247 to an input path 228 for a recorder-sender unit such as 225, 231 and selector 233.

Non-recorder exchange B associated with exchange A includes linefinder-connector links such as 200 wherein the connector is a four digit connector having levels 1–7 and 9 assigned to extend calls between local subscribers and in which one or more of the levels (in the illustrated arrangement level 8) is assigned for use with trunk circuits such as 204 to extend all interexchange calls over a path such as 207 to an associate trunk 240 and the recorder equipment at recorder exchange A. The call is routed to exchanges A, C, D, E and F in accordance with the particular trunk code dialed.

Calls incoming to exchange B from the exchanges are received over a path such as 207 by trunks such as 204 and extended over a local incoming trunk connector such as 206 to the desired one of the local subscribers.

Exchange C is similarly constituted comprising line-finder-connector links, such as 210, in which the connector is a four digit switch, and has levels 1–7 and 9 assigned for use in establishing local calls. One or more of the levels (in the illustrated arrangement level 8) are reserved for use in the extension of calls to other exchanges, such calls being extended over trunk equipment such as trunk 218 and path 217 to a trunk such as 244, and the recorder equipment of exchange A. The calls are further routed to the subscribers of exchanges A, B, D, E and F in accordance with the particular trunk code dialled.

Calls incoming to the exchange are received over a path such as 217 and extended over trunk 218 to an idle incoming trunk connector such as 216 to the local one of the desired subscribers.

Exchange D, which is adapted to serve a larger number of subscribers includes finder-selector links such as 300 connected for use with three digit connectors such as 303 in establishing connections between the local subscribers. Recorder sender equipment such as 305, 308 is accessible to the subscriber over an assigned level of the first selector (in the present example, level 8) which equipment is operative to control an interconnected second selector switch such as 310 in the further extension of inter-exchange calls. In the illustrated arrangement, level 1 of the selectors such as 310 have been assigned for extension of calls over trunks such as 312 to exchange F, and level 9 has been assigned for extension of calls over the same trunk to exchange E. Levels 2, 3 and 4 have been assigned for extension of calls over trunks such as 316, to exchanges A, B and C.

Trunk 312 is a two-way trunk which is associated with an incoming trunk selector such as 315, and is operative in extending calls incoming from exchanges E and F. Incoming trunk selector 315 has levels 1–7 inclusive and 9 assigned for use in extending connections incoming from exchanges E and F to the local subscribers. Calls incoming from exchanges E and F which are to be extended to subscribers in exchanges A, B or C are extended over one or more preassigned levels of selector 315 (in the illustrated arrangement, level 0) to trunk 316 and the equipment at exchange A.

Calls incoming from exchanges A, B and C are received over trunks such as 316 associated with incoming selectors such as 319. Certain levels of selector switch 319 are assigned for use in extending the calls incoming from exchanges A, B, C to local subscribers, these levels herein being 1–7 and 9. Level 8 of switch 319 herein is assigned to extend calls from subscribers in exchange A, B, C to subscribers in exchange E and F, the call extension being effected over a path such as 319 to the two-way trunks such as 312.

The number of trunks, recorder-senders and other switches in the exchange are based upon traffic volume. Each sender may be common to several recorders and is connected to have access to a local line for use in verifying the calling party number.

Exchange E is similar to exchange D and includes line-finder selector links such as 400 for use with three digit connector switches such as 403, in establishing calls between the local subscribers. A level of the selector equipment (in the illustrated arrangement, level 8) may be assigned for use in seizing recorder-sender equipment such as 405, 407 in establishing calls over an interconnected second selector switch such as 411 to the other exchanges in the arrangement. Selector switch 411 has its levels connected to various trunk circuits which extend to the other exchanges. Level 1 has access to trunks such as 412 for extending calls in the direction of exchange F, levels 2–5 have access to trunks such as 416 for extending calls in the direction of exchanges A, B, C and D. Level 9 has access to special first selectors such as 401″ for extending calls from exchange F to the local subscribers of exchange E.

Trunk circuit 412 is a two-way trunk circuit for extending calls received from subscribers in exchange F over cut through selector 414 and path 410 to recorder-sender equipment 405, 407, and second selector 411 to the desired one of the routes.

Trunk circuit 416 is also two-way in nature, and accepts calls incoming from exchanges A, B, C and D for subscribers in exchange E or exchange F, extending them to an incoming trunk selector such as 419. Levels 1–7 and 9 of selector 419 are connected to the local connectors such as 403 and level 0 is connected to trunk 412 whereby calls incoming from exchanges A, B, C and D are extended to exchange F.

Exchange F includes finder-connector links such as 420 wherein the connectors such as 422 are of the four digit type. Local calls are established over the links in the conventional manner. One or more of the connector levels (in the present example, level 8) are assigned for use in extending the calls over trunk equipment such as 423 to the recorder equipment in exchange E and the subscribers of exchanges A through E inclusive. Trunk 423 is two-way in nature and accepts calls incoming from exchanges A–E inclusive, and extends them to an incoming trunk connector such as 426 for connection to the desired one of the exchange subscribers.

Trunk calls established by subscribers of exchange F are recorded by the equipment in exchange E.

*Establishment of calls between the various exchanges of the arrangement*

The recording media and apparatus for ticketing same with the extension of each interexchange call by a subscriber in any one of the exchanges is generally of the type set forth in the copending application which was filed by Blashfield et al. on July 23, 1951 which received Serial No. 238,092 and which was assigned to the assignee of this invention. The general switching apparatus and link equipment of the present arrangement is also similar to the apparatus of that disclosure, and only a brief description thereof is included herein. Local calls are established by a calling party in a conventional manner, the calling party effecting extension of a connection by lifting the handset at his substation and dialing the directory number of the desired party. Calls from subscriber to subscriber in the same exchange are not ticketed in the embodiment shown, but suitable modification to effect such operation of the illustrated equipment is obvious to parties skilled in the art.

Interexchange calls, that is, calls between subscribers of different exchanges are ticketed automatically, each interexchange call being extended over predetermined recording equipment assigned to the exchange initiating the call.

Briefly, each of the exchanges of the arrangement have a predetermined trunk code number assigned thereto (81—85, 89 in the present example). In establishing a call, the calling party first dials the exchange code number of the desired one of the exchanges and then dials in sequence his own directory number and the number of the desired party. With the dialing of the first digit of the exchange code number the connection is routed to the recorder equipment assigned to the exchange. The recorder equipment in turn seizes an idle sender, prepares its associated second selector for operation and prepares to record the data pertaining to the call. The sender operates to seize a local line (assigned to the sender) for the purpose of verifying the calling party directory number as dialed by the calling party.

As the second digit of the trunk code number is received, the recorder repeats the same to: (*a*) the punch magnet to record same on the tape media; (*b*) to the second selector to seize the outgoing trunk in the path indicated by the value of the second digit; (*c*) to the sender for registration thereon and translation into a routing code (if a routing code is necessary).

As the calling party now dials his own directory number, the incoming impulses are recorded on the tape media associated with the recorder and are repeated to the check line for the purpose of extending a test connection to the calling party line circuit, the operation via the check line being similar to that set forth in the aforeidentified copending application. In the event that the calling party has dialed this number incorrectly, the call is terminated and a new connection must be initiated. Simultaneous with receipt of the first impulse of the calling party directory number, the sender equipment transmits a routing, if required, over the outgoing trunk which was seized by the selector. In this manner a connection is extended to the desired exchange during the period that the calling party dials his own number whereby the number of the called party may be immediately dialed (without previous storage) into the seized exchange to set up the desired connection. Such arrangement obviates storage equipment for storing the called party number.

The telephone system shown in the drawings includes six offices, but from the following description it will be apparent that the equipment is readily adaptable to various types of arrangements including any number of exchanges. The following chart is exemplary of the manner in which the subscribers of each of the exchanges may establish a connection to a desired subscriber in any of the other exchanges, and the manner in which information concerning the call is automatically recorded in a predetermined one of the exchange offices. The chart also sets forth the automatic call routing which is effected as a calling subscriber at any exchange initiates a call to a subscriber at a second exchange.

Although only one path is assigned in most instances herein to each of the other exchanges, the manner of assigning more than one level for such purpose is immediately apparent to parties skilled in the art.

*From exchange B (office 83)*

Local calls—Dial 1, 2, 3, 4, 5, 6, 7, 9
Operator toll calls—Dial 0
To exchange C—Dial 84

Digit 8: Extends call over a link 200, trunk 204, path 207, trunk 240, cut through selector 243, path 227, recorder 225 and sender 231, path 229, second selector 233.

Digit 4: Extends call over fourth level of second selector 233, path 245, trunk 244, path 217 to trunk 218, in exchange C and path 215 to an incoming trunk connector 216. Calling party now dials directory number of called party over path to connector 216 to control same to establish connection with the desired party thereat.

To exchange A—Dial 82:

Digit 8: Extends call to second selector 233 in exchange A as above.

Digit 2 routes call over second level of second selector 233 to a special first selector such as 220. Succeeding digits dialed by calling party operate switches such as 222' and 223 to select the desired called party.

To exchange D—Dial 85:

Digit 8: Extends connections to second selector 233 in exchange A as above.

Digit 5: Extends the call over the fifth level of second selector 233, path 234, trunk 235, path 237, trunk 316 in exchange D, and path 318 to the incoming trunk selector 319 thereat. Succeeding digits dialed over the established path by the calling party control the switches such as 319 and 303 of exchange D to select the desired called party.

To exchange E—Dial 89:

Digit 8: Extends connection to second selector 233 in exchange A in the above manner.

Digit 9: Extends call over level 9 of selector 233, path 234, trunk 235, path 237, trunk 316 in exchange D, and path 318 to the incoming trunk selector 319 thereat.

Sender 231 in exchange A automatically sends digit 8: Signal is extended by sender 231 over path 230, recorder 225, path 229, second selector 233, ninth level of selector 233 to path 234, trunk 235, path 237, trunk 316 in exchange D and path 318 to operate trunk selector 319 to extend the call over level 8 to path 311, trunk 312 and path 313 to trunk 416 in exchange E, and path 418 to the incoming trunk selector 419 thereat.

Succeeding digits dialed by the calling party at exchange B control incoming trunk selector 419 and the further switching equipment such as connector 403 in exchange E to select the desired party.

To exchange F—Dial 81:

Digit 8: Extend connection to the second selector 233 of exchange A in the above manner.

Digit 1: Extends call over the first level of second selector 233, path 234, trunk 235, outgoing path 237 to the trunk 316 in exchange D, path 318 and the incoming trunk selector 319 thereat.

Sender 231 in exchange A automatically transmits digit 8: Digit eight is extended over recorder 225, the first level of second selector 233, trunk 235, etc., as described above, landing call in incoming trunk selector 419.

Sender in exchange A transmits digit 0: Digit zero is extended over recorder 225, the first level of second selector 233, trunk 235, path 237, trunk 316, path 318, the eighth level of selector 319, path 311, trunk 312, path 313, trunk 416, path 418 to incoming trunk selector 419 in exchange E to operate same to extend the call over the tenth level of selector 419, path 413, trunk 412, path 415 to trunk 423 in exchange F, and path 435 to the incoming trunk connector 426 thereat.

Succeeding digits dialed by the calling party in exchange B are transmitted over the established path to exchange F to operate the local switches such as 426 thereat to extend the call to the desired party.

*Calls from exchange C (office 84)*

Local calls—Dial 1, 2, 3, 4, 5, 6, 7, 9
Operator toll calls—Dial 0
To exchange B—Dial 83

Digit 8: Extends call over a local link, such as 210, to the eighth level of the link connector switch, such as 212, path 213, trunk 218, path 217, trunk 244, cut-through selector 247, path 228, recorder 225 and path 229 to the second selector 233.

Digit 3: Extends call over the third level of second selector 233, path 242, trunk 240, path 207, to trunk 204 in exchange B, and path 205 to incoming trunk connector 206 thereat.

Succeeding digits dialed by the calling party in exchange C are transmitted over the above established path to control the trunk connector 206 and the associated switching equipment to establish a connection to the desired subscriber in the conventional manner.

To exchanges A, D, E and F—Dial 82, 85, 89 and 81 respectively to control second selector 233 and sender 231 to route the calls to the exchanges in the manner that the connections were routed thereby in the establishment of calls by subscribers in exchange B.

*From exchange A*

Local calls—Dial 1, 2, 3, 4, 5, 6, 7, 9
Operator toll calls—Dial 0
To exchange B—Dial 83

Digit 8: Extends call over local link, such as 220, and the eighth level of the link selector, such as 222, path 226, recorder 225, path 229 and second selector 233.

Digit 3: Extends the connection over the third level of second selector 233, path 242, trunk 240, path 207 to trunk 204 in exchange B and path 205 to incoming trunk connector 206 thereat.

Succeeding digits dialed by the calling party in exchange A control the switch 206 to select the desired subscriber.

To exchange C—Dial 84:

Digit 8: Extends connection to second selector 233 in exchange A as above.

Digit 4: Extends call over the fourth level of the second selector 233, path 245, trunk 244, path 217 to trunk 218 in exchange C, and path 215 to incoming trunk connector 216.

Calling subscriber in exchange A controls connector switch 216 in exchange C over the established path to extend the connection to the desired subscriber.

To exchange D—Dial 85:

Digit 8: Extends connection to second selector 233 as above.

Digit 5: Extends call over the fifth level of second selector 233, trunk 235, path 237 to trunk 316 in exchange D and path 318 to incoming trunk selector 319.

Calling subscriber at exchange A controls switches such as 319, 303 in exchange D over the established path to extend the connection to the desired subscriber.

Exchange E—Dial 89:

Digit 8: Extends call to second selector 233 as above.

Digit 9: Extends call over ninth level of second selector 233, path 234, trunk 235, path 237 to trunk 316 of exchange D, and path 318 to incoming trunk selector 319.

Sender 231 in exchange A automatically transmits digit 8: Digit eight is transmitted over path 230, recorder 225, path 229 and the ninth level of selector 233, path 234, trunk 235, path 237, trunk 316, path 318 to incoming trunk selector 319 to control same to extend the connection over the eighth level thereof, and paths 319', 311, trunk 312, path 313 to trunk 416 in exchange E, and path 418 to incoming trunk selector 419.

Calling subscriber in exchange A controls switching apparatus such as selector 419, connector 403 in exchange E via the path established to extend the connection to the desired subscriber.

Exchange F—Dial 81:

Digit 8: Extends call to second selector 233 as above.

Digit 1: Extends call over first level of second selector 233, path 234, trunk 235, path 237 to trunk 316 in exchange D, and path 318 to incoming trunk selector 319 thereat.

Sender 231 in exchange A automatically transmits Digit 8: Digit eight is transmitted by sender 231 over path 230, recorder 225, path 229, the first level of selector 233, path 234, trunk 235, path 237, trunk 316 and path 318 to incoming trunk selector 319 to control same to extend the connection over the eighth level and paths 319', 311, trunk 312, path 313, trunk 416, and path 418 to the incoming trunk selector 419 in exchange E.

Sender in exchange A automatically transmits digit 0: Digit zero is transmitted in the manner of digit eight over the path established to the incoming trunk selector 419 to control same to extend the call over the tenth level of trunk selector 419, path 413, trunk 412 and path 415 to trunk 423 in exchange F, and path 435 to incoming trunk connector 426 thereat.

The calling subscriber in exchange A controls connector switch 426 in exchange F over the established path to extend the connection to the desired subscriber.

*From exchange D*

Local calls—Dial 1, 2, 3, 4, 5, 6, 7, 9
Operator toll calls—Dial 0
To exchange B—Dial 83

Digit 8: Extends connection over local link such as 300, and the eighth level of the link selector switch 302, path 304, recorder 305, and path 306 to the second selector 310.

Digit 3: Extends connection over the third level of second selector 310, path 317, trunk 316, path 237 to trunk 235 in exchange A, and path 236 to the incoming trunk selector 238 thereat.

Sender 308 in exchange D automatically transmits digit 8: Digit eight is transmitted over the connection established to trunk selector 238 to operate same to extend the call over the eighth level thereof to path 242, trunk 240 and path 207 to trunk 204 in exchange B, and path 205 to incoming trunk connector 206 thereat.

The calling subscriber in exchange D transmits the digits representative of the directory number of the desired party in exchange B over the established connection to the connector switch 206 to control same to extend the connection to the desired party.

Exchange C—Dial 84:

Digit 8: Extends call to second selector 310 as above.

Digit 4: Extends connection over fourth level of second selector 310, path 317, trunk 316, and path 237 to trunk 235 in exchange A and path 236 to the incoming trunk selector 238 thereat.

Sender 308 in exchange D automatically transmits digit 0: Digit 0 is transmitted over the connection established to trunk selector 238 in exchange A to cause same to extend the connection over the tenth level thereof to path 245, trunk 244 and path 217 to trunk 218 of exchange C, and path 215 to incoming trunk connector 216 thereat.

The calling subscriber dials the directory number of the desired party to control the connector switch 216 at exchange C over the established path to extend the connection to the desired one of the subsribers thereat.

To exchange A—Dial 82:

Digit 8: Extends connection to second selector 310 as above.

Digit 2: Extends connection over second level of selector 310, path 317, trunk 316, and path 237 to trunk 235 in exchange A and path 236 to incoming trunk selector 238 thereat.

The calling subscriber in exchange D transmits over the connection established to the selector 238, the digits of the called party number to control switch 238 and a connector such as 223 to extend the connection to the desired subscriber.

To exchange E—Dial 89:

Digit 8: Extends call to second selector 310 as above.

Digit 9: Extends call over ninth level of second selector 310, path 311, trunk 312, path 313, to trunk 416 in exchange E, and path 418 to incoming trunk selector 419 thereat.

Calling subscriber dials directory number of desired party at exchange E to control the selector switch 419 and a connector switch such as 403 at exchange E to effect connection to the desired one of the subscribers thereat.

To exchange F—Dial 81:

Digit 8: Extends connection to second selector 310 as above.

Digit 1: Controls second selector to extend connection over first level thereof, path 311, trunk 312, path 313 to trunk 416 in exchange E, and path 418 to incoming trunk selector 419.

Sender 308 in exchange D automatically transmits digit 0: Digit zero is transmitted over the established connection to incoming trunk selector 419 to control same to extend the connection over the tenth level thereof, path 413, trunk 412, path 415 to trunk 423 of exchange F and path 435 to incoming trunk connector 426.

The calling subscriber in exchange D dials the number of the desired party in exchange F to control the connector switch 426 in exchange F over the established connection to effect connection with the desired one of the subscribers thereat.

*Calls from exchange E*

Local calls—Dial 1, 2, 3, 4, 5, 6, 7, 9
Operator toll calls—Dial 0
To exchange B—Dial 83

Digit 8: Extends connection over local links, such as 400, the eighth level of link selector 402, path 404 to recorder 405 and second selector 411.

Digit 3: Controls second selector 411 to extend the connection over the third level thereof, path 417, trunk 416, path 313 to trunk 312, in exchange D, and path 314 to incoming trunk selector 315 thereat.

Sender 407 in exchange E automatically transmits digit 0: Digit zero is transmitted over the established connection to incoming trunk selector 315 to operate same to extend the connection over the tenth level thereof, path 317, trunk 316, path 237 to trunk 235 in exchange A, and path 236 to incoming trunk selector 238 thereat.

Sender 407 in exchange E automatically transmits digit 8: Digit eight is transmitted over the established connection to incoming trunk selector 238 to operate same to extend the connection over the eighth level thereof, path 242, trunk 240, path 207 to trunk 204 in exchange B, and path 205 to incoming trunk connector 206 thereat.

The calling subscriber dials the directory number of the subscriber desired to control the connector switch 206 to extend the connection to the desired party.

Exchange C—Dial 84:

Digit 8: Extends connection to second selector 411 as above.

Digit 4: Control second selector to extend connection over fourth level thereof, path 417 trunk 416, path 313, trunk 312 and path 314 to incoming trunk selector 315.

Sender in exchange E automatically transmits digit 0: Digit zero is transmitted over the established connection to operate the incoming trunk selector 315 in exchange D to extend the connection over the tenth level thereof, path 317, trunk 316, path 237 to trunk 235 in exchange A and path 236 to incoming trunk selector 238 thereat.

Sender in exchange A again automatically transmits digit 0: Digit zero is transmitted over the connection established to incoming trunk selector 238 to control same to extend the connection over the tenth level thereof to path 245, trunk 244, and path 217 to trunk 218 in exchange C and path 215 to incoming trunk connector 216 thereat.

The calling subscriber now dials the directory number of the desired party at exchange C to control the connector switch 216 thereat to extend such connection to the desired subscriber.

Calls to exchange A—Dial 82:

Digit 8: Extends connection to second selector 411 as above.

Digit 2: Controls second selector 411 to extend the connection over the second level thereof, path 417, trunk 416, path 213 to trunk 312 in exchange D and path 314 to incoming trunk selector 315 thereat.

Sender in exchange E automatically transmits digit 0: Digit zero is transmitted over the connection established to incoming trunk selector 315 to operate same to extend the connection over the tenth level thereof, path 317, trunk 316, path 237, trunk 235 in exchange A, and path 236 to incoming trunk selector 238 thereat.

The calling subscriber now dials the directory number of the desired party in exchange A to control the selector switch 238 and a connector switch such as 223 to complete the connection to the desired subscriber.

To exchange D—Dial 85:

Digit 8: Extends connection to second selector 411 as above.

Digit 5: Controls second selector 411 to extend the connection over level 5, path 417, trunk 416, path 313 to trunk 312 in exchange D and path 314 to incoming trunk selector 315 thereat.

The calling subscriber now dials the directory number of the desired subscriber in exchange D to control over the established connection the switches at exchange D such as 315 and 303 to complete the connection to the desired subscriber.

To exchange F—Dial 81:

Digit 8: Establishes connection to second selector 411 as above.

Digit 1: Controls second selector 411 to extend the connection over the first level thereof, path 413, trunk 412 and path 415 to trunk 423 in exchange F, and path 435 to incoming trunk connector 426 thereat.

The calling subscriber now dials the directory number of the desired subscriber at exchange F to control the switches thereat over the established connection to effect connection with the desired subscriber line.

*From exchange F*

Local calls—Dial 1, 2, 3, 4, 5, 6, 7, 9
Toll calls—Dial 0
To exchange B—Dial 83

Digit 8: Extends connection over a finder-connector link, such as 420, and operates link connector, such as 422, to establish call over eighth level thereof, path 424, trunk 423, path 415 to trunk 412 at exchange E, cut-through selector 414, path 410, recorder 405, path 409 and second selector 411 thereof.

Digit 3: Controls the second selector 411 in exchange E to extend the connection over the third level thereof, path 417, trunk 416, path 313 to trunk 312 in exchange D, path 314 and incoming trunk selector 315 thereat.

Sender in exchange E automatically transmits digit 0: Digit zero is transmitted over the path established to the incoming trunk selector 315 to control same to extend the connection over the tenth level thereof, path 317, trunk 316, path 237 to trunk 235 in exchange A, and path 236 to incoming trunk selector 238 thereat.

Sender in exchange E transmits digit 8: Digit eight is transmitted over the established connection to incoming trunk selector 238 to cause same to extend the connection over the eighth level thereof, path 242, trunk 240 and path 207 to trunk 204 in exchange B and path 205 to incoming trunk connector 206.

The calling subscriber in exchange F now dials the directory number of the desired party in exchange B to control the local switches in exchange B over the established connection to extend the connection to the desired party thereat.

To exchange C—Dial 84:

Digit 8: Extends to the second selector 411 in exchange E as above.

Digit 4: Controls second selector 411 to extend a connection over the fourth level thereof, path 417, trunk 416, path 313, trunk 312, path 314 and incoming trunk selector 315.

Sender in exchange E transmits digit 0: Digit zero is transmitted over the path established to control trunk selector 315 to extend the call over the tenth level thereof, path 317, trunk 316, path 237, to trunk 235 in exchange A and path 236 to selector 238.

Sender in exchange E again transmits second digit 0: Digit 0 is transmitted over the path established to control trunk selector 238 to extend the call over the tenth level thereof, path 245, trunk 244, path 217, trunk 218 of exchange C and incoming trunk connector 216 thereat.

Calling subscriber in exchange F now dials the directory number of the desired party in exchange C to control the connector switch 216 thereat over the established connection to effect connection with the desired subscriber.

To exchange A—Dial 82:

Digit 8: Extends connection to second selector 411 in exchange E as above.

Digit 2: Controls the second selector 411 over the path established to extend the connection over the second level path 417, trunk 416, path 313 to trunk 312 in exchange D and path 314 to incoming trunk selector 315 thereat.

Sender in exchange E automatically transmits digit 0: Digit zero is transmitted over the established connection to the incoming trunk selector 315 to cause same to advance to the tenth level to extend the connection over path 317, trunk 316, path 237 to trunk 235 in exchange A and path 236 to incoming trunk selector 238 thereat.

Calling subscriber in exchange F now dials the directory number of the party desired in exchange A to control the switches such as 238 and 223 in exchange A over the path established to complete the connection as desired.

To exchange D—Dial 85:

Digit 8: Extends connection to second selector 411 in exchange E as above.

Digit 5: Controls second selector 411 over path established to cause same to extend the connection over the fifth level thereof, path 417, trunk 416, path 313 to trunk 312 in exchange D, and path 314 to incoming trunk selector 315 thereat.

The calling subscriber in exchange F now dials the directory number of the desired subscriber in exchange D to control the switches such as 315 and 303 at exchange D over the path established to complete the connection to the desired subscriber.

To exchange E—Dial 89:

Digit 8: Extends to second selector 411 in exchange E as above.

Digit 9: Controls second selector 411 to establish connection over ninth level thereof to a special first selector such as 401″.

The calling subscriber now dials the directory number of the desired subscriber in exchange E over the path established to control the switches at exchange E, such as 401″ and 403 to effect the desired connection.

GENERAL DESCRIPTION OF RECORDER-SENDER UNITS

The routing of certain interexchange connections requires the transmission of digits in addition to the exchange digit dialled by the calling party. These additional digits are automatically transmitted during the period that the calling party is dialing his own number for recording and verification purposes, by novel recorder-sender equipment such as 225, 231, which is provided for such purposes in the various exchanges.

Figure 5:
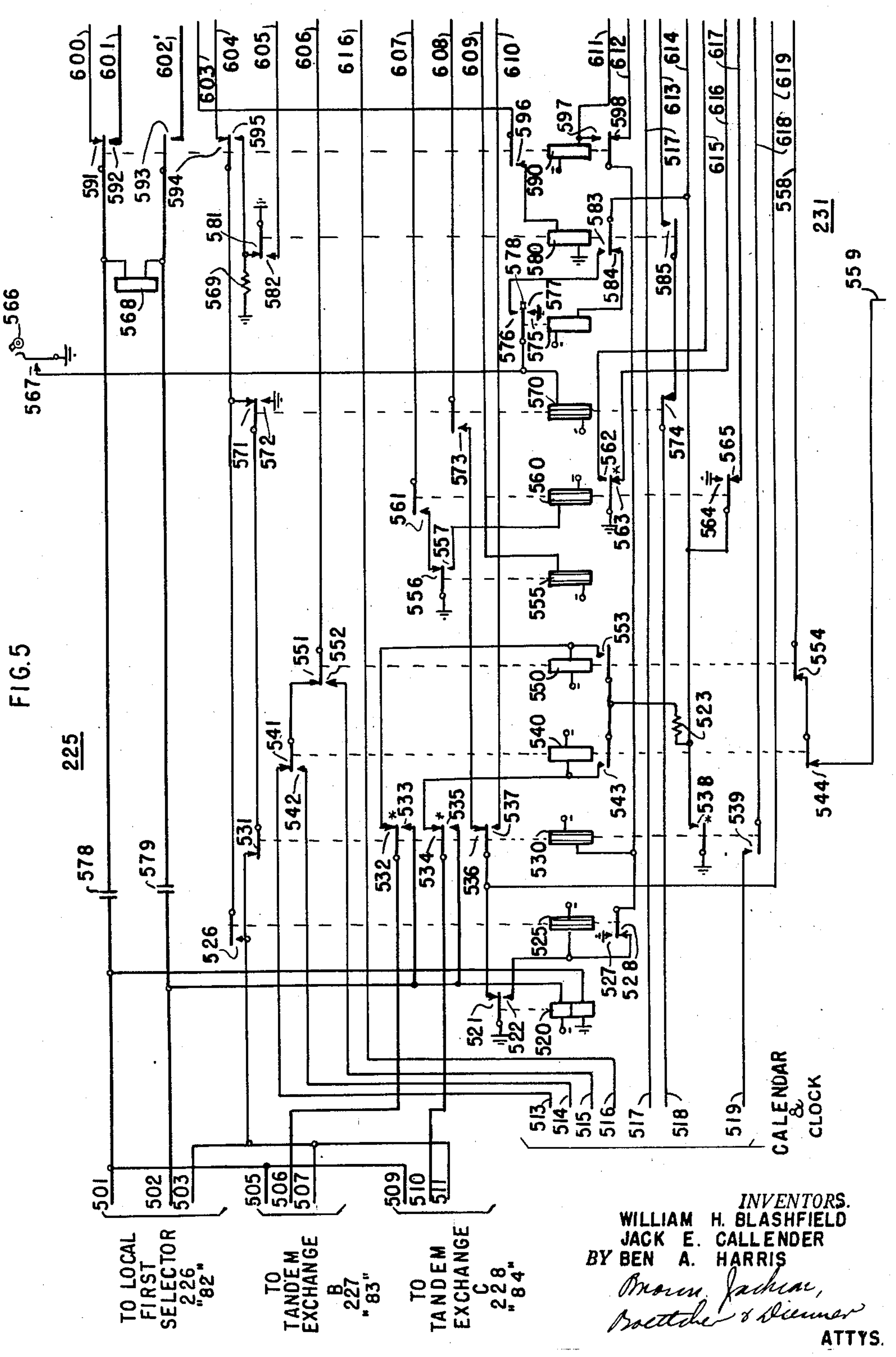
Figure 6:
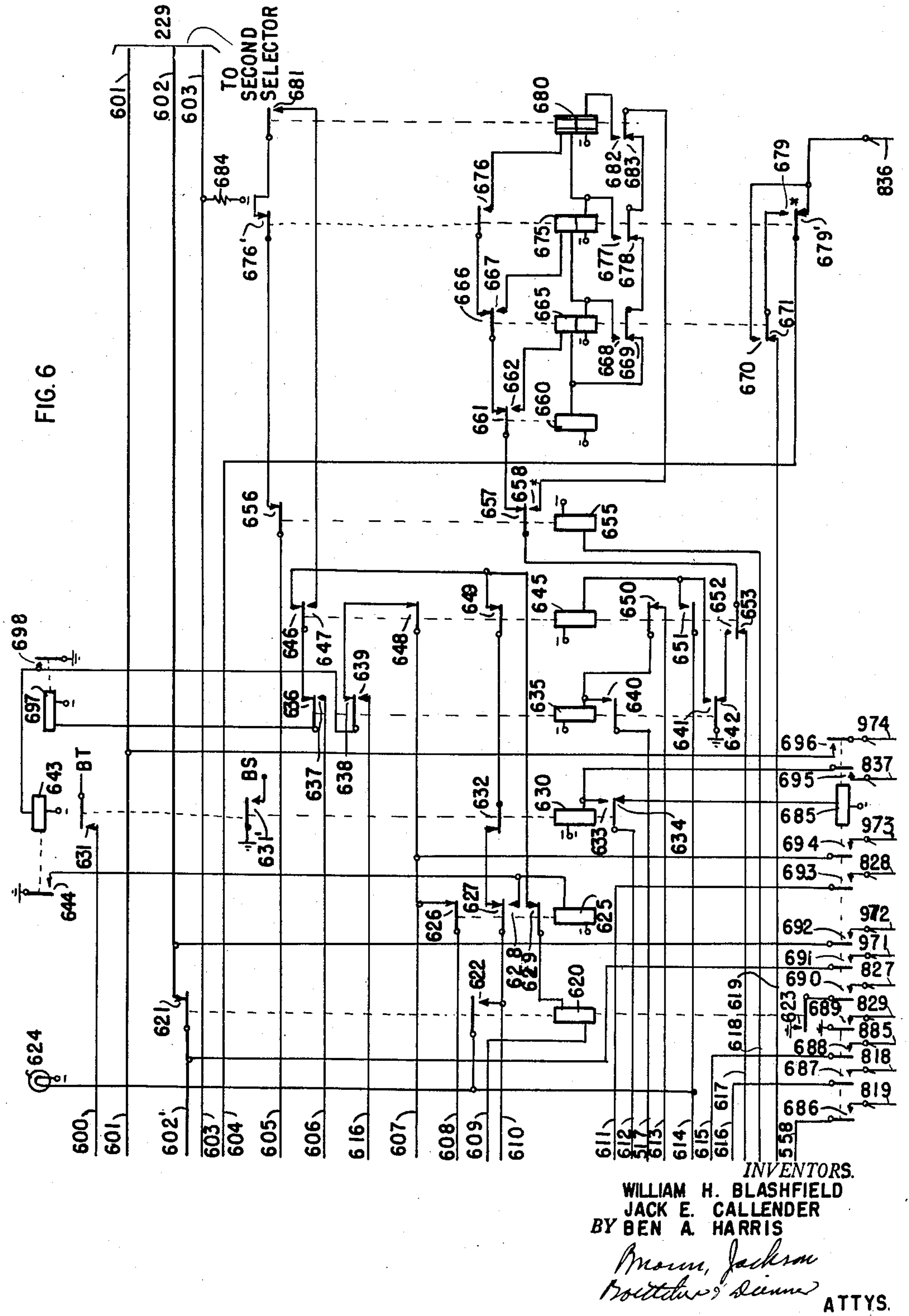
Figure 8:
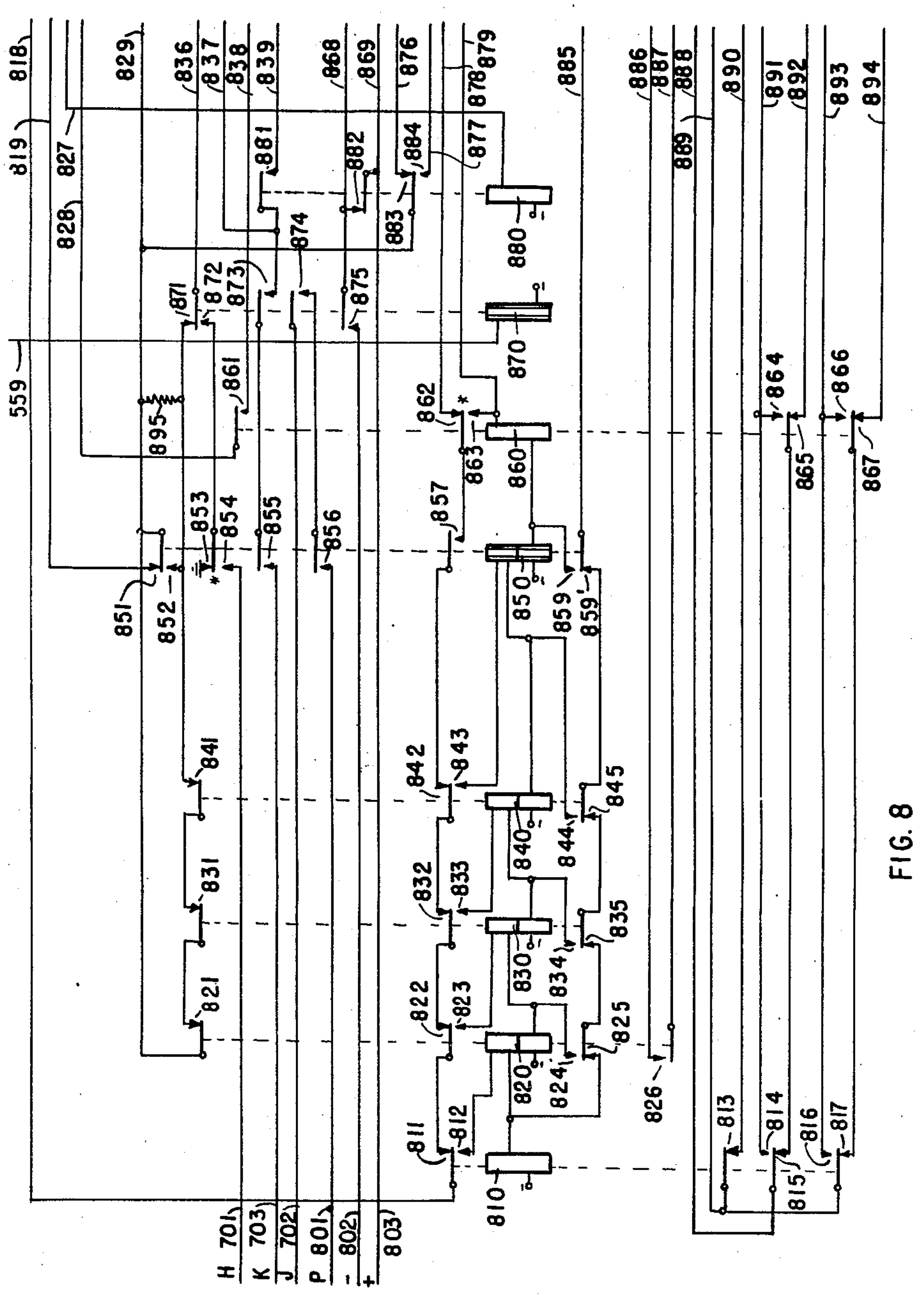
Figure 9:
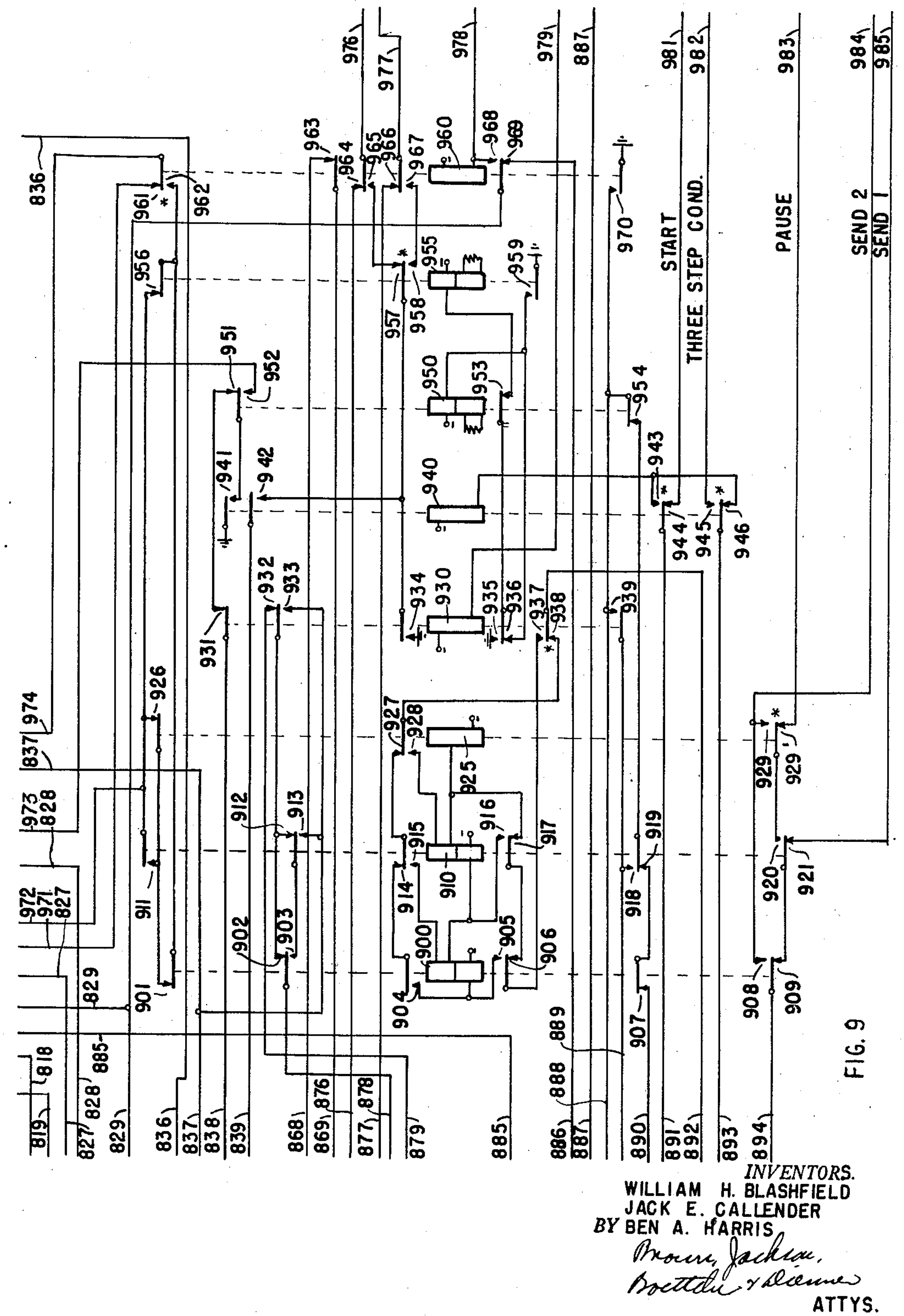
Figure 10:
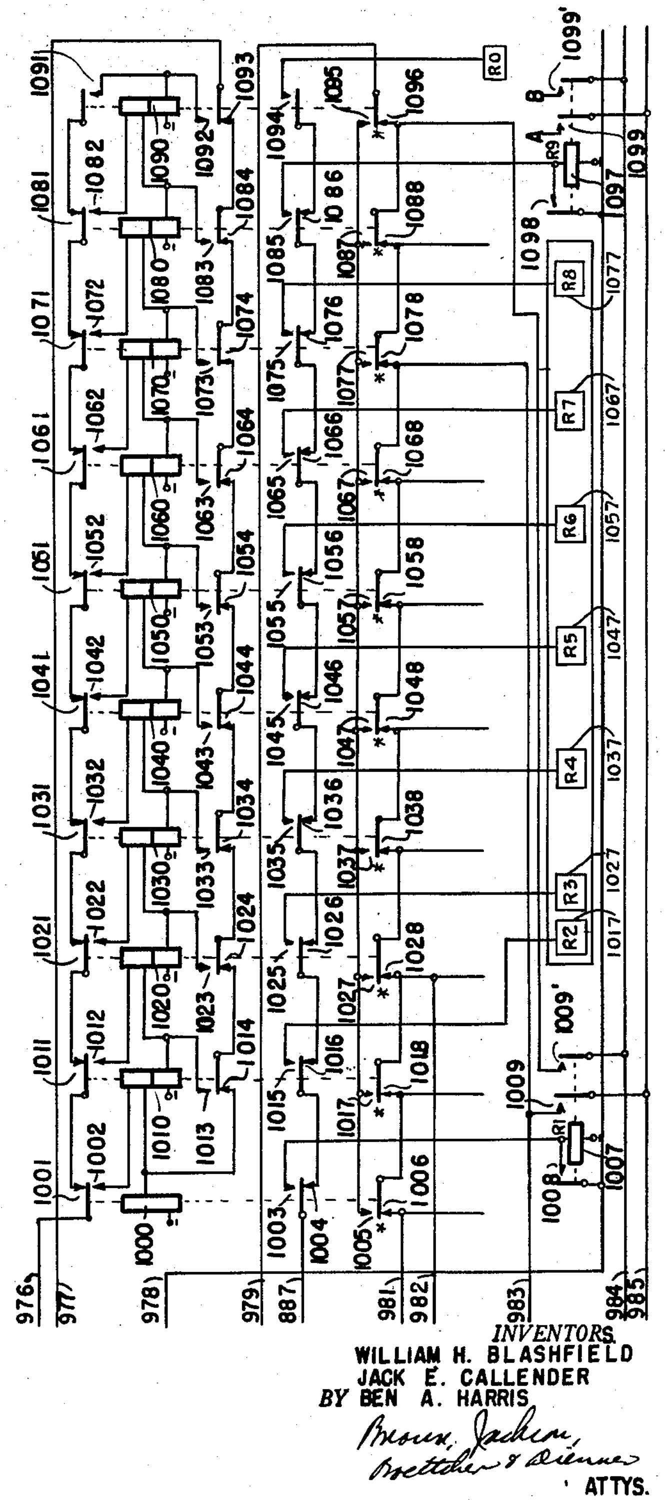

The recorder-sender unit used in exchange A is shown in detail in Figures 5–10, inclusive, the recorder portion 225 being illustrated in Figures 5 and 6, and the sender portion 231 being illustrated in Figures 8, 9 and 10. The other recorder-senders are of similar construction with the exception of the variations in wiring in the sender as determined by the routing required for interexchange calls.

Each exchange will include a plurality of recorders, the exact number of which is determined by the volume of the interexchange traffic for the local exchange as well as for the non-recorder exchanges which are associated therewith. Thus, the number of recorders in exchange A will be determined by the volume of interexchange traffic for the local exchange A, and also for the associated non-recorder exchanges B and C.

Each recorder, such as recorder 225, has associated therewith a second selector, such as 233, the levels of the selector being connected to the various outgoing trunks which extend to the other exchanges in the system.

Each of the senders in an exchange such as sender 231 in exchange A is common to a number of recorders, such as 225, and accordingly the number of senders will be primarily determined by the number of the recorders in the exchange. In one embodiment one sender for each four recorders was found to be adequate in the provision of satisfactory subscriber service. As will become apparent hereinafter, the provision of common sender equipment for a number of recorders substantially minimizes the equipment required in the system, this feature being made possible by including in the sender such elements as are used only during the period of extension of the call to the desired exchange.

The broader functions of the recorder in the establishment of a call thereover include operation of an associated punch member to record on tape media the second digit of the called exchange number, the number of the calling party, the number of the called party, the second digit of the calling exchange number, and information pertaining to the time and duration of the connection established. The recorder equipment is also operative to extend the second digit of the called exchange code to the second selector to initiate extension of the connection to the desired exchange and to the sender equipment 231 for registration and translation thereby. The recorder also cooperates with the sender in its operation to verify the calling party number over a check line and in certain cases to transmit routing signals over the selected one of the outgoing trunks.

The recorder is further operative to time the duration of each call extended thereover and to record such information on the tape member.

The following relays are included in the recorder equipment, and the brief résumé appearing after each relay teaches the operation in the establishment of a call over the recorder.

*Recorder relays*

| | |
|---|---|
| **580** | Receives answer supervision from called party, prepares circuits for calendar and clock. |
| **540, 550** | Marking relays, pull if call originates from a distant office, prevent sender from seizing local check line (leads **559** and **819**), switch connections into calendar so calendar will punch proper calling office code. |
| **575, 570** | Time delay circuit. Has two functions (1) provides delay on answer to prevent a "false answer" from line transients or busy flash and (2) controls running off wide space on tape at end of call, the step magnet and relay **625** "Self stepping" until **570** releases. |
| **520** | Dialing relay. |
| **525** | Hold relay. Relay **530** is auxiliary to relay **525**. |
| **555** | Digit following relay. Relay **560** is auxiliary to relay **555**, used to automatically produce a step after each digit dialed. |
| **630** | "Non-check" relay, gives busy if calling number is dialed incorrectly. Also operates if subscriber starts dialing called number before sender is finished sending. |
| **635** | Calendar connect relay. |
| **655** | Operates from clock, drives counting relays **660** to **680**. |
| **590** | Pulls when sender is finished, releases sender, makes recorder "self-contained" for remainder of call. |
| **620, 625** | Pulse corrector. |

645 Pulls after calendar has been picked up, prepares circuits for clocking and prevents further dialing into tape punch.
685 Sender connect relay.
655, 680 Counting chain, counts 15-second clock pulses for two purposes (1) to produce minute punches after answer, and (2) to "time out" sender if calling party fails to finish dialing.

As shown hereinafter with seizure by the recorder to the sender, the following conductors are connected therebetween:

*Recorder to sender conductors*

559, 819 Picks up check line if call originates in local office.
885 Drives digit-counting chain in sender.
829 Supplies "master ground" to sender.
611 Controls relay 590 as sender completes checking operation.
971, 974 972 Permit sender to control dialing into second selector. Three leads are used because sender itself may dial into second selector, or it may permit subscriber to dial into second selector (break contact of relay 971, second digit of trunk code), or it may prevent subscriber from dialing into second selector (calling telephone number).
827 Transmits subscriber's dialing into sender.
973 Permits sender to operate step magnet to produce four steps between trunk code and calling number, and between calling number and called number.
837, 836 Verification check leads.

The broader functions of the sender with the seizure thereof by an associated recorder responsive to the establishment of a call thereover include: (*a*) Recording of the second digit of the exchange code directory number and translation of the exchange code directory number into the required number and value of digits necessary to establish connection to the desired one of the exchanges; (*b*) Seizure of a check link over a check line for verification purposes. In the present embodiment a check line is assigned to each sender. It would be possible, however, to arrange for recorders to have access to a number of check lines less in number than recorders by utilizing selection equipment, whereby the sender could be dropped whenever the sender is not required to transmit a routing signal; (*c*) Counts the number of digits in the calling number and counts off the four spaces on the tape separating the trunk code from the calling number, and the four spaces separating the calling number from the called number, whereby an economy is effected by not having analogous relays in the recorder; (*d*) Picks up a check tone circuit for verifying the calling line number following dialing of all of the digits of the calling party number with the exception of the ring digit; (*e*) When a call originates from a local office, picks up the check line and verifies the calling line number dialed by the calling subscriber. When the call originates from an associated non-recorder office, the local check line is not seized, the sender being operative to transmit supervision signals back through the recorder and trunks to the calling office to cause same to effect the checking thereat with its own local equipment.

The relays in the sender equipment which are thus operative comprise:

*Sender relays*

880 Picks up check line.
880 Receives dial impulses from recorder, drives counting chain comprised of relays 1000–1090.
930 Marking relay. Releases when sender has transmitted proper number of impulses, stops pulsing.
950, 955 Pulsing relays; transmit dialing pulses as required to set up tandem connection to distant office. Also send steps to effect advancement of tape after recording of certain information thereon.
810–860 Digit counting chain. Tape spacing relay pulls after trunk code, causes three steps to be sent; pulls again after calling number has been dialed sending three more steps to tape advancing equipment.
1007–1097 Register relays, registers second digit of trunk code, equipped only for second digits which require sending.
925, 900, 910 Count digits transmitted by sender.
1000–1090 Counting chain, first registers second digit of trunk code and operates corresponding register relay 1007, 1097. Later counts pulses transmitted by sender.

INTEREXCHANGE CALL INITIATED AT RECORDER EXCHANGE (EXCHANGE A TO EXCHANGE F)

There will be set forth hereat, the manner of operation of the equipment responsive to the initiation of a call by a subscriber in one of the exchanges (exchange A) to a subscriber in another of the exchanges in the system (exchange F).

For exemplary purposes it will be assumed that the subscriber in exchange A having directory number 2312 is extending a call to the subscriber in exchange F having directory number 4213.

In initiating such connection, the calling subscriber first dials the assigned code trunk number for exchange F (81 in the present example) and in sequence his own directory number 3212 and the directory number of the desired subscriber in exchange F (4213). The dialing of the code trunk number 81 effects routing of the connection to the desired one of the exchanges, a portion of the routing operation being automatically accomplished during the period that the calling subscriber is dialing his own directory number. The specific switch operation in accomplishing such connection is now set forth hereat.

A. *Seizing an idle link*

The calling subscriber 2312 in exchange A initiates the call by removing his handest to complete an energizing circuit for associated line circuit equipment 219 in the conventional manner, which in turn seizes an idle one of the finder-selector links, such as the illustrated link 220.

Assuming illustrated link 220 to be in the idle condition, and to be the one of the links which is seized, conventional equipment in the link 220 now serves to busy the calling line 2312 to the other automatic switches having access thereto, and timing means associated with link 220 operate to provide a given predetermined time interval after seizure of the link 220 wherein the party must initiate dialing of the trunk code number.

The linefinder-selector link 220 conditions itself for receipt of the control impulses from the dial of the calling station and informs the calling subscriber of its prepared condition by transmitting dial tone back over the established connection to the receiver of the calling subscriber.

The calling subscriber may now dial the code number of the desired exchange (81 for exchange), the impulse transmitting equipment associated with the dial of the calling subscriber being operative to alternatively interrupt and complete the loop circuit extending from his substation to the local first selector 222 of the seized link to advance the selector 222 to the eighth level thereof.

B. *Seizure of recorder equipment*

As shown in Figure 2, the eighth level of the selector switches such as 222 of exchange A have access to a plurality of recorders, such as the illustrated recorder unit 225. As illustrated, the eighth level of the selector (or connector) in each of the exchanges has been assigned for use in making interexchange calls, it being obvious that any other one of the levels could be for such purpose. The calling line is extended to the seized one of the recorder units over this level. In the event that common control equipment is used in the selectors, restoration of the common control equipment is effected at this time.

Each recorder circuit 225 in the exchange includes a test lead multiple leading to leads 503, 507, and 511 which is marked in accordance with its particular condition of operation; that is, as the recorder is busy, ground is connected to its test conductor, and as the recorder is idle, ground is removed from the test conductor. Thus, whether the recorder is seized over path 226 from local first selector 222, over path 227 from trunk 240 and cut through selector 243, or over path 228 from trunk 244 and cut through selector 247, ground placed on the test wire by the recorder busies the recorder to other local first selectors such as 222 and other cut through selectors such as 243 and 247.

As a selector such as 222 is operated to its eighth level, the associated trunk test equipment automatically examines the test conductors of the recorder circuits and selects an idle one of the recorders. Similarly, as a cut through selector such as 243 or 247 is seized, the associated trunk test equipment automatically examines the test conductors of the recorder circuits and selects an idle one of the recorders.

The manner of operation of the selector trunk test equipment is generally similar to that of Figure 7 of the patent application of Arne Oxaal which was filed March 24, 1952 and received S.N. 278,242 and which was assigned to the assignee of the instant application. It is noted that an idle condition in this system is indicated by low resistance battery.

Assuming for purposes of example that the recorder 225 illustrated in Figure 2, and Figures 5 and 6 is idle, absence of ground on test conductor 503 controls the apropriate test relays in the selector equipment to switch through the positive, negative, and test conductors of selector 222 to the associated conductors 501, 502, and 503 of recorder 225. In Figure 2 this circuit is represented by the single path 226, and in Figure 5 leads 501, 502, and 503 are generally designated as 226.

C. *Recorder operation with seizure*

As the recorder unit (Figure 5) is seized by the selector over path 226, the subscriber loop circuit is extended to the recorder line relay 520, the circuit extending from negative battery over the upper winding of relay 520, conductor 502, the closed contacts (not shown) of the operated hundreds and units relays in first selector 222, the closed contacts of the operated units and tens relays (not shown) in line finder 221 to the closed impulsing contacts (not shown) in the substation of the calling subscriber, back over contacts of the tens and units relays in the line finder 221 and contacts of the operated units and hundreds relays in selector switch 222, to positive conductor 501 and the lower winding of the recorder line relay 520 to positive battery.

Trunk line relay 520 operates, and at its contacts 522 completes an obvious circuit for ground hold relay 525, which operates and at its contacts 527 completes an obvious operating circuit for its slave relay 530, and also for sender connect relay 685, the circuit for the latter extending from negative battery over the winding of relay 685, contacts 634, conductor 612, and contacts 598 and 527 to ground.

Slave relay 530 operates and at its contacts 539 connects the timing conductor 519 to the driving relay 655 for the timing relays 660—680 to time the interval from the time of seizure until the first digit is dialed, and additionally the intervals between digits dialled. Sender connect relay 685 operates relay 870 to seize a local link via the assigned check line for checking purposes and also lands the call in the second selector 233.

D. *Timing out*

Each fifteen seconds a pulse is received over the timing conductor which controls relay 655 to advance the timing chain 600—680. If the chain counts two and a half fifteen-second time intervals (only relay 675 operated) the ground provided by conductor 836 for test lead 503 is interrupted and the connection is released. The "timing out" equipment is recycled and a new timing out period initiated after each digit is dialed.

Specifically, relay 530 operates and ats its contacts 539 extends the fifteen second timing conductor 519 of the clock in the calendar apparatus over contact 539 and conductor 618 to the drive relay 655.

As the clock conductor 519 is so connected and the first pulse is received, drive relay 655 operates and at its contacts 658 completes an operating circuit for the first timing relay 660, the circuit extending from negative battery over the winding of relay 660, contacts 669, 678, 683, 658, 653, conductor 617, contacts 565 and 538 to ground.

As the pulse is terminated, ground is removed from the timing conductor 519 and the drive relay 655 is restored, whereby it is effective at its make-before-break contacts 657 to complete an operating circuit for the second timing relay 665 in series with the first timing relay 660, the circuit extending from negative battery over the winding of relay 660, the upper winding of relay 665, contacts 662, 657, 653, conductor 617, contacts 565 and 538 to ground.

As the next fifteen second pulse is applied to the clock conductor 519, drive relay 655 reoperates and at its contacts 657 interrupts the series energizing circuit for relay 660 and 665 and effects the release of the first timer relay 660, the second timer relay 665 being held over the circuit extending from negative battery over the lower winding of relay 665, contacts 668, 678, 683, 658, 653, conductor 617 and contacts 565 and 538 to ground.

As the pulse is terminated, timing relay 655 releases and at its contacts 657 completes a series energizing circuit for the second and third timer relay 665 and 675, the circuit extending from negative battery over the lower winding of relay 665, the upper winding of relay 675, contacts 667, 661, 657 and 653, conductor 617, contacts 565 and 538 to ground; and at its contacts 658 interrupts the previous holding circuit for relay 665.

As the next fifteen second pulse is received, drive relay 655 operates and at its contacts 657 interrupts the series holding circuit for the second and third relays 665 and 675 to effect the release of the second timer relay 665, the third relay 675 being held operated by ground on conductor 617 which is extended over contacts 653, 658, 683 and 677 to the lower winding of relay 675 and negative battery.

Relay 665 restores and at its contacts 670 now interrupts the ground which has previously been extended from conductor 836 to the selector P wire 503. The ground is interrupted at this time by reason of the simultaneous open condition of both contacts 670 and 679'.

As ground is removed from test lead 503 extending to the first selector 222, restoration thereof is effected in the conventional manner, and the loop extending from the selector 222 over path 226 to the recorder 225 is interrupted to release same. Briefly, as the loop is interrupted the energizing circuit for the recorder line relay 520 is opened, and relay 520 restores, and at its contacts 522 interrupts the holding circuit for ground relay 525. Ground relay 525 restores and at its contacts 527 interrupts the holding circuit for slave relay 530 which restores, and at its contacts 538 interrupts the energizing circuit for pendulum type relay 575 which restores and at its contacts 576 and 577, connects an intermittent ground to associate timer relay 570, which restores after an interval.

Relay 525 in restoring is also effective at its contacts 527 to interrupt the holding circuit for the sender-connect relay 685 to restore same, and thereby release the sender. It is apparent from the foregoing that in the event that dialing is not initiated within thirty seconds of seizure of the recorder (or if more than thirty seconds elapses between the dialing of successive digits) the seizing selector and recorder are automatically restored.

E. *Seizure of sender by recorder*

As described above, as the first selector seizes a recorder, such as 225, over path 226, relays 520, 525 and 530 are operated and relay 525 at its contacts 527 complete an operating circuit for the sender connect relay 685, to effect seizure of the associated sender 231, and to extend the recorder contact conductors 818, 819, etc. to the sender equipment.

As the selector 222 cuts through to the recorder 225, ground will be found on the selector P-wire lead 503, which ground is extended over contacts 526, 594, and 679' to terminal 836. As indicated in the drawing terminal 836 is multipled to the corresponding terminal of all other recorders having access to the sender 231. In idle recorders of this group ground passes over contacts corresponding to 594, 571, and 531 to the three branch test wires corresponding to the leads 503, 507, and 511, whereby these recorders are busied to the selectors while the sender is engaged.

As connect relay 685 now operates to connect the recorder to the sender, ground is connected via contacts 685, 821, 833, 841, 871, and lead 836 to terminal 836, which maintains other recorders in the group busy. Such ground is also extended over contacts 679', 594, and 526 to hold the selector when its hold relay presently removes ground from the test wire, and over leads 503, 507, and 511 to hold the recorder busy to other regular selectors and cut through selectors.

As will be seen hereinafter when the sender operates, following verification of the calling number, relay 590 at contacts 594 removes ground from terminal 836 to enable the other recorders in the group, and places ground through contacts 581 and 595 on the test wire and its branches 503, 507, and 511 at the time of dismissal of the sender.

It might be observed further that selector 222 has access over level 8 (and selectors 243 and 247 upon seizure) to a plurality of recorder groups each of which groups has access to its associated sender. As noted before as a recorder is seized, the other recorders in the same group are busied until the sender is dismissed. Should another selector attempt to gain access to a recorder at this time, it will have to seize a recorder in another group, if available.

Sender connect relay 685 operates and at its contacts 686 and 689 completes an operating circuit for the check-line pick-up relay 870, the circuit extending from negative battery over the winding of relay 870, conductor 559, contacts 544, 554, conductor 558, contacts 686, conductor 819, contacts 851, conductor 829 and contacts 689 to ground.

Sender connect relay 685 is also effective at its contacts 696 and 691 to complete a loop across outgoing conductors 601 and 602 to extend the call over path 229 to second selector 233, the loop specifically extending from positive conductor 601 over contacts 696, conductor 974, contacts 961, conductor 971, and contacts 691 and 621 to negative conductor 602. Upon seizure over leads 601 and 602, selector 233 returns direct ground to lead 603 which accomplishes no function at this time.

Check line pick-up relay 870 operates, transfers the master ground on lead 836 over contacts 872 to ground through contacts 853, and at its contacts 874 and 875 extends a loop to an associated line circuit, such as illustrated in line circuit 760 to effect the seizure of an idle one of the links in exchange A. The check links may be the regular call extending links such as link 220. As an alternative arrangement the check links may comprise a special group of links preassigned for such purpose, each check line being permanently tied to an associated check selector which would have access to special check connectors of various levels. As the loop is extended to the line circuit 760, the line circuit 760 operates in the manner taught in the above identified copending application to seize the link for checking purposes. Digressing, had the recorder been seized as a result of a call initiated at exchange B or C, relay 550 or 540 respectively would have been operated. It should be noted that the circuit of relay 870 passes through series break contacts of these relays, so that the operation of either relay holds the circuit of relay 870 open. With the operation of relay 540 the energizing circuit for check line pick-up relay 870 is interrupted at contacts 544, and if relay 550 is operated, the circuit is interrupted at contacts 554. Thus, in the event of seizure of the recorder by the switches at one of the associated exchanges (B or C), the equipment will not be operative to seize a local link for checking purposes. In such event the checking is done by the switches in the exchange which is initiating the call, as will be more fully taught hereinafter.

It is seen from the foregoing that with the dialing of the digit 8 by the calling party, the switches are operative to mark the calling line as busy to other switching equipment, and to extend the connection to a recorder, such as 225 which in turn seizes an idle sender such as 231, and energizes the interconnected second selector 233. If the call is local in its origin the sender in turn seizes a predetermined assigned check line which in turn seizes an idle link such as 761 for checking purposes. Upon seizure of selector 765 of link 761', the selector grounds the incoming test wire which extends via the check line 232 to lead 801 in a manner similar to that shown in the copending application bearing Serial Number 278,242 which was filed by Arne Oxaal and assigned to the assignee of this application.

A timing set in the recorder which is connected to the calendar clock is counting off a predetermined time period (approximately 30 seconds in the present example) during which period the calling party is expected to dial the second digit of the trunk code number. In the event that the dialing operation is not initiated within such time period, the connection is released.

F. *Calling party dials second digit of called office code*

The calling subscriber now dials the second digit of the code number for the desired exchange (exchange F—digit 1 in the present example) to control the recorder-sender equipment in the automatic routing of the connection to the desired exchange F.

With receipt by the recorder of the break portion of the first pulse over incoming conductors 501 and 502, (Figure 5) recorder line relay 520 restores, and at its contacts 521 completes an operating circuit for the first pulse corrector relay 620, digit following relay 555, and the punch magnet 697.

Specifically, a series operating circuit is completed for the first pulse corrector relay 620 and digit following relay 555 which extends from negative battery over the winding of relay 555, conductor 609, the winding of relay 620, contacts 629, 649, 632, 627, conductor 610 and contacts 537 and 521 to ground.

A pulse correcting system comprising relays 620 and 625 is utilized in the system to insure the transmission of an impulse of sufficient length to operate the punch even though the incoming pulse from the subscriber substation is unusually short. That is, relay 620 operates, and at its contacts 622 extends ground from contacts 538 on conductor 614 over contacts 627, 632, 649, 646 and 636 to the punch magnet 697. This same ground is extended through contacts 629 to relays 620 and 555. Thus the operation of the punch magnet is effected even though relay 520 reoperates before it could deliver a pulse of sufficient length to operate the punch magnet.

Relay 620 at its contacts 623 is also effective to transmit to the sender drive relay 880, the impulses received by the recorder from the subscriber dial; and at its contacts 621 transmits the incoming impulses to the second selector 233.

In that the digit transmitted by the subscriber is one, only one impulse is repeated by the recorder to the selector at this time, and the selector 233 is operated to its first level in the conventional manner. Selector switch 233 seizes an idle one of the outgoing trunks, such as 235, over path 234. Upon seizure of trunk 235, the trunk places direct ground on its P-wire which in turn extended to the P-wire of selector 233, whereby the selector is held after it has cut through to the trunk. This direct ground extends through the selector 233 to the recorder P-wire 603. Trunk 235 is in turn operative to extend the call over path 237 to trunk 316 in exchange D. Trunk 316 in turn extends the connection over path 318 to seize the incoming trunk selectors such as 319, in exchange D. The operation of the trunk equipment in extending the call is set forth in more detail hereinafter.

The code digit transmitted by the subscriber to advance the selector to the first level is simultaneously recorded on the sender counting and translating chain 1000—1090, the recorder unit relay 620 repeating the digit representing impulses (in this example, one) to the sender drive relay 880. Relay 880 in turn drives the chain 1000—1090 to record same.

Thus the first impulse as repeated by pulse corrector relay 620 at its contacts 623 is extended over contacts 690 and conductor 827 to sender relay 880 to operate same. Sender relay 880 operates and at its contacts 884 completes an operating circuit for the first counting chain relay 1000, the circuit extending from negative battery over the winding of relay 1000, contacts 1014, 1024, 1034, 1044, 1054, 1064, 1074, 1084, 1093, conductor 977, contacts 966, conductor 877, contacts 884, conductor 829 and contacts 689 to ground.

The first counting chain relay 1000 operates and at its contacts registers receipt of the break of the first impulse of the incoming digit.

In the recorder 225 the operation of the digit following relay 555 in series with the pulse corrector relay 620 responsive to receipt of the first impulse of the digit effects at its contacts 557 the completion of an obvious operating circuit for its slave relay 560, which operates and at its contacts 562 completes an operating circuit for the first digit counting chain relay 810 to register thereon the fact that the first digit of a series is being received by the recorder, the circuit extending from battery over the winding of counting chain relay 810, contacts 825, 835, 845, 859, conductor 885, contacts 688, conductor 615 and contacts 562 to ground.

Punch magnet 697 also operates with the pulse corrector relay 620 and digit follower relay 555, to punch a hole in the tape member once for each impulse received, the punch operation being effected in the manner of the equipment shown in the aforeidentified copending application. Punch magnet 697 is effective at its contacts 698 to complete an obvious operating circuit for the step magnet 643 which operates, and at its contact 644 completes an obvious operating circuit for the second pulse corrector relay 625.

Pulse corrector relay 625 operates, and at its contacts 627 and 629 interrupts the energizing circuits for the first pulse corrector relay 620, the punch magnet 697, and the digit following relay 555, to restore same, the digit following relay 555 remaining operated for a slightly longer period of time by reason of its slow to release characteristics.

As the punch magnet 697 restores it is effective at its contacts 698 to interrupt the holding circuit for the step magnet 643 to cause the step magnet to restore and advance the tape one step in preparation for the next punch. Step magnet 643 is also effective at its contacts 644 in restoring to interrupt its circuit to the second pulse corrector relay 625 to restore same in the event that the step magnet 643 releases after the recorder line relay 520 reoperates. If the step magnet 643 restores before the line relay 520 reoperates, the line relay subsequently effects release of the pulse corrector relay 625 by opening the circuit at contacts 521.

The first pulse corrector relay 620 in restoring is effective at its contacts 623 to terminate transmission of the make period of the first impulse to the sender drive relay 880 which restores and at its contacts 883 completes a series operating circuit for the first and second counting chain relays 1000 and 1010, the operating circuit extending from negative battery over the winding of relay 1000, the upper winding of relay 1010, contacts 1002, conductor 976, contacts 964, conductor 876, contacts 883, conductor 829 and contacts 689 to ground.

G. *Operation during interval between exchange code second digit and first digit of calling party number*

With the receipt from the subscribers substation of the make period after the break period of the first impulse, recorder line relay 520 reoperates, and at its contacts 521 interrupts the holding circuit for the second pulse corrector relay 625 to restore same in the event that the step magnet 643 has already released.

Inasmuch as the second digit of the code number in the present example is 1, only a single impulse will be transmitted and after receipt of the break period thereof, the line relay 520 in the recorder is reoperated to interrupt at its contacts 521 the energizing circuit for digit following relay 555. After the elapse of a predetermined period of time as determined by its slow to release characteristics, relay 555 restores.

Digit following relay 555 restores in this manner each time a complete digit has been received, and at its contacts 557 interrupts the energizing circuit for slave relay 560 which is also slow to release and remains operated for a predetermined period of time thereafter; and at its contacts 556 completes an operating circuit for the recorder step magnet 643, the circuit extending from negative battery over the winding of step magnet 643, contacts 638 and 648, conductor 607, contacts 561 and 556 to ground. Step magnet 643 operates and at its contacts 644 completes an operating circuit to the second pulse corrector relay 625 which operates without effect at this time.

After expiration of the predetermined time period, slave relay 560 restores and at its contacts 561 interrupts the energizing circuit for the step magnet to restore same, which in its restoration effects advancement of the tape one step to thereby provide the first one of four spaces to appear on the tape between the office code number "one" now registered thereon, and the calling party directory number which is to be recorded next.

Slave relay 560 in restoring is also effective at its contacts 563 to complete an operating circuit for the second relay 820 of the digit counting chain to the sender equipment, the circuit extending from negative battery over the winding of relay 810, the upper winding of relay 820, contacts 812, conductor 818, contacts 687, conductor 616, and contacts 563 to ground.

Counting chain relay 820 operates and at its contacts 821 connects the 150 ohm resistance 895 across conductors 829 and 836 whereby the 150 ohm resistance is inserted in the P wire of the calling party. In calls established locally the insertion of the 150 ohm resistance in the P wire is without effect. As will be shown hereinafter, the insertion of the resistance in the P wires of the calling subscribers in non-recorder offices B and C, signals the trunk at the calling office to prepare a check link for transmission of succeeding digits into the check link for calling line number verification purposes locally in office B or C as well as out over the trunk to exchange A for recording.

Digit counting relay 820 is also effective in its operation at this time to effect recording in the sender of the exchange code number for use in routing the connection as the calling party dials his own number. Specifically, as relay 820 operates it is effective at its contacts 826 to complete an operating circuit for the register relay 1007, which relay when operated indicates to the sender that the call is to be transmitted to the exchange 81. It is apparent that the register relays are added to the register only in instances when connection to the desired exchange requires transmission of more than one routing signal. Thus, since exchanges B (83) and C (84) are reached directly by exchange A over trunks such as 244 and 218 and such as 240 and 204 by the second selector 233, there is no need for the sender to transmit additional routing digits and no register relays are used with the third and fourth counting chain relays 1020 and 1030.

Exchange D (85) is likewise directly reached from exchange A by selector 233 and direct trunk routes, and accordingly it is not necessary to associate a register relay with the fifth register relay 1040.

Exchange E (89) requires transmission by the sender in exchange A of additional digit "8", and accordingly the ninth counting chain relay in exchange A has a register relay 1097 associated therewith. The following table is further illustrative of the manner in which the senders of the illustrated exchanges would be equipped with register relays:

| Exchange to Exchange | | Register Relay Required for Recorder |
|---|---|---|
| A, B, C | E (89) | R9—1097 |
| | F (81) | R1—1007 |
| D | B (83) | R3—1027 |
| | C (84) | R4—1037 |
| | F (81) | R1—1007 |
| E, F | A (82) | R2—1017 |
| | B (83) | R3—1027 |
| | C (84) | R4—1037 |

Continuing with the present connection, with operation of digit counting relay 820 after receipt of the second trunk code digit, (digit one in this example) an operating circuit is completed for the register relay 1007 associated with the first counting chain relay 1000, the operating circuit therefor extending from negative battery over the winding of relay 1007, contacts 1003, conductor 887, contacts 826, conductor 886 and contacts 969 and 689 to ground.

Register relay 1007 operates and at its contacts 1008 completes an operating circuit for signal initiating relay 960 by extending its own operating ground at contacts 1008 over conductor 978 to the winding of signal initiating relay 960 and negative battery.

Signal initiating relay 960 operates and at its contacts 961 disables the circuit by which recorder relay 620 relays pulses to the second selector and at its contacts 962 holds the loop circuit to the second selector over contacts 956, conductor 972, and contacts 692. The transfer of the lever between contacts 961 and 962 is over make-before-break contacts, and at its contacts 964 interrupts the holding circuit for the first and second counting chain relays 1000 and 1010 to effect the restoration thereof. Relays 1000 and 1010 restore, and at their contacts 1006 and 1018 complete an operating circuit for the sender marking relay 930, as prepared by the first digit counting relay 810, the circuit extending from negative battery over the winding of relay 930, conductor 979, contacts 1096, 1088, 1078, 1068, 1058, 1048, 1038, 1028, 1018, 1006, start conductor 981, contacts 944, contacts 814, conductor 888 and contacts 970 to ground. Marker relay 930 is operative to initiate transmission of a series of impulses by the impulse relay pair 950 and 955, and to terminate transmission thereby as a predetermined number of impulses is transmitted. At this time the sender is effective to transmit a series of impulses to the recorder for advancing the tape three more steps prior to recording of the calling party directory number.

Marker relay 930 operates and at its contacts 939 completes an operating circuit for tape spacer relay 940, the circuit extending from negative battery over the winding of relay 940, contacts 946, conductor 893, contacts 816, conductor 889, contacts 939 and 970 to ground. Marker relay 930 is also effective at its contacts 935 to initiate pulse transmission by the sender pulsing relays 950 and 955, the initial circuit therefore extending to the first pulse relay 955 from negative battery over the upper winding of relay 955 and contacts 953 and 935 to ground.

Tape spacer relay 940 operates and at its contacts 944 interrupts the starting circuit for marker relay 930, and at its contacts 945 connects the marker relay holding circuit to the three step conductor 982, the circuit for the marker relay now extending from negative battery over the winding of relay 930, conductor 979, contacts 1096, 1088, 1078, 1068, 1058, 1048, 1038, 1028, three step conductor 982, contact 945, conductor 893, contacts 816, conductor 889, contacts 939 and 970 to ground.

If the calling party should start dialing his own number while the steps between the trunk code digit and the calling number are being run off on the tape, relay 630 is operated over the following circuit: battery through the winding of relay 630, contacts 695, lead 837, contacts 881, conductor 839, and contacts 942 and 934 to ground, relay 880 being operated as a result of the pulsing operation as explained previously. Relay 630 releases relay 685 to dismiss the sender, and closes contacts 631 to extend busy tone through contacts 631, conductor 600, contacts 591 and condenser 578 to calling lead 501.

Pulse relay 955 operates and at its contacts 959 completes an obvious operating circuit for its associate pulsing relay 950, and at its contacts 958 completes an operating circuit for the first relay 1000 of the sender counting chain, the circuit extending from negative battery over the winding of relay 1000, contacts 1014, 1024, 1034, 1044, 1054, 1064, 1074, 1084, 1093, conductor 977, contacts 967, 958 and 934 to ground.

Second pulsing relay 950 operates and at its contacts 952 completes an operating circuit for the step magnet 643 in the recorder to effect the energization thereof, the operating circuit extending from negative battery over the winding of step magnet 643, contacts 638, 648, 694, conductor 913 and contacts 952 and 941 to ground. Second pulsing relay 950 is also effective at its contacts 953 to interrupt the original energizing circuit for the first pulsing relay 955.

First pulsing relay 955 restores, and at its contacts 959 interrupts the energizing circuit for the second pulsing relay 950, at its make-before-break contacts 958 interrupts the original energizing circuit for the first counting chain relay 1000; and at its contacts 957 completes a series energizing circuit for the first and second counting relays 1000 and 1010, the circuit extending from negative battery over the winding of relay 1000, the upper winding of relay 1010, contacts 1002, conductor 976, contacts 965, 957, and 934 to ground.

The second impulsing relay 950 restores and at its contacts 952 interrupts the energizing circuit for the step magnet 643 to cause same to restore and effect advancement of the tape one step. Relay 950 in restoring is also effective at its contacts 953 to recomplete the energizing circuit for the first pulsing relay 955 to reenergize same.

The pulsing relay 950 and 955 cycle in the manner just described to cause the step magnet 643 to advance the tape a corresponding number of steps, and to effect the repeated transmission of impulses to the counting chain alternatively over conductors 976 and 977, whereby the chain counts the impulses generated and transmitted by the impulsing relays 950 and 955.

Briefly, as the relay 955 is now operated it effects restoration of the first counting chain relay 1000 and reoperation of relay 950 to effect energization of the step magnet 643. Impulse relay 950 operates to restore impulse relay 955 and effect energization of the third counting chain relay 1020 in series with the second counting chain relay 1010 and the restoration of the second impulse relay 950. The opening of contacts 1028 prepares relay 930 for release, the circuit for relay 930 being extended over the three step conductor lead 982 and contacts 1017 and 1027 until relay 1010 is subsequently released. Relay 950 restores to effect restoration of the step magnet 643 and the advancement of the tape one step and reenergizes impulse relay 955. With reoperation of the impulse relay 955 for the third time the second counting chain relay 1010 is restored and the second impulse relay 950 is reoperated. Relay 950 operates to energize the step magnet 643 and to restore the impulse relay 955. With restoration of the impulse relay 955, the second impulse relay 950 is restored to release the step magnet 643 and effect the further advancement of the tape one step.

In that the purpose of the present generation of impulses by relays 950 and 955 is to advance the tape three more steps (and thus effect the separation of the trunk code number from the calling number on the tape by four spaces), with the advancement of the counting chain to the third relay, the desired spaces on the tape have been stepped off and the operation is completed.

Termination of the operation of the impulse generating equipment is effected as a result of the release of the second counting chain relay 1010, the second counting chain relay 1010 being effective at its contacts 1017 to open the holding circuit for marking relay 930, which extend over the three step conductor 982.

As marking relay 930 now restores, it is effective at its contacts 935 to interrupt the energizing circuit for pulsing relays 950 and 955 to terminate the generation of impulses thereby, and at its contacts 934 is effective to interrupt the holding circuit for the third counting chain relay 1020 to effect the restoration of the counting chain.

Summarily, at this point, the calling subscriber has dialed the office code consisting of two digits (81 in the present example) the second digit of which has been received by the recorder which has effected registration of the second digit in the sender and has repeated the second digit to the second selector 233 which has been controlled thereby to select and seize an appropriate outgoing trunk. The sender has in turn controlled the recorder step magnet in the advancement of the tape a number of steps preparatory to recording of the calling party directory number.

H. *Subscriber dials his own directory number. Transmission of first routing digit (digit 8) by sender apparatus*

The sending equipment at this time is in condition to initiate transmission of the routing digits which are necessary to routing of the connection to the desired office, but the sender equipment is connected in such manner that the transmission of the routing digits is not initiated until such time as the subscriber starts dialing his own number. Thus a sufficient time period is provided between the dialing of the trunk code directory number and the start of sending, and protection is provided for the completion of the connections to the next exchange (D in the present instance) including the seizure and conditioning of incoming trunk selector 319 prior to reception of routing digits from sender 231. Thus a natural pause is introduced without use of additional equipment for this purpose.

It has been customary heretofore in the use of sender equipment to transmit routing digits, to first store the called party number. Such practice was necessary in order that the connection being effected by the routing digits may be completed in time to receive the called party number as dialed.

In the system of the instant patent application the sender transmits its routing digits during the period that the calling party is dialing his own number, whereby the routing connection is completed in preparation for the reception of the called number prior to the dialing of the called number. As a result it is not necessary to store the called number and effect the later retransmission thereof. Should the sender inadvertently fail to complete transmission by the time the subscriber starts dialing the called number, the calling party is given a busy tone signal.

It has been assumed that the calling subscriber, in the present example, has directory number 2312. As the subscriber initiates the dialing of this directory number, the two impulses representative of the first digit of the number are received by the recorder and relayed to the punch to control same to record the digit two, and to the sender for transmission to the check line to effect checking of the number dialed. The first pulse receive by the sender initiates transmission thereby of the routing digits.

Specifically with receipt of the break period of the first impulse representative of the digit two, recorder line relay 520 restores and at its contacts 521 completes the aforedescribed energizing series circuit for digit following relay 555 and pulse corrector relay 620 and the aforedescribed energizing circuit for the punch magnet 697.

Punch magnet 697 operates to perforate the tape once as before described, and at its contacts 698 completes an operating circuit for the step magnet 643 which operates. The step magnet operates the second pulse correcting relay 625 which releases relays 620 and 625 and removes the energizing circuit from the punch magnet. The punch magnet releases in turn releasing the step magnet. As hereinbefore described, either the step magnet or relay 520 releases relay 625 in accordance with the length of the break period of the pulse.

The first impulse of the group which represents the calling subscriber number is thus recorded on the tape.

The impulse is also transmitted to the sender by the recorder for transmisison to the check link. Specifically, impulse corrector relay 620 is effective at its contacts 623 to complete an operating circuit for sender relay 880, the circuit extending from negative battery over the winding of relay 880, conductor 827 and contacts 690 and 623 to ground.

Sender relay 880 operates and at its contacts 882 interrupts the loop extending over positive and negative conductors 802 and 803 to the selector 765 of the seized check link 761 to initiate further extension of the test connection to the calling subscriber. It should be observed that although relay 880 follows the pulsing of the trunk code digit prior to receipt of the calling party number, closed contacts 963 of relay 960 shunt contacts 882 to prevent the trunk code digit from entering the check line. With contacts 963 open, the check line may be pulsed. As will be shown, the pulses of this digit cause selector 765 to select a specific idle connector such as 763 of the group of connectors which are accessed off the second level.

Simultaneously with and responsive to the transmission of the first impulse of the calling party number, the sender initiates transmission of the routing digits to extend the connection to the desired exchange.

Specifically, as digit following relay 555 is operated responsive to receipt by the recorder 225 of the first impulse of the calling subscribers number, it is effective at its contacts 557 to complete an obvious operating circuit for the slave relay 560, which operates and at its contacts 563 interrupts the holding circuit for the first digit counting chain relay 810 in the sender to release same. Relay 820 is held over the circuit which extends over its lower winding contacts 824, 835, 845, 859', lead 885, contacts 688, lead 615, and contacts 562 to ground. Digit counting relay 810 restores, and at its contacts 814 interrupts the holding circuit for the tape spacer relay 940 to restore same, and at its contacts 817 completes an operating circuit for the marking relay 930, the circuit extending from negative battery over the winding of relay 930, conductor 979, contacts 1096, 1088, 1078, 1009, the first digit switching conductor 985, contacts 921, 909, conductor 894, contacts 867, 817, 813, conductor 890, contacts 907, 919, 954, and 970 to ground.

Marking relay 930 operates, and at its contacts 939 establishes a locking circuit over contacts 817, conductor 889, contacts 939 and 970 to ground, and at its contacts 937 completes an operating circuit for the first transmitted digit marking relay 925, the circuit extending from negative battery over the winding of relay 925, contacts 917, 906, 937, conductor 892, contacts 865, 815, conductor 888, contacts 970 to ground. Relay 925 removes the shunt on contacts 956 in preparation for transmission of pulses to the second selector by relay 955. Marking relay 930 is also effective at its contacts 935 to complete an operating circuit to the pulse generating relays 950 and 955 to effect the generation of impulses in the manner heretofore described.

Briefly, as the first impulse generating relay 955 operates it is effective at its contacts 956 to interrupt the loop outgoing to the second selector 233, this loop extending from negative conductor 601 over contacts 696, conductor 974, 962, 956, conductor 972, contacts 692 to positive conductor 602. It is noted that whereas the impulse generating relays 950 and 955 interrupted this circuit during the operation to advance the tape four steps between the trunk code number and the subscribers directory number, the impulses were not repeated over the circuit by reason of the restored condition of the first digit counting relay 925 which maintained contacts 926 closed, whereby contacts 901 and 926 rendered contacts 956 ineffective relative to the second selector.

Similarly the operation of the first impulse corrector relay in the recorder with receipt of the impulses representing the calling party number was not repeated to the outgoing selector 233 by reason of the open condition of contacts 961 in that loop.

Continuing now with the transmission of the first routing digit by the sender with the first operation of impulse generating relay 955, contacts 959 are operated to complete an energizing circuit for the second impulse generating relay 950; and contacts 958 are closed to complete an operating circuit for the first counting chain relay 1000 as heretofore described. It is noted that the advancement of the counting chain relays 1000—1090 responsive to the application of impulses alternatively to conductors 976 and 987 is well known in the art, one teaching thereof by way of example being shown in the aforeidentified copending application to Blashfield et al.

Accordingly, only a brief description is given herewith without tracing each of the counting chain relay operating paths.

With the first operation of impulse relay 950, the operating circuit for impulse generating relay 955 is interrupted to restore same, which relay in its restoration terminates the break period of the first impulse to the second selector, interrupts the energizing circuit for impulsing relay 950, and completes a series operating circuit for counting relays 1000 and 1010 as heretofore described.

With the restoration of relay 950 an operating circuit is recompleted to impulsing relay 955, which operates and at its contacts 956 transmits a second impulse over the outgoing circuit to second selector 233, recompletes an operating circuit for pulsing relay 959, and interrupts the holding circuit for the first counting chain relay 1000 to restore same.

Impulsing relay 950 operates, and effects restoration of impulsing relay 955, which relay restores to effect the restoration of impulsing relay 950, the operation of the third counting chain relay 1020, and termination of the break period of the second impulse.

Impulsing relay 950 restores and completes an operating circuit to impulsing relay 955. As relay 955 reoperates, it is effective to initiate transmission of the break period of the third outgoing impulse, reoperate impulsing relay 950 and effect restoration of the second counting chain relay 1010. Impulsing relay 950 operates and interrupts the energizing circuit for impulsing relay 955 which restores to terminate the break period of the third outgoing impulse, to effect release of the impulsing relay 950, and to complete an energizing circuit for the fourth counting chain relay 1030.

Impulsing relay 950 restores and completes an operating circuit for impulsing relay 955 which operates to transmit the break period of the fourth outgoing impulse, to operate impulsing relay 950, and to release counting chain relay 1020. Impulsing relay 950 operates to release relay 955, which restores to terminate the break period of the fourth pulse, to release relay 950 and to operate the fifth counting chain relay 1040.

Impulsing relay 950 restores and completes an operating circuit to impulsing relay 955, which operates to initiate transmission of the break period of the fifth outgoing impulse, to complete an operating circuit for the impulsing relay 950, and to effect release of the fourth counting chain relay 1030. Impulsing relay 950 operates to effect the release of impulsing relay 955. Relay 955 restores to terminate the transmission of the fifth outgoing impulse, to restore the impulsing relay 950 and to complete an operating circuit for the sixth counting chain relay 1050.

Impulsing relay 950 restores to complete an operating circuit for impulsing relay 955 which operates and initiates transmission of the break period of the sixth outgoing impulse, effects operation of the impulsing relay 950, and interrupts the holding circuit for the fifth counting chain 1040. Impulsing relay 950 operates to interrupt the operating circuit for impulsing relay 955 to restore same, which relay in restoring terminates transmission of the break period of the sixth outgoing impulse, interrupts the energizing circuit for impulsing relay 950, and completes an operating circuit for the seventh counting chain relay 1060 in series with the sixth counting chain relay 1050.

Impulsing relay 950 restores to recomplete an operating circuit for impulsing relay 955 which operates an initiates transmission of the break period of the seventh outgoing impulse, completes an operating circuit for impulsing relay 950 and effects restoration of the sixth counting chain relay 1050.

Impulsing relay 950 operates to interrupt the energizing circuit for impulsing relay 955 which restores to terminate the seventh outgoing impulse, to effect the restoration of the impulsing relay 950 and to complete an operating circuit for the eighth counting chain relay 1070.

Impulse relay 950 restores to complete an operating circuit for impulsing relay 955 which operates and initiates transmission of the break period of the eighth outgoing impulse, completes an operating circuit for the impulsing relay 950 and effects the restoration of the seventh counting chain relay 1060 to interrupt the energizing circuit for the marking relay 930 to restore same for the purpose of terminating the impulse generation by relays 950 and 955 with the transmission of the required eight impulses.

Specifically, it will be remembered that the operating ground for the marking relay 930 extended over conductor 979 and contacts 1096, 1088, and contacts 1078 of the eighth counting chain relay 1070, and contacts 1009 of the register relay to ground on the "send one" conductor 985. As the counting chain is advanced to the point where the eighth counting chain 1070 relay is operated in series with the counting chain relay 1060 (as the impulsing relay 955 restores to terminate transmission of the break period of the seventh impulse) the ground on conductor 985 for marking relay 930 is extended over contacts 1009, 1067, 1077, 1088 and 1096, and conductor 979 to the marking relay 930.

Thus, as the seventh counting chain relay 1060 is restored by the impulse generating relay 955 in its initiation of the transmission of the break period of the eighth pulse, the ground for the marking relay 930 is interrupted and the restoration thereof is effected.

With the restoration of the marking relay 930, contacts 935 are opened to interrupt the energizing ground source for the impulse relay 955 to restore relay 955 the circuit of which is also opened by relay 950. Relay 955 in restoring terminates transmission of the eighth outgoing impulse and restores associated impulse relay 950. Since the starting circuit for the impulsing relays is now interrupted no further impulse generation is experienced at this time. Marker relay 930 is also effective at contacts 934 to interrupt the holding circuit for the eighth counting chain relay 1070 to restore the counting chain to normal; and at contacts 938 to complete an operating circuit for the second digit counting relay 910, in series with relay 925, the circuit extending from negative battery over the winding of relay 925, the upper winding of relay 910, contacts 928, 938, conductor 892, contacts 865, 815, conductor 888 and contacts 970 to ground.

Relay 910 operates and at contacts 911 reestablishes a shunt across contacts 956 to prevent relay 955 from transmitting pulses to the second selector 233. Relay 955 operates shortly thereafter to drive the chain 1000—1090 eight steps for an interdigital pause as explained hereinafter.

In response to the transmission of the eight impulses by the sender 231 over path 229, the first level of the second selector 233, path 234, trunk 235, path 237 to trunk 316 in exchange D, and path 318 to incoming selector 319 thereat, the incoming trunk selector 319 is operated to extend the connection over its eighth level and paths 319' and 311 to seize an idle one of the trunks such as 312, thereover. Trunk 312 operates as more fully taught hereinafter to extend the call over path 313 to trunk 416 in exchange E and path 418 to an incoming trunk selector such as 419 thereat.

I. *Generation of pause period* (*as required*)

At this time the equipment examines the nature of the digit which is registered on the effective sender register relays (relay 1007 in this example) to determine whether or not a second digit is to be transmitted. In the event that the examination indicates that a further routing digit is to be transmitted by the sender, the equipment operates at this time to introduce an interdigital pause prior to initiation of the transmission of the further digit, whereby a sufficient time period is provided to permit operation of the switches responsive to the previous digit transmitted.

In the present example, register relay 1007 is the effective register relay and the equipment is notified thereby that the call is to be extended to exchange 81 and the transmission of a second digit zero is required. Accordingly, the equipment operates to introduce an interdigital pause at this time, the specific manner of accomplishing such operation being now set forth hereat.

Examination of the digit recorded upon the sender register is effected by the marking relay 930. Specifically, as the marking relay 930 restores following transmission of the first routing digit to effect operation of the digit counting relays 910 and 925 in series, relay 910 is effective at its contacts to complete an investigatory circuit to determine whether or not an interdigital pause is required. Such circuit extends from negative battery over the winding of marker relay 930, conductor 979, contacts 1096, contacts 1009' (it being apparent that in the event that a second digit is not to be transmitted, this circuit will be interrupted at this point), conductor 984, contacts 929, 920, 909, conductor 894, contacts 867, 817, conductor 889, contacts 918, 954, 970 to ground, whereby marker relay 930 is operated to indicate to the equipment that a second digit is to be sent and accordingly that an interdigital pause should be provided. It is apparent that if a second digit is not to be sent, the operated one of the register relays will not have a set of contacts, such as 1009' in the present example, and the investigating circuit to the marking relay 930 which indicates that a pause should be sent will not be provided.

Marker relay 930 operates and at its contacts 938 interrupts the series holding circuit for the digit counting relays 925 and 910 to effect the release of relay 925, and at its make before break contacts 937 completes a holding circuit for the second digit counting chain relay 910, the circuit extending from negative battery over the lower winding of relay 910, contacts 916, 906, 937, conductor 892, contacts 865, 815, conductor 888 and contacts 970 to ground.

First digit counting relay 925 restores and at its make before break contacts 929 interrupts the investigatory circuit for the marker relay 930, and at its make before break contacts 929' completes a holding circuit for marker relay 930 extending from negative battery over the winding of relay 930, conductor 979, contacts 1096, 1088, 1078, the pause conductor 983, contacts 929', 920, 909, conductor 894, contacts 867, 817, conductor 889, contacts 939, 970 to ground. The holding circuit thus established over the pause conductor indicates to the equipment that a pause equivalent to eight impulse lengths is to be provided.

Marking relay 930 in its operation is also effective at its contacts 935 to complete the operating circuits to the impulse generating relays 950 and 955 to provide the time period which is the equivalent of the transmission of approximately eight impulses, the actual transmission of impulses over the outgoing circuit via the second selector being prevented by reason of the shunt which is imposed on the outgoing impulsing contacts 956 by the closed contacts 911 and 901 on the operated digit transmitted counting relays 900 and 910.

With the operation of relays 950 and 955, impulses are transmitted by relay 955 over conductor 977 to the sender counting chain to effect the advancement thereof to the eighth counting chain relay 1070. The advancement of the counting chain to the eighth relay by the impulsing relays 950 and 955 has been set forth heretofore, and it is not believed necessary to repeat same at this time.

As the impulsing relays 950 and 955 transmit the eighth impulse, the seventh counting chain relay 1060 is restored and the eighth counting chain relay 1070 is maintained operated. As a result of the operated condition of relay 1070, and the restored condition of relay 1060, contact sets 1078 and 1067 are opened, whereby the holding circuit for the marking relay 930 is interrupted and the restoration thereof is effected.

Marking relay 930 restores, and at its contacts 935 is effective to interrupt the initial energizing circuit for the pulsing relays 950 and 955 to terminate generation of the interdigital pause period thereby; at its contacts 934 interrupts the energizing circuit for the counting chain to effect the restoration of the operated counting chain relay 1070; and at its contacts 938 completes an energizing circuit for the second and third digit counting chain relays 910 and 900, the circuit extending from negative battery over the lower winding of relay 910, the upper winding of relay 900, contacts 915, 927, 938, conductor 892, contacts 865, 815, conductor 888 and 970 to ground. The third counting chain relay 900 operates in series with relay 910.

Relay 900 in operating opens its contacts 901 to remove the shunt on contacts 956 in preparation for the transmission of the second routing digit to the second selector 233.

J. *Transmission of the second routing digit (digit 0) by sender apparatus*

With the operation of the digit counting relay 900 in series with relay 910, the sender is automatically operative to transmit the second one of the routing digits. As previously described, the registration of the second digit "1" of the trunk code directory number in the sender register by the operation of relay 1007 indicates to the equipment that the call is to be extended to exchange F. Connections to exchange F from exchange A require two routing digits (8 and 0) and the first register relay 1007 is connected to control the sender in such manner. Specifically, it will be remembered that the first contact set 1009 of register relay 1007 is connected to contact 1078 associated with the eighth counting chain relay and accordingly the first digit transmitted by the sender was digit "8." The second contact set 1009' of register relay 1007 is connected to the lower contact set 1096 of the tenth counting chain relay 1090 and accordingly digit "0" is the second digit to be transmitted.

Specifically, as digit counting relays 900 and 910 operate, relay 900 is effective at its contacts 908 to complete an operating circuit for the marking relay 930, and thereby to initiate transmission of the second digit (0 in the present example) to route the connection through exchange E to exchange F. The operating circuit for the marking relay 930 extends from negative battery over the winding of relay 930, conductor 979, contacts 1096, 1009', "send 2" conductor 984, contacts 908, conductor 894, contacts 867 and 817, conductor 889, contacts 918, 954 and 970 to ground.

Marking relay 930 operates, locks over contacts 817, conductor 889 and contacts 939 and 970 to ground; and at its contacts 935 completes the operating circuit to the impulse generating relays 950, 955 to initiate transmission thereby of the ten impulses over the outgoing circuit to the incoming selector 419 in exchange E, the impulse transmission being effected in the same manner as set forth hereinbefore relative to the transmission of the eight impulses of the first routing digits.

With the generation of the impulses by the relays 950 and 955, the counting chain advances to the tenth counting chain relay 1090 by reason of the fact that the operating circuit for the marking relay 930 is established over contacts 1096 of the tenth counting chain relay 1090. Since advancement of the counting chain to the eighth relay by the impulsing relays 950 and 955 has been set forth hereinbefore, the operation of the counting chain thereto is obvious. As the impulse relay 955 restores to terminate transmission of the eighth impulse, it also effects release of the impulsing relay 950, and the operation of the ninth counting chain relay 1080 in series with the eighth counting chain relay 1070.

Impulsing relay 950 restores and completes an operating circuit for impulsing relay 955 which operates to initiate transmission of the break period of the ninth outgoing impulse, operation of the impulsing relay 950 and restoration of the eighth counting chain relay 1070.

Impulsing relay 950 operates to restore impulsing relay 955, which in its restoration terminates transmission of the break period of the ninth outgoing impulse, interrupts the energizing circuit for impulse relay 950, and effects energization of the tenth counting chain relay 1090 in series with the ninth counting chain relay.

Tenth counting chain relay 1090 in its operation is effective at its contacts 1096 to transfer the energizing circuit for the marking relay 930 from its original path extending from conductor 979, contacts 1096 and contacts 1009' to conductor 984; and connects it from conductor 979 over contacts 1095, 1087, 1009' to conductor 984.

As the impulsing relay 950 restores, it effects the energization of impulsing relay 955 which operates to initiate the transmission of the tenth impulse, to complete an operating circuit for the impulse relay 950, and to restore the ninth counting chain relay 1080.

Impulsing relay 950 operates to effect release of impulsing relay 955 which terminates the tenth outgoing impulse and interrupts the energizing circuit for relay 950 to restore same.

As the ninth counting chain relay 1080 restores, the holding circuit for the marking relay 930 is interrupted to effect the restoration thereof, which relay in restoring is effective at its contacts 935 to interrupt the original energizing circuit for the impulsing relay 950 and 955 to terminate impulse generation thereby.

As marking relay 930 restores it is also effective at its contacts 934 to interrupt the holding circuit for the tenth counting chain relay 1090 to thereby reset the counting chain for further use.

The ten outgoing impulses thus generated and transmitted by the sender unit 231 over path 229, the first level of second selector 233, path 234, trunk 235 and path 237 to trunk 316 in exchange D, path 318, the eighth level of incoming trunk selector 319, paths 319' and 311, trunk 312 and path 313 to trunk 416 in exchange E, and path 418 to operate the incoming trunk selector 419 thereat to extend the connection over the tenth level and path 413 to trunk 412 which operates as hereinafter described to extend the connection over path 415 to trunk 423 in exchange F, which extends the connection over path 435 to an incoming trunk connector such as 426 thereat.

The connection has now been extended from exchange A over exchanges D and E to the desired exchange F, and the connector switch 426 at exchange F has been seized for control by the calling party at exchange A in extending the call.

K. *Receipt of first digit of calling party number*

During the period that the sender is automatically routing the connection over the trunks to the desired one of the exchanges in accordance with the trunk code directory number originally dialed by the calling subscriber, the calling subscriber is dialing his directory number for recording purposes and the sender as operated thereby is transmitting the impulses of the calling line number to the check line to establish a test connection to the calling line for line number verification purposes.

It will be remembered that the transmission of the routing impulses by the sender was automatically initiated responsive to the receipt of the first impulse of the first digit of the calling party's directory number, recorder line relay 520 having restored with receipt of the break period of the first impulse to close circuits for pulse corrector relay 620, digit following relay 555 and punch magnet 697 simultaneously. Relay 555 operated relay 560 which released relay 810, operating relay 930 which controlled the pulsing of relays 955 and 950, driving the chain 1000—1090 for control of the first routing digit. Pulse corrector relay 620 in its operation and release operated and released sender drive relay 880, which transmitted the first impulse to the check line.

Continuing now with the operation of the recorder-sender with receipt of the further impulses representing the calling party number, and specifically with receipt of the first make period following the first break period, the recorder line relay 520 is reoperated, and at its contacts 521 interrupts the holding circuit for the second impulse correcting relay 625 to restore same in the event that the step magnet has not restored previously to release same.

With receipt thereafter of the break period of the second impulse of the calling party directory number, the recorder relay 520 is restored, and is effective at its contacts 521 to recomplete the energizing circuit for the digit following relay 555 (which is still in the operated position as a result of its slow to release characteristics), to complete a circuit to the first impulse correcting relay 620 to effect the operation thereof; and to simultaneously complete an energizing circuit for the punch magnet 697.

First pulse correcting relay 620 operates, and at its contacts 623 completes the energizing circuit as before to the sender drive relay 880. Sender drive relay 880 operates and at its contacts 882 repeats the impulse over the conductors 802 and 803 to the seized link equipment 761 to operate the selector thereat in the conventional manner.

Punch magnet 697 operates to punch one hole in the tape (the second one of this digit), and at its contact 698 completes an operating circuit for the step magnet 643. Step magnet relay 643 operates and at its contacts 644 completes an operating circuit for the second impulse correcting relay 625, which operates, and at its contacts 629 interrupts the circuit for the first impulse correcting relay 620, and also interrupts the energizing circuit for the punch magnet 697 and the digit following relay 555. Impulse correcting relay 620 restores to release sender relay 880 and terminate the break period of the second impulse to the check line. Digit following relay 555 remains operated by reason of its slow-to-release characteristics. Punch magnet 697 restores, and at its contacts 698 interrupts the holding circuit for the step magnet 643 which restores and advances the tape one step. At this time then, the perforations have been placed on the tape to represent the first digit of the calling party number.

With receipt of the make period following the break period of the second impulse, the recorder line relay 520 reoperates and at its contacts 521 interrupts the holding circuit for the second impulse correcting relay 625 in the event that the step magnet 643 has not restored previously to accomplish same at its contacts 644.

After the expiration of a predetermined period of time following the reoperation of relay 520, the digit following relay 555 restores and at its contacts 556 completes an operating circuit for the step magnet 643 to energize same, the circuit extending from negative battery over the winding of the step magnet 643, contacts 638, 648, conductor 607 contacts 561 and 556 to negative battery; and at its contacts 557 interrupts the holding circuit for the slave relay 560, which remains operated for a predetermined period determined by its slow to release characteristics. After the elapse of a predetermined period, relay 560 restores and at its contacts 561 interrupts the holding circuit for the step magnet 643 to restore same, which magnet in its restoration effects the advancement of the tape one step to thereby impress upon the tape an interdigital space following the two perforations which are representative of the first digit of the calling party directory number.

Relay 560 in restoring is also effective at its contacts 563 to complete a series operating circuit for the second and third sender counting chain relays 820 and 830, the circuit extending from negative battery over the lower winding of relay 820, the upper winding of relay 830, contacts 823, 811, conductor 818, contacts 687, conductor 616 and contacts 563 to ground to effect the operation thereof.

The switching equipment in the selector 765 of the seized link 761 is automatically operative in conventional manner responsive to the prolonged pause between digits to seize an idle one of the connector switches of the second group such as 763, and extend the connection thereto. Upon seizure, connector 763 places ground upon the test wire, replacing that of selector 765 as said selector cuts through. This ground extends back through selector 765 and line-finder 761' to check line 232 and thence to test wire 801.

L. *Receipt of second digit of calling party number by recorder*

As the subscriber now dials the second digit of his directory number (digit 3 herein) the recorder equipment places a corresponding number of perforations (3) on the tape member.

Specifically, with receipt of the break period of the first impulse, the recorder line relay 520 is restored and at its contacts 521 effects the completion of an energizing circuit for the first pulse corrector relay 620, the digit following relay 555, and the punch magnet 607 in the manner heretofore described.

Pulse corrector relay 620 operates, and at its contacts 623 completes the operating circuit for the sender relay 880 which operates, and at its contacts 882 transmits the first impulse of the second digit over the check line to the connector 763.

Digit following relay 555 operates and at its contacts 557 completes an operating circuit for the slave relay 560, which operates, and at its contacts 563 interrupts the series energizing circuit for the second and third counting chain relays 820 and 830 in the sender to effect the restoration of relay 820, the third counting chain relay 830 being maintained operated over the circuit extending from negative battery over the lower winding of relay 830, contacts 834, 845, 859', conductor 885, contacts 688, conductor 615 and contacts 562 to ground.

Punch magnet 697 operates and places the first hole representing the second digit in the tape member, and at its contacts 698 completes an energizing circuit for the step magnet 643, which operates, and at its contacts 644 controls operation of the second pulse corrector relay 625. Second impulse corrector relay 625 operates, and at its contacts 629 interrupts the holding circuit for the first impulse correcting relay 620, the punch magnet 697 and the digit following relay 555. Impulse correcting relay 620 restores and at its contacts 623 effects restoration of sender relay 880 to thereby terminate transmission of the first impulse of the second digit to the check line. Digit following relay 555 remains operative by means of its slow to release characteristics.

Punch magnet 697 restores and at its contacts 698, effects the restoration of step magnet 643 which in restoring effects advancement of the tape one step preparatory to receipt of the next perforation.

With receipt of the first make after the first break impulse, the recorder line relay 520 operates, and at its contacts 521 interrupts the holding circuit for the second impulse corrector relay 625 to restore same in the event that the step magnet 643 did not restore first.

With the receipt of the break period of the second impulse, recorder relay 520 restores to complete an energizing circuit for the first impulse correcting relay 620, punch magnet 697, and the digit following relay 555 in the manner heretofore described.

Impulse corrector relay 620 operates, and at its contacts 623 completes an operating circuit for the sender drive relay 880. Sender drive relay 880 operates and at its contacts 882 initiates transmission of the break period of the second impulse over the seized link 761 to the connector 763.

Punch magnet 697 operates to place the second hole of the digit on the tape, and at its contacts 698 effects the operation of the step magnet 643, which in turn, at its contacts 644, effects the operation of the second impulse corrector relay 625. Relay 625 operates to restore the first pulse corrector relay 620 and the punch magnet 697. Pulse corrector relay 620 restores to release sender relay 880 as before, and thus terminates transmission of the second impulse to the check line. Digit following relay 555 holds by reason of its slow to release characteristics. Punch relay 697 in restoring interrupts the holding circuit for step magnet 643 which restores to advance the tape one step in preparation for the next impulse.

As the make period following the second break period is received, the recorder line relay 520 operates and at its contacts effects release of the second impulse corrector relay 625 in the event that the step magnet 643 has not previously restored to release same.

With receipt of the break portion of the third incoming impulse, line recorder relay 520 once more restores and at its contacts completes an energizing circuit for the first impulse correcting relay 620, digit following relay 555 which has remained in the operated position and punch magnet 697 as before described.

Impulse corrector relay 620 operates and at its contact 623 completes an operating circuit for the sender drive relay 880, which operates to initiate transmission of the third impulse to the check link.

Punch relay 697 operates to punch the third hole in the tape for the incoming digit and simultaneously at its contacts 698 completes an operating circuit for the step magnet 643, which in turn operates, and at its contacts 644 completes an operating circuit for the second impulsing relay 625.

Relay 625 operates, and at its contacts 629 interrupts the energizing circuit for the first pulsing relay 620, digit following relay 555, and the punch magnet 697. Pulsing relay 620 restores to release sender relay 880 and thereby terminate transmission of the third impulse to connector 763 via the check line. Shortly thereafter, a slow release relay analogous to recorder relay 555 in connector 736 releases effecting selection of the tens relay in the connector. Digit following relay 555 holds for a given time period thereafter. Punch magnet 697 restores to release the step magnet 643 which restores and effects the advancement of the tape one step.

With receipt of the make portion following the break portion of the third impulse, line recorder relay 520 operates, and at its contacts 521 interrupts the holding circuit for the second impulse correcting relay 625 to restore same, in the event that the step magnet 643 has not restored first.

After the elapse of a time period corresponding to the release characteristics of the slow to release relay 555 as a result of the open circuit effected by line relay contacts 520 responsive to receipt of the interdigital pause, relay 555 restores and at its contacts 556 completes the operating circuit to the step magnet 643 heretofore described to effect the energization thereof and to simultaneously interrupt the holding circuit for its slave relay 560. After the elapse of the predetermined time period as determined by its release characteristics, relay 560 restores and at its contacts 561 interrupts the holding circuit for the step magnet to effect the restoration thereof, and at its contacts 563 completes the series energizing circuit for the third and fourth counting chain relays 830 and 840, the circuit extending from negative battery over the lower winding of relay 830, the upper winding of relay 840, contacts 833, 822, 811, conductor 818, contacts 687, conductor 616, contacts 563 to ground.

Step magnet 643 restores and effects the advancement of the tape one step to provide an interdigital space following the three perforations on the tape which represent the second digit (3) of the calling party directory number.

M. *Receipt of third digit of calling party number*

As the calling subscriber now dials the third digit of the directory number (digit 1), the incoming impulse representative thereof is automatically recorded on the tape equipment via the recorder 225.

Specifically, with receipt of the first break period of the single incoming impulse representative of the third digit (1), the recorder line relay 520 restores, and at its contacts 521 completes the energizing circuit for the first impulse corrector relay 620, the digit following relay 555 and the punch magnet 697 as before.

The impulse corrector relay 620 operates and at its contacts 623 completes an energizing circuit for the sender drive relay 880 which operates to transmit a corresponding impulse over the check line to the connector such as 763 seized thereby.

Digit following relay 555 operates and at its contacts 557 completes an operating circuit for its slave relay 560 which operates, and at its contacts 563 interrupts the holding circuit for the third and fourth counting chain relays 830 and 840 to effect the restoration of the third counting chain relay 830. The fourth counting chain relay 840 is held over the circuit extending from negative battery over the lower winding of relay 840, contacts 844, 859', conductor 885, contacts 688, conductor 615, contacts 562 to ground.

Punch magnet 697 operates to place a single perforation in the tape, and at its contacts 698 completes an operating circuit for step magnet 643, which operates and at its contacts 644 completes an operating circuit for the second impulse corrector relay 625.

Relay 625 operates and at its contacts 627 and 629 interrupts the holding circuit for the first impulse corrector relay 620, digit following relay 555 and the punch magnet 697. Impulse relay 620 restores to release sender relay 880 to thereby terminate transmission of the first and only impulse of the third digit to connector 763. After the slow release relay before mentioned in the connector releases, units selection is accomplished in the connector in the conventional manner. Punch magnet 697 restores and at its contacts 698 effects restoration of the step magnet 643 which in restoring effects the advancement of the tape one step.

As the interdigital pause following the break portion of the single incoming impulse is received, recorder line relay 520 operates and at its contacts 521 interrupts the holding circuit for the second impulse corrector 625 to effect the restoration thereof in the event that the step magnet 643 has not restored first.

Line relay 520 is held operated for a period of time by the interdigital pause which is sufficient to restore digit following relay 555 to thereby close its contacts 556 and complete the operating circuit to the step magnet 643. Digit following relay 555 at its contacts 557 interrupts the holding circuit for slave relay 560.

After a predetermined period of time determined by its characteristics, the slave relay 560 restores to interrupt the energizing circuit for the step magnet 643, which restores and effects advancement of the tape one step. At this time the third digit (1) of the calling party directory number has been recorded, and an interdigital space has been placed on the tape thereafter.

In response to the interdigital pause following transmission of the third digit into the check link, connector 763 thereat is operative upon units selection to extend a test connection to the test wire of the line indicated by the digits received from the calling subscriber in the manner set forth in the previously identified copending application. Accordingly, if he has dialed his own directory line number, the test connection will be extended to his line.

The counting chain in the sender is now operative to transmit a signal via the line circuit 232, line finder 761', selector 765 and connector 763 to verify the connection established and thereby the accuracy of the line number dialed.

It will be apparent that the check is made by the fifth counting chain relay 850, in the present example, in that the directory numbers of subscribers in the local exchange A have been assumed to be four digit numbers, three of which are required to reach the line, the fourth digit being a party ring digit. Summarily, sender relay 810 operated on the break of the first pulse of the second digit of the trunk code directory number (1). Relay 820 operated in series with 810 at the end of the digit. Relay 810 released on the break of the first pulse of the first digit (2) of the calling party directory number and relay 830 operated in series with 820 at the end of this digit. Relay 820 released on the break of the second digit (3) of the calling number and relay 840 operated in series with 830 at the end of this digit. Relay 830 released on the break of the pulse of the third digit (1) which is the units digit of the calling number and at the end of this digit, relay 850 operates in series with 840 as will be explained presently. In 10,000 line exchanges in which second selectors are used, it is apparent that the duties assigned to the fifth counting chain relay 850 herein would be assigned to a sixth counting chain relay, in that the test connection to the calling line circuit would not be completed until the fourth number is dialed. Corresponding modification of the counting chain would be effected in accordance with the number of digits in the subscriber directory numbers.

Thus, in more detail, as the slave relay 560 restores to effect advancement of the tape after recording of the third digit it is also effective at its contacts 563 to complete an operating circuit for the fifth counting chain relay 850, the circuit extending from negative battery over the lower winding of relay 840, the upper winding of relay 850, contacts 843, 832, 822, 811, conductor 818, contacts 687, conductor 616 and contacts 563 to ground.

The fifth counting chain relay 850 operates in series with relay 840 and at its contacts 856 extends the ground on the test wire P (i.e. lead 801) of the check line 232 over contacts 874 and conductor 702 to the check tone of circuit 700 of Figure 7. This ground on lead 702 is immediately extended through contacts 715 and low resistance coils 737′ and 730′ to lead 701.

N. *Check tone circuit*

Check tone circuit 700 is provided to transmit a test signal over the test connection established as a result of the dialing by the calling subscriber of his directory number to ascertain the accuracy of the number dialed.

As shown in Figure 7, the check tone circuit basically comprises an electronic tube member 735 connected in an oscillating circuit arrangement, and a series of three checking relays 710, 720 and 725 which are operative to check the operation of the oscillating circuit each time it is seized by a sender such as 231 or a trunk such as 204 and to provide corresponding signals of its condition to the seizing equipment. Conductors 701 and 702 are arranged to connect the check tone circuit to recorder equipment as seized thereby.

In the illustrated embodiment the oscillator circuit comprises an electronic tube 735 which is commercially available as a 50L6 having a plate, screen, grid and cathode therein. The plate is connected over a .01 mf. condenser, to an LC circuit comprising a 3.5 mh. coil and a .05 mf. capacitor. The output of the LC circuit is arranged to be selectively connected to the grid-cathode circuit of the electronic tube 735 over a circuit comprising a 9 mh. coil, an .01 capacitor, and a 680 ohm resistor. A 47,000 ohm resistor 733 and a .25 mf. capacitor 734 are connected in the tube grid return circuit. Rectifier 738 which may be of the type commercially available as an 1N48 is connected between the output of tube 735 and the grid-cathode circuit thereof. The screen grid of tube 735 is connected to positive battery through a 22 ohm resistor in conventional manner.

A control relay 720 is connected in the output circuit of the electronic tube 735 and operatively controlled thereby. Second and third control relays 710 and 725 are operative in cooperation with relay 720 to make the tone test and to indicate certain alarm conditions. With the tone circuit in the idle condition tube 735 conducts sufficient current (30–40 ma.) to effect operation of the control relay 720 which is connected in the plate circuit thereof. Relay 720, as normally operated, is effective at its contacts 721 to hold the alarm circuit 704 and the circuit of relay 710 open, and at its contacts 723 to prepare the operating circuit for associated control relay 725. With relays 710 and 725 restored, contacts 715 and 729 thereof are closed to short circuit the output of the LC circuit 737—737′ to prevent operation of the oscillator circuit.

As the counting chain in the sender advances to the fifth counting chain relay 850 following receipt of the first three digits (i.e. hundreds, tens and units) of the calling subscriber directory number, it is effective at its contacts 856 to extend the ground on the test conductor lead 801 over contacts 874, conductor 702, contacts 715, and contacts 714 and 723 to the winding of control relay 725 and battery. At contact 853 and 854 relay D5 transfers the holding ground on the test wire for the originating end from ground through 853 to ground from connector 763 via the check line 232. Whereas prior to this time ground through contacts 853, 872, conductor 836, contacts 679′, conductor 594, contacts 526, lead 503 via path 266 group and units contacts local first selector 222, and units and tens relay contacts in linefinder 221′ held the cut-off relay (not shown) in the line circuit 219, and the cut-through relay (not shown) in the local first selector, at this time the ground circuit is as follows: ground through contacts **763*d* and choke coil 763*a* in connector 763, through group and units contacts of selector 765, through tens and units contacts of line-finder 761′ via path 232, conductor 801, contacts 856, 874, lead 702, coil 737′, coil 730′, lead 701, contacts 854, 872, lead 836, contacts 679′, lead 604, contacts 594, 526, lead 503 via path 226, group and unit contacts in the local first selector 222, and units and tens relay contacts in linefinder 221′** which ground holds operated the cut-off relay in the line circuit and the cut-through relay in the first selector.

Furthermore it should be observed that the connector 763 through the units and tens relay contacts of the outgoing end has made connection with the test wire 503 if the calling subscriber has dialled his own number accurately. Ground on conductor 503 causes connector 763 to receive a busy signal and contacts **763*c*** do not close.

It is also noted that the local connectors have been modified by the insertion of a ¼ mf. condenser between the incoming and outgoing P-wires to provide an alternating current path through the connectors for tone test described hereinafter.

Relay 725 operates and at its contacts 726 interrupts a further point in the circuit to the alarm system, at its contacts 727 prepares the second relay 710 for operation, at its contacts 728 locks to the test wire ground conductors 701 and 702, and at its contacts 729 removes the short circuit which is normally impressed upon the output side of LC circuit 737. A portion of the output of tube 735 is now connected back to the grid input thereof over contacts 715 and the tube oscillates at a frequency at about 10 kc. The oscillating voltage is rectified by rectifier 738 which impresses a bias voltage through on coil of 730 and a grid resistor upon the grid of tube 735 which reduces the plate current to approximately 3 or 4 ma., and thereby effect the restoration of the control relay 720 which is connected in the plate circuit thereof.

As control relay 720 restores, it is effective at its contacts 721 to complete an obvious energizing circuit for associate relay 710, and at its contacts 723 interrupts the initial energizing circuit for the associate relay 725 which remains held over its locking circuit heretofore described.

Associate relay 710 operates and at its contacts 711 interrupts a further point in the circuit to the alarm equipment, and at its contacts 715 interrupts the local circuit for the oscillator tube 735 and connects the plate grid feedback circuit serially to the incoming conductors 701 and 702.

Assuming that the subscriber has accidentally or fraudulently dialed a line number different than that of his assigned directory line number, the plate grid feedback loop, e.g. the test loop over the test conductor circuits aforedescribed, will not be completed and the plate circuit of the tube 735 will not be connected to the grid, whereby operation of the oscillator will be interrupted, the biasing voltage on the grid occasioned by rectified current through 738 will disappear allowing the tube to conduct 30–40 ma. again, and the control relay 720 connected in the plate circuit of tube 735 is operated. In such event, all three of the relays 710, 720 and 725 will be in the operated condition, relay 710 holding over contacts 712, 722, and 727; and the test wire ground. The test wire ground as extended to conductors 701 and 702 is applied to the call interrupting conductor 703 over contacts 728, 723 and 713. The ground as applied to conductor 703 is further extended over contacts 855, 873, conductor 837, and contacts 695 to the winding of the "non-check" relay 630 in the recorder to operate same.

Non-check relay 630 operates, and at its contacts 631 connects busy tone over conductor 600, contacts 591 and capacitor 578 to the positive conductor 501 of the connection to inform the calling subscriber that the connection is terminated; at its contacts 633 locks up over a holding circuit which extends from negative battery over the winding of relay 630, contacts 633, conductor 612, contacts 598 and 527 to ground; and at its contacts 634 interrupts the holding circuit for the sender connect relay 685 to effect the restoration thereof. Sender connector relay 685 restores and at its contacts releases the sender equipment.

In response to receipt of the busy tone signal, the calling subscriber restores the hand set at his associated substation whereupon the loop extending to the recorder is interrupted, and the recorder line relay 520 restores the recorder equipment in a manner to be more fully described hereinafter. As will appear thereat, with the restoration of the equipment by the calling party, the stepping magnet is operated to advance the tape a number of steps to punch an intercall spacing on the tape. (See Section T–1.)

In the event that the calling party has correctly dialed his assigned directory number (exclusive of the ring digit which has not as yet been dialed), as the counting chain relay 850 operates to seize the two circuits as described above, it is also effective at its contacts 854 and 856 to extend the P wire 801 of the check line over contacts 856 and 874 to conductor 702 of the tone check circuit 700, over windings 737' and 730', conductor 701, contacts 854, 872, conductor 836, contacts 679', conductor 604, contacts 594 and 526 to the P wire 503 of the link used in the initiation of the call.

It is apparent that if the calling subscriber has dialed his own number (and only then), a test connection is completed from the substation line circuit, the check links, the sender, the tone circuit, the sender, the recorder and the calling link back to the calling line circuit. With reference to Figure 12 this circuit is as follows: calling P-wire of line 2312 through tens and units contacts of line-finder 221, units and group contacts of selector 222, lead 503, contacts 526, 594, 679', lead 836, contacts 872, 854, lead 701, coil 730', coil 737', lead 702, contacts 874, 856, test lead 801 of test line 232, tens and units contacts of line-finder 761', units and tens contacts of selector 765, condenser **763*b* which has been inserted in connector 763, units and tens contacts of connector 763, the called P-wire of line 2312 and back to the calling P-wire of line 2312**.

With reference to the tone check circuit, it is apparent that with the connection of incoming conductors 701 and 702 in a completed circuit in this manner (either directly or through a condenser), the output of the tube 735 is connected to the grid circuit of tube 735, even though the local circuit through contacts 715 is removed, whereby the tube 735 will continue to oscillate. The oscillation of tube 735 maintains control relay 720 in the non-operated condition and the circuit for the non-check relay 630 is not completed, and the calling subscriber may then dial the ring digit of his number.

The tone circuit 700 is thus operative to determine with the check line circuit the accuracy of the directory number dialled by the calling party.

As a safeguard against improper operation of the equipment in the event of failure of tube 735, control relay 720 is connected to initiate the sounding of an alarm and thereby notify the attendant of the faulty condition. Specifically, in the event of tube failure, control relay 720 restores and at its contacts 721 applies ground over contacts 726 and 711 to alarm circuit 704. Thus with tube 735 inoperative, control relay 720 will be restored, contacts 723 will be open, relay 725 cannot be operated, relay 710 cannot be operated, ground cannot reach lead 703, and recorder relay 630 cannot operate, and accordingly all calls will be extended through the exchange regardless of whether or not the correct calling number has been dialed. All three control relays 710, 720 and 725 must be operated to terminate a connection as the result of the incorrect dialing of a calling party number, and since relay 720 is inoperative as the tube fails, the calls cannot be interrupted.

With operation of the fifth counting chain relay 850 to initiate the checking operation, contacts 851 were operated to interrupt the holding circuit for the slow to release check line relay 870. The checking of the number dialled by the calling subscriber is effected in the above manner during the period of release of the check relay 870.

If the number has been dialed correctly, the sender will still be engaged by the recorder 225 as check relay 870 restores. In the event that the calling number was inaccurately dialed, the relay 685 will have released the sender equipment in the manner described before check relay 870 restores.

As the predetermined period of time has elapsed, the check relay 870 restores, and at its contacts 872–875 interrupts the holding circuit for the check line and tone circuits to effect the release thereof. Line circuit 760, line-finder 761', selector 765 and connector 763 release. Ground to hold incoming selector 272, line-finder 221' and line circuit 219 is then supplied over contacts 689, lead 829, contacts 852, 871, lead 836 etc.

O. *Receipt of fourth digit of calling party number*

As the fourth and last digit (the ringing digit) of the calling party directory number is now received at the recorder, the digit is registered upon the tape member by the recorder in the manner of previous digits.

Briefly, as the calling subscriber dials the ringing digit (in this example, digit 2) with the receipt of the first break impulse of the first digit at the recorder, line relay 520 restores to complete the series operating circuit as before for the first impulse correcting relay 620, the digit following relay 555 and the punch magnet 697.

Pulse following relay 620 operates and at its contacts 623 operates the sender relay 880 without avail at this time in that the sender relay 870 and the check line are now restored. Digit following relay 555 operates and at its contacts 557 completes the operating circuit to the slave relay 560, which operates and at its contacts 563 interrupts the series holding circuit for the fourth and fifth counting chain relays 840 and 850, and at its contacts 562 simultaneously completes a holding circuit for the fifth counting chain relay 850. Counting chain relay 840 restores.

Punch magnet 697 operates to punch a hole in the tape, and at its contacts 698 completes an operating circuit for step magnet 643, which operates and at its contacts 644 completes an operating circuit for the second impulse correcting relay 625.

Relay 625 operates and at its contacts 627 and 629 interrupts the holding circuit for the first impulse relay 620 and the punch magnet 697 to restore same. Punch magnet in restoring is effective at its contacts 698 to restore the stepping magnet 643 which restores and advances the tape one step.

With receipt of the make period following the first break period of the incoming impulses, the recorder line relay 520 operates, and at its contacts 521 interrupts the holding circuit for the second impulse corrector relay 625 to restore same in the event that the step magnet 643 has not restored first.

As the break period of the second impulse is received at the recorder, line relay 520 restores and at its contacts 521 completes an energizing circuit for the first impulse corrector relay 620, digit following relay 555 (which has remained operated) and the punch magnet 697.

Impulse corrector relay 620 operates, and at its contacts 623 completes an operating circuit for the sender relay 880 which once more operates without function in that the check link has been restored.

Punch magnet 697 operates to punch a second hole in the tape, whereby the digit "two" is now recorded thereon, and at its contacts 698 completes an energizing circuit for the stepping magnet 643 which operates, and at its contacts 644 completes an energizing circuit for the second impulse corrector relay 625.

Relay 625 operates, and at its contact 629 interrupts the holding circuit for the first impulse correcting relay 620 and the punch magnet 697 to restore same.

Punch magnet 697 restores and at its contacts 698 interrupts the holding circuit for step relay 643 which restores and advances the tape one step.

P. *Pause after dialing of calling party number*

With the receipt of the make period following the break period of the second impulse at the recorder, line relay 520 operates and at its contacts 521 interrupts the holding circuit for the second impulse corrector 625 to restore same in the event that the step magnet 643 has not restored first.

The recorder line relay 520 is maintained operated responsive to the pause following the dialing of the last digit of the calling party number, and at its contacts 521 opens the circuit for the digit-following relay 555. After the expiration of a predetermined period of time as determined by its operating characteristics, digit-following relay 555 restores, and at its contacts 556 completes an operating circuit to the step magnet 643, and at its contacts 557 interrupts the holding circuit for its associated slave relay 560.

After the lapse of a predetermined period of time determined by its slow to release characteristics, slave relay 560 restores, and at its contacts 561 interrupts the holding circuit for the step magnet 643 to cause same to restore and advance the tape one step.

Q. *Sender release*

At this time the equipment operates in two alternative manners, that is if the sender has not completed the sending operation, the equipment is operative to drop the sender and extend busy tone to the calling party. However, if the sender has completed the transmission of the call extension digits, the sender equipment effects operation of the step magnet three times to effect advancement of the tape three more steps, whereby the equivalent of four spaces is imposed upon the tape between the calling and called numbers, and then releases.

The purpose of releasing the sender in the event that the sender has not finished transmission of its traffic routing digit or digits by the time the subscriber has finished his own number is to guard against the subscriber beating the sender and obtaining a wrong number or an incomplete connection.

This alternative operation of the equipment occurs with the restoration of the slave relay 560 to advance the step magnet 643 as above described, slave relay 560 being operative at its contacts 563 to initiate the operation indicated by the condition of the equipment.

In more detail, if the sender has not completed the transmission of its traffic routing digits as the digit-following relay 560 restores, one or more of the sender routing relays 900, 910 or 925 will be in the operated condition and a circuit will be completed for the "noncheck" relay 630, the circuit extending from negative battery over the winding of relay 630, contacts 695, conductor 837 and conductor 837', certain of contacts 933, 912, 913, 902 and 903 (depending upon which of the sender relays 900, 910, 925 is operated at the time), conductor 878, contacts 862, 857, 842, 832, 822, 811, conductor 818, contacts 687, conductor 616 and contacts 563 to ground.

As relay 930 operates at the initiation of transmission of the first digit an operating circuit which extends over contacts 933 and 902 is completed for relay 925. At the end of the digit transmission, relay 930 releases and relay 910 operates, relay 930 being effective at contacts 933 to open the guard circuit to relay 630. If another digit is to be sent, however, relay 930 reoperates in turn releasing relay 925. The operation of relay 930 recloses the guard circuit which again passes through contacts 933 and 902. A short unguarded interval occurs between the release and reoperation of relay 930 without effect. As described hereinbefore, the sender chain 1000—1090 counts off eight steps to generate a pause between the first and second digits, at the end of which 930 releases and relay 900 operates. A short unguarded interval occurs between the release of relay 930 and the operation of relay 900 without effect. After relay 900 operates, the guard circuit passes over contacts 913 and 903. Follow-the operation of relay 900, relay 930 reoperates to initiate sending of the second digit and to effect the release of relay 910. With the release of relay 910, the guard circuit is extended over contacts 933, 912, and 903, and with the completion of transmission of the second digit, relay 930 releases and the guard circuit is opened.

Noncheck relay 630 operates and at its contacts 634 interrupts the energizing circuit for the sender control relay 685 to restore same, which relay in its restoration is effective at its contacts 686—696 to release the sender 231 from its connection with the recorder unit 225; at its contacts 631' starts the busy tone circuit and at its contacts 631 effects the connection of busy tone to the positive conductor 501 to extend same to the substation of the calling subscriber, who thereupon restores his hand set to the substation and effects the release of the equipment in the manner hereinafter more fully described.

Assuming that the sender 231 has completed the transmission of the traffic routing digits as the associate digit-following relay 560 restores following receipt of the fourth digit of the calling party number, sender routing relays 900, 910, 925 and 930 will be in such position as previously described to open the guard circuit and an operating circuit will be completed for the sixth counting chain relay 860 instead of the noncheck relay 590 as above.

Specifically as digit following relay 560 restores it is effective at its contacts 563 to complete a circuit to the sixth counting chain relay 860 in series with the fifth counting chain relay 850, the circuit extending from negative battery over the lower winding of relay 850, the winding of relay 860, conductor 879, contacts 932, 912, 903, conductor 878, contacts 862, 857, 842, 832, 822, 811, conductor 818, contacts 687, conductor 616 and contacts 563 to ground. Relay 860 locks over contacts 863, in the manner previously described. If it had been necessary to send only one digit, 925 and 910 would have been operated in series, and relay 860 would have been operated over contacts 932 and 902.

Counting chain relay 860 operates and at its contacts 864 and 866 completes an operating circuit over the "start" conductor 981 for the marker relay 930, the circuit extending from negative battery over the winding of relay 930, conductor 979, contacts 1096, 1088, 1078, 1068, 1058, 1048, 1038, 1028, 1018, 1006, start conductor 981, contacts 944, conductor 891, contacts 864, contacts 815, conductor 888, and contacts 970 to ground.

Marker relay 930 operates in the manner of its operation subsequent to the transmission of the trunk code to step the magnet three times whereby a four space interval is provided between the calling and called telephone number as recorded on the tape, its operating circuit being as follows: battery through the winding of relay 930, conductor 979, contacts 1096, 1088, 1078, 1068, 1058, 1048, 1038, 1028, 1018, 1006, conductor 981, contacts 944, conductor 891, contacts 864, 815, conductor 888, and contacts 970 to ground.

Briefly, marker relay 930 operates and at its contacts 939 completes an operating circuit for the tape spacing relay 940, the circuit extending from negative battery over the winding of relay 940, contacts 946, conductor 893, contacts 866, 817, conductor 889 and contacts 939 and 970 to ground. Tape space relay 940 operates and at its contacts 944 interrupts the operating circuit for the marker relay 930 as extended over the "start" conductor 981, locks over contacts 943, conductor 891, contacts 864, 814, conductor 888, and contacts 970 to ground and in turn extends a holding circuit for marker relay 930 over three step conductor 982, the circuit extending from negative battery over marker relay 930, conductor 979, contacts 1096, 1088, 1078, 1068, 1058, 1048, 1038, 1028, three step conductor 982, contacts 945, conductor 893, contacts 866, 817, conductor 889, contacts 939, 970 to ground. Marker relay 930 at its contacts 935 completes an energizing circuit for the sender pulsing relays 950 and 955 to effect the generation and transmission thereby of three impulses to the stepping magnet 643, the energizing circuit for the first pulse relay 955 extending from negative battery over the upper winding of relay 955, contacts 953 and 935 to ground. Inasmuch as the operation of the pulsing relays 955 and 950 in the control of the stepping relays to provide three steps on the tape has been heretofore described, the circuit details will be omitted and only the sequence of relay operation will be set forth at this time.

Briefly, relay 955 operates to energize relay 950 and first counting chain relay 1000. Relay 950 operates to release relay 955 and energize the step magnet 643. Relay 655 releases to restore relay 950 and energize the first and second counting chain relays 1000 and 1010 in series. Relay 950 restores to restore the step magnet 643 and advance the tape one step and to effect the energization of relay 955.

Relay 955 operates to operate relay 950 and restore first counting chain relay 1000. Relay 950 operates to effect energization of the stepping magnet 643 and release of relay 955. Relay 955 restores to release relay 950 and complete a series energizing circuit for the second and third counting chain relays 1010 and 1020. Relay 950 restores to energize relay 955 and to restore step magnet 643 which advances the tape a second step.

Relay 955 operates to energize relay 950 and restore the second counting chain relay 1010. Relay 950 operates to energize the stepping magnet 643 a third time and to restore relay 955. Counting chain relay 1010 restores and as its contacts 1017 opens the operating circuit for marking relay 930, the alternative circuit therefore being opened at its open contacts 1028 of the third counting chain relay 1020.

Marking relay 930 restores and at its contacts 935 interrupts the energizing circuit for pulsing relay 955 to terminate the generation of impulses by relays 950 and 955, and at its contacts 934 interrupts the holding circuit for the third counting chain relay 1020 to effect the restoration thereof, which counting chain is fully restored.

As relay 955 restores, it effects release of relay 950 which restores the step magnet 643 to effect the advancement of the tape a third step. Inasmuch as the marking relay 930 has restored and the energizing circuit for the pulsing relays 950 and 955 is interrupted thereby, no further impulse generation is effected. As relay 950 restores in its final operation, it is effective at its contacts 951 to complete an operating circuit for sender release relay 590, the circuit extending from negative battery over the winding of relay 590, conductor 611, contacts 693, conductor 828, contacts 861, conductor 838, contacts 931, 951 and 941 to ground.

Sender release relay 590 operates, locks over contacts 597 and 527 to ground; and at its contacts 598 interrupts the holding circuit for the sender control relay 685, which restores and at its contacts 686—696 releases the connection of the sender 231 to the recorder unit 225; any operated sender relays releasing.

As relay 590 operates, transmission wires are connected to leads 601 and 602′ and thence to second selector 233 via contacts 592 and 594 respectively whereby coil 568 connected across leads 601 and 602′ holds the second selector. Relay 590 at contacts 594 and 595 transfers the P-wire circuit of lead 503, contacts 595 and 581 to ground. When relay 685 releases, the loop circuits into the sender are disconnected.

The selector 233 is then held over the following path: conductor 601.

Had the calling party started dialing the called number while relay 930 was operated during the placing of steps on the tape following the calling number, relay 620 would have been operated over contacts 695, lead 837, contacts 881, lead 839, contacts 942 and 934 to ground.

Summarily during the period that the subscriber dials his directory number for recording and verification purposes the sender if necessary transmits routing signals to establish a connection to the desired one of the exchanges. In the few instances wherein the sender might not have completed its routing operation at the time the calling subscriber completes the dialing of his directory number, the equipment returns busy tone to the subscriber and the connection is terminated.

In other cases, as the sender completes the transmission of the traffic routing digit or digits, the route established by the sender is held pending completion of the dialing of the calling party number, the holding loop extending from the most distant one of the seized switches over the intermediate switches to conductor 601, contacts 696, conductor 974, contacts 962, 956, conductor 972, contacts 692 to conductor 602 and the intermediate switches to the last switch seized in the connection.

As the calling subscriber completes the dialing of his assigned directory number three additional steps are run off and the sender equipment is disconnected from the recorder by the restored sender connect relay 685.

R. *Subscriber dials called party number*

The connection established at this time extends from the calling subscriber substation over line circuit 219, line finder 221 and local first selector 222 of link 220, path 226, recorder 225, path 229, the first level of second selector 233, path 234, trunk 235, path 237 to trunk 316 in exchange D, path 318, the eighth level of incoming trunk selector 319, path 311, trunk 312, path 313 to trunk 416 in exchange E, path 418, tenth level of the incoming trunk selector 419, path 413, trunk 412 and path 415 to trunk 423 in exchange F, and path 435 to the incoming trunk connector 426 thereat.

The calling subscriber now dials the directory number of the desired subscriber in exchange F, which for purposes of example will be assumed to be 4213. As the break portion of the first impulse of digit four is received at the recorder, line relay 520 restores and at its contacts 521 completes the series operating circuit for the first impulse correcting relay 620, the digit following relay 555 and the punch magnet 697 in the manner hereinbefore described. The pulse corrector relay 620 operates and at its contacts 621 transmits the outgoing pulse over the outgoing loop which was rendered effective in the recorder as the sender restored. The trunks such as 235, 316, etc. repeat the impulses to the incoming connector 426 in exchange F in a manner more fully described hereinafter.

Digit following relay 555 operates and at its contacts 557 completes an operating circuit for associated relay 560 which operates. Punch magnet 697 operates to punch a hole in the tape, and at its contacts 698 completes an operating circuit for the stepping relay 643, which operates and at its contacts 644 completes an operating circuit for the second pulsing relay 625.

Relay 625 operates and at its contacts 627 and 629 interrupts the energizing circuit for the first impulse correcting relay 620 and the punch magnet 697. Impulse correcting relay 620 restores, and at its contacts 621 terminates the transmission of the break period of the first outgoing impulse to exchange F. As the punch magnet 697 restores it opens the circuit of the step magnet 643 at its contacts 698 which restores to effect the advancement of the tape one step.

With receipt of the first make after the first break period at the recorder, line relay 520 operates and at its contacts 521 interrupts the holding circuit for the impulse corrector relay 625 to effect the restoration thereof in the event that the step magnet 643 has not already restored.

Recorder line relay 520 operates with receipt of the make and break portions of each of the incoming impulses to control the impulse corrector relays 620 and 625 to transmit corrected impulses over the outgoing path to exchange F and to control the punch and step magnets to punch a hole in the tape and advance the tape one step with each impulse in the manner just described. Digit following relays 555 and 560 remain operated during receipt of the impulses representing each digit.

Thus, as the four impulses representative of the first digit of the called subscriber number are received at the recorder, corrected impulses are retransmitted over the path to the incoming trunk connector 426 at exchange F to operate same to register the prefix digit "4" and thus initiate establishment of the connection to the desired subscriber thereat. Simultaneously the recorder places four punches in the tape to indicate the value of the first digit of the called party number.

As the recorder line relay 520 remains energized following receipt of the fourth pulse for an extended period of time as a result of the pause between digits, the energizing circuit for digit-following relay 555 is maintained interrupted for a sufficient period of time to restore same. Digit-following relay 555 restores and at its contacts 556 completes an operating circuit for the step magnet 643 to operate same and simultaneously at its contacts 557 interrupts the holding circuit for the slave relay 560. After the expiration of a predetermined period of time, relay 560 restores and at its contacts 561 restores the step magnet 643 to effect the advancement of the tape one step. In this manner a space is placed on the tape between each of the digits of the called party number recorded thereon.

It is noted at this time that in the smaller exchanges such as exchange F wherein only three digit numbers are required to establish a connection, the connectors such as 426 are prefix digit absorbing connectors which are connected to absorb the first digit of the incoming four digit number.

As the second digit of the called party number (digit two in the present example) is dialed, the recorder line relay 520 controls the described equipment in the same manner to effect the recording of two punches on the tape to represent the second digit of the called party number and simultaneously effects transmission of two corrected impulses over the path to the connector switch 426 in exchange F to continue establishment of the connection thereat by registering the tens digit "2."

Following the receipt of the two impulses representing the second digit, the digit-following relay 555 and its slave relay 560 operate to effect advancement of the tape one step whereby a space is provided between the second digit and the third digit of the calling subscriber number as recorded on the tape.

As the calling subscriber now dials the third digit (units digit "1" in the present example) the digit is recorded on the tape and simultaneously a corrected digit representing impulse is transmitted over the path to the equipment in exchange F. Following receipt of the digit representing impulse, the digit-following relay 555 and the slave relay 560 effect advancement of the tape one step to provide a space on the tape between the third and the fourth digits as recorded thereon.

As the subscriber now dials the fourth digit of the called party number (Ring or Party digit "3" in the present example) the recorder equipment effects perforation of the tape three times, and effects transmission of the three digit representing impulses over the path to the equipment in the exchange F. Following receipt and transmission of the three impulses, the digit-following relay 555 and its slave relay 560 cooperate to advance the tape one step to provide a space on the tape after the last perforation of the ring or party digit of the called party number.

In exchange F the connector switch 426 is operative in conventional manner responsive to receipt of the four digits to extend the connection to the called party 4213 and to signal the party as to such connection.

S. *Answer by called party*

As the called party answers by removing the handset from his substation, "P-wire supervision" is transmitted from connector 426 to trunk 423. Answer supervision is relayed back through the trunk circuits to trunk 235 which inserts resistance in its P-wire circuit through selector 233, which is effective via recorder P-wire lead 603 to operate relay 580 as an indication of the answered condition. Previous to this time, answer relay 580 was shunted by P-wire ground. At this time, however, relay 580 operates over the following circuit: ground through the winding of relay 580, contacts 590, lead 603 and resistor 684 to battery, the resistance in the P-wire ground allowing relay 580 to operate at this time.

Answer supervision relay 580 operates; at its contacts 581 inserts resistance in the lead 503 P-wire circuit; at its contacts 585 prepares for calendaring; at its contacts 582 prepares a circuit to the punch magnet; and at its contacts 584 interrupts the holding circuit for the time delay circuit pendulum type relay 575 to restore same. As the pendulum or wobble contact 578 of relay 575 oscillates it maintains the circuit for the associate relay 570 operated until the pendulum ceases to make contact after a given period. After the elapse of such period of time the energizing circuit for slow to release relay 570 is interrupted.

Relay 570 restores and at its contacts 574 connects the pick-up conductor 518 of the calendar equipment to the calendar connect relay 635 to effect the operation thereof as the calendar is available. The calendar equipment may be of various embodiments, one operative arrangement being set forth in detail in the heretofore identified copending application.

As there taught, if the calendar is idle, ground is placed on the pick-up conductor 518. Thus, if the calendar is now available, calendar pick-up relay 635 will be operated over a circuit extending from negative battery over the winding of relay 635, contacts 650, conductor 613, contacts 585, 574 and ground on the pick-up conductor 518.

Calendar pick-up relay 635 operates, and at its contacts 640 completes a self-holding circuit extending over contacts 640 and the hold conductor 517 of the calendar equipment, at its contacts 637 completes a circuit from calendar exchange identification lead 513 to the punch magnet 697 which extends from the punch magnet 697 over contacts 637, conductor 606, contacts 551, 541 and conductor 513, and at its contacts 641 completes an obvious operating circuit for the calendar follower relay 645 to prepare the recorder for registration of the following information on the tape member as received over the connected one of the conductors 513, 514 or 515.

It is apparent that the identification digit transmitted by the calendar to the punch magnet is determined by the marking taught by recorder relays 540 and 550 as to the origin of the call. That is, if the call originated at exchange C, relay 540 would be operated and conductor 514 would be connected to the punch magnet. If the call originates at exchange B, relay 550 would be operated and conductor 515 would be connected to the punch magnet.

The following items of information are transmitted via the connected calendar lead 513, 514, or 515:

(A) Calling exchange digit (2) for exchange 82, digit (3) for exchange 83, or digit (4) for exchange 84.

(B) Month of year—06 for example.

(C) Day of month—21 for example.

(D) Hour of day—135 for example.

(E) The first minute punch.

Whereas the above identified calendar does not teach the manner in which the calling exchange digit is transmitted to the recorder, Figure 13 illustrates one manner of modifying the calendar of the aforeidentified copending application to Blashfield et al. for accomplishing such operation. Relay A is operated in the calendar to transmit the second digit (i.e. 2, 3, or 4) of the calling office code following pickup via lead 518. Relay A actuates a flip-flop circuit comprising relays 950' and 955' similar to relays 950 and 955 in the sender. Relay 955' drives counting chain 1000'—1040' in the fashion of driving chain 1000—1090 in the sender. Each time relay 955' operates in driving the chain, ground is extended over make contacts of 955' to "pulse lead" Z and thence to lead 514. In exchange A it is necessary to place two pulses on lead 513, three pulses on lead 515, and four pulses on lead 514.

As relay 955' operates for the first time relay 1000' operates. A ground pulse is placed on each of the leads 513, 514, and 515 as follows: on lead 513 through break contacts of relays 1030 and 1020; on lead 515 through break contacts of relay 1030'; and on lead 514 via lead Z itself.

As relay 955' releases ground is removed from lead Z; and relay 1010' operates in series with relay 1000'.

As relay 955' operates for the second time, relay 1000' is released. A ground pulse is placed on each of the leads 513, 514, and 515 over the above described circuits.

As relay 955' releases, relay 1020' operates in series with relay 1010'. Relay 1020' opens the circuit to lead 513 so that no more than two ground pulses reach conductor 513.

As relay 955' operates for the third time relay 1010' is released; also ground pulse is placed on leads 515 and 514 over the following circuits: on lead 515 through break contacts of relay 1030'; on lead 514 via lead K itself.

As relay 955' releases, relay 1030' operates in series with relay 1020'. Relay 1030' opens the circuit to lead 515 so that no more than three ground pulses reach conductor 515.

As relay 955' operates for the fourth time, relay 1020' is released. A ground pulse is placed on conductor 514 over conductor K itself. The operated condition of relay 1030' prevents this pulse from reaching 513 and 515.

As relay 955' releases, relay 1040' is operated in series with relay 1030'.

Relay 1040' opens the flip-flop circuit and no further pulsing and driving occurs.

Presently relay A is released, in turn releasing relays 1040' and 1030'. Thereafter the calendar month, day, hour, and tenths of the hour are transmitted to the recorder via lead T in pulse form (as taught in the afore-identified application to Blashfield et al.).

Calendar following relay 645 operates, locks to ground through contacts 651 and 538; at its contacts 653 interrupts the holding circuit for any of the relays 660—680 which may have been operated incidentally heretofore and prepares a new holding circuit at contacts 652; at its contacts 650 interrupts the original energizing circuit for calendar pick-up relay 635 (which is held operative on holding ground on conductor 517); and at its contacts 646 and 649 interrupts points in the previous energizing circuit for punch magnet 697 to prevent possible interference from the dial of the calling subscriber with the information which is now being transmitted to the punch by the calendar.

The information above taught is now transmitted by the calendar equipment in impulse form over the conductor 513 and extended over contacts 541, 551, conductors 606, contacts 637 to the punch magnet 697 to control same and its associated stepping magnet 643 to record the data on the tape in the form of perforations.

As the information taught above has been transmitted by the calendar to the recorder punch and step magnet, the calendar interrupts the ground applied to holding lead 517 to interrupt the holding circuit for calendar pick-up relay 635 and thus effect the restoration thereof. Pick-up relay 635 restores, and is prevented from re-operation over pick-up lead 518 by the operated condition of contacts 650. Pick-up relay 635 at its contacts 642 prepares the recorder timing equipment including relays 655—680 for operation, the timing relays being operated by the pulsing of relay 655 from pulses received over conductor 519 as each fifteen seconds elapse during the conversation period. The timing relays are further operative to operate the recorder punch and stepping magnet to record each minute of elapsed time as counted thereby. The calendar equipment releases itself at this time for use by other parties in the establishment of calls over other links.

As the first ground pulse, which may be from zero to fifteen seconds after the release of relay 635, according to the place in the clock cycle at which relay 635 releases, is transmitted by the clock unit over conductor 519, contacts 539, conductors 618 to the winding of chain drive relay 655 and thence to negative battery. Chain drive relay 655 operates and at its contacts 658 completes an energizing circuit for the first counting chain relay 660, the circuit extending from negative battery over the winding of relay 660, contacts 669, 678, 683, 658, 652 and 642 to ground.

As the first impulse transmitted by the clock equipment is terminated, chain drive relay 655 restores and at its contacts 657 completes a series energizing circuit for the first and second timing relays 660 and 665, the circuit extending from negative battery over the winding of relay 660, the upper winding of relay 665, contacts 662, 657, 652 and 642 to ground.

After fifteen more seconds have elapsed, the second pulse is transmitted by the clock equipment over the clock conductor 519 to the timer relay 655 to operate same, which relay in its operation is effective at its make-before-break contacts 657—658 to interrupt the holding circuit for the first timing relay 660 to effect the restoration thereof, and to complete a holding circuit for the second counting chain relay which extends over the lower winding of relay 665, contacts 668, 678, 683, 658, 652 and 642 to ground.

As the second impulse is terminated by the clock equipment, timer relay 655 restores and at its make-before-break contacts 657—658 completes a series operating circuit for the second and third timing relays 665 and 675, the circuit extending from negative battery over the lower winding of relay 65, the upper winding of relay 675, contacts 667, 661, 657, 652 and 642 to ground.

With receipt of the third fifteen second impulse over the clock conductor 519 and the third operation of the timer relay 655, contacts 658 close to complete a holding circuit over and for the lower winding of relay 675 and contacts 657 interrupt the series energizing circuit for relay 665 and 675, to effect the restoration of relay 665.

As the third impulse is terminated by the clock equipment to restore timer relay 655, contacts 657 are closed to complete a series energizing circuit for the third and fourth counting chain relays 675 and 680, the circuit extending from negative battery over the lower winding of relay 675, the upper winding of relay 680, contacts 676, 666, 661, 657, 652 and 642 to ground.

With receipt of the fourth impulse from the clock equipment the timer relay 655 operates, and at its contacts 657 interrupts the series holding circuit for relay 675 and 670, and simultaneously completes a holding circuit for the fourth relay 680 which extends from negative battery over the lower winding of relay 680, contacts 682, 658, 652 and 642 to ground. The third timing relay 675 restores, and relay 680 is held operated.

As the fourth impulse is terminated, timer relay 655 restores, and at its contacts 656 completes the operating circuit to the punch magnet 697 to effect the energization thereof to punch a hole in the tape and thereby record the elapse of one minute thereon, the circuit extending from negative battery, over the winding of punch magnet 697, contacts 636, 647, 681, 676', 656, conductor 605 and contacts 582 to ground. The restoration of relay 655 also opens the energizing circuit of slow release relay 680.

After elapse of a predetermined period of time as determined by its slow to release characteristics, timer relay 680 restores; at its contacts 681 interrupts the energizing circuit for the punch magnet 697 to restore same; at its contacts 682 further opens its own holding circuit; and at its contacts 683 prepares a circuit for relay 660. The counting chain is thus restored for recycling purposes.

With receipt of the fifth impulse over the clock conductor lead, the clock responsive relay 655 effects re-operation of the first counting chain relay to initiate timing of the second minute of conversation. The equipment continues to time the connection in this manner and records a punch on the tape for each minute of call elapsed.

T. *Release of connection*

T-1 CALLED PARTY RELEASES FIRST

Release of the equipment is controlled by the calling party. The release of the conventional equipment in the exchange is well known and only the recorder and trunk equipment will be considered herein.

In the event the called party replaces his handset prior to the calling party, the resistor in the test-wire circuit of connector 426 is shorted giving direct ground supervision to trunk 423. Disconnect supervision is relayed back through the trunk circuits in conventional fashion and trunk 235 shorts the resistor in the test wire circuit extending through selector 233 to conductor 603 in recorder 225. Answer supervision relay 580 is thereby shorted and its operating circuit is negated by the 250 ohm resistance 684, which is connected to the P-wire in the recorder, whereby restoration of answer supervision relay 580 is effected.

Answer supervision relay 580 restores and at its contacts 584 completes an energizing circuit for the first time delay relay 575, which relay operates and at its contacts 577 completes an obvious operating circuit for the associate time relay 570; simultaneously answer supervision relay 580 at its contacts 581 connects direct ground to the P-wire circuit at the calling end of the connection whereby supervision is transferred over contacts 595 and 526 to the calling end of the connection.

As the calling party now restores the hand set to his substation, the loop to the recorder line relay 520 is interrupted to restore same, which relay at its contacts 522 interrupts the holding circuit for the recorder hold relay 525. After a given predetermined period of time as determined by its slow to releases characteristics, relay 525 restores and at its contacts 527 interrupts the holding circuit for associated relay 530 and the termination relay 590 to restore same.

Relay 525 is effective at its contacts 526 to interrupt the holding circuit for the first selector and calling party line circuit.

Slave relay 530 restores and at its contacts 531 rebusies the P-wire 503 of the recorder unit 225, whereby the recorder equipment is provided with a predetermined period of time for effecting the imposition of a wide space on the tape following the last minute punch of the call just completed.

Specifically, as slave relay 530 restores it is effective at its contacts 538 to interrupt the holding circuit for the calendar follower relay 645, which restores and at its contacts 646 completes an operating circuit for the step magnet, the circuit extending from negative battery over the winding of stepping magnet 643, contacts 638, 648, 626, conductor 608, contacts 573, 536 and 521 to ground.

Step magnet 643 operates and at its contacts 644 completes an operating circuit for the pulse corrector relay 625 which relay operates, and at its contacts 626 interrupts the energizing circuit for the step magnet 643 to effect the restoration thereof, which magnet in its restoration effects advancement of the tape one step.

Step magnet 643 in its restoration is effective at its contacts 644 to interrupt the energizing circuit for the second pulsing relay 625 to effect the restoration thereof, which relay in its restoration is effective at its contacts 626 to recomplete the energizing circuit for the step magnet 643.

With each repeated cycle of the step relay 643 and impulse corrector relay 625 in this manner, the tape is advanced one step.

This action of the relays 625 and 643 continues until such time as time delay relay 570 restores and at its contacts 573 interrupts the ground for the stepping circuit. During this period 8 or more spaces will be placed on the tape following the last minute punch of the call just completed.

Specifically, although the stepping by the step magnet 643 and relay 625 was initiated by restoration of slave relay 530, and relay 645, and practically simultaneously the operating circuit for the first time delay relay 575 was interrupted, the pendulum 578 on time delay relay 575 maintains the associate time relay 570 operated through contacts 577 for a period of time sufficient to effect the spacing described above.

As the pendulum 578 comes to rest to interrupt the holding circuit for relay 570 at contacts 577, a further predetermined period of time as determined by its operating characteristic elapses after which relay 570 restores. As relay 570 restores it is effective at its contacts 573 to interrupt the self stepping circuit for stepping magnet 643 and relay 625 to restore same. Relay 570 at its contacts 572 removes ground from the recorder test-wire 503, making the recorder available to calling selectors, and at contacts 571 reestablishes the normal test-wire circuit. The equipment is now fully released for use by other subscribers in the establishment of further calls.

The pendulum ("wiggle-tail") relay 575 includes lower contacts 577 which are adjusted to make contact for a sufficient time (approximately one second) upon removal of the energizing circuit of the coil of relay 575, wherein eight or more spaces can be run off on the tape at the end of a call to provide inter-call spacing (relay 580 released) and to guard against release of relay 570 if a "flashing busy" is encountered (relay 580 pulses, in turn pulsing relay 575). The upper contacts 576 are adjusted to provide a delay time on answer before time punches are placed on the tape, if so desired.

When the called party releases after relay 630 has operated due to a miss-match of P-wires during tone test, the release of 530 releases 575 which in turn releases 570. Ground through contacts 521, 536, 573, 626, 648, 638, and the winding of step magnet 643 operates the step magnet to initiate a series of steps for inter-call spacing on the tape until the pendulum of 575 dies down and relay 570 releases.

T-2 CALLING PARTY RELEASES FIRST

In the event that the calling subscriber releases first, the loop extending over the local equipment to the recorder line relay 520 is interrupted to restore same. As relay 520 restores it is effective at its contacts 522 to interrupt the holding circuit for recorder hold relay 525, which after a predetermined period of time as determined by its slow to release operating characteristics, restores.

Relay 525 at its contacts 526 interrupts the holding circuit for the local first selector and line circuit; and at its contacts 527 interrupts the holding circuit for relay 590 and the holding circuit for its associated relay 530.

Relay 590 restores and at its contacts 596 interrupts the holding circuit for the answer supervision relay 580 which restores and at its contacts 584 completes an operating circuit for the first time delay relay 575. Time delay relay 575 operates and at its contacts 577 completes an operating circuit for associate time relay 570.

The associated slave relay 530 restores shortly thereafter by reason of its slow to release characteristics and is effective at its contacts 531 to re-busy the recorder P-wire 503 over contacts 531 and 572 to ground until such time as the delay relay 570 restores; and at its contacts 538 interrupts the holding circuit for the time delay relay 575 and the holding circuit for calendar follower relay 645.

Calendar follower relay 645 restores and at its contacts 648 completes the circuit for the stepping magnet 643 which operates the impulse correcting relay 625 to effect the self-interrupted driving thereof and stepping thereby to provide a wide space on the tape following the last minute perforation of the call just completed, the stepping of the tape being effected in the manner described above. Restoration of the equipment and the termination of stepping by the release of the time delay relays 575 and 570 thereafter is also effected in the manner described heretofore.

INTEREXCHANGE CALL INITIATED AT NON-RECORDER EXCHANGE (EXCHANGE B OR C TO EXCHANGE F)

There has been set forth heretofore the manner in which the recorder-sender equipment 225 and 231 functions responsive to the establishment of an interexchange call by a subscriber in a recorder exchange.

The operation of the recorder sender equipment at a recorder exchange responsive to establishment of an interexchange call by a subscriber at an associated non-recorder exchange is somewhat similar, and is set forth hereat, reference being made to the preceding description of the operation of the recorder-sender equipment in the interests of a more brief description.

With reference to Figure 2, there is shown thereat the manner in which recorder-sender 225, 231 is accessible to the local subscribers over path 226, is accessible to the subscribers in exchange B over path 227, and is accessible to the equipment in exchange C over path 228. It is further apparent that in each of the exchanges A, B and C the switching equipment effects connection of a calling subscriber directly to the recorder-sender equipment 225, 231 responsive to the dialing of digit 8.

In the recorder equipment (Figure 5) the incoming paths 226, 227 and 228 are connected to control, respectively, the operation of recorder line relay 520 alone; the simultaneous operation of relay 520 and marker relay 550; and the simultaneous operation of relay 520 and marker relay 540. The number of marker relays such as 540 and 550 will vary with the number of non-recorder exchanges associated with the recorder exchange. It is also possible of course to use three relays to mark as many as six non-recorder exchanges as taught in the copending application to Blackhall, Blashfield, Simmons, Ryan, and Crow which was filed March 13, 1952 by The North Electric Manufacturing Co., and received Serial No. 276,252 and was assigned to the assignee of this invention.

Assuming that the recorder equipment is seized by a subscriber in exchange B, the loop connection is extended by the switching equipment from trunk 240 through cut-through selector 243 over conductors 505, 506 to the recorder line relay 520 and marker relay 550 to operate same in series, the operating circuit therefor extending from negative battery of the winding of marker relay 550, contacts 532, conductor 506, the loop provided by the incoming connection to the positive conductor 505, 501 and over the lower winding of relay 520 to ground. Marker relay 550 operates with the line relay 520 to mark the call as incoming to the recorder from exchange B.

Marker relay 550 in operating is effective at its contacts 551 to interrupt a point in the calendar marking lead 513 extending to the punch magnet, and at its contacts 552 connects in place thereof the marking lead 515 whereby the tape will be properly marked as having been initiated in exchange 83 (exchange B). Relay 550 at its contacts 553 also completes a self holding circuit extending over resistor 523 and contacts 538 to ground; and at its contacts 554 interrupts a point in the operating circuit for the sender control relay 870 to prevent seizure by the sender of a local line such as 232 and thereby a local link such as 761 and a connector such as 763 for checking purposes, it being remembered that the checking of the calling party number in calls initiated at associated non-recorder exchanges is effected at the non-recorder exchange. The checking operation for non-recorder exchanges is more fully described hereinafter.

It is apparent that in the event that the call has been initiated by a subscriber in associate non-recorder exchange C (84), the positive conductor 509 of the loop extending to the recorder-sender equipment 225 will be connected over conductor 501 to the lower winding of recorder line relay 520 and ground, and the negative conductor 510 of the incoming loop will be extended over contacts 534 to the winding of marker relay 540 to negative battery.

Marker relay 540 operates and at its contacts 541 disconnects the calendar lead 513 (used for calls initiated at exchange A) extending to the punch magnet, and connects at its contacts 542, the marking conductor 514 which transmits identification digits to the punch at the proper period to register on the tape the fact that the call has been initiated by a subscriber in exchange 84; at its contacts 543 completes a self holding circuit over resistance 523 and contacts 538 to ground; and at its contacts 544 interrupts a point in the seizing circuit for the sender control relay 870 to prevent the seizure thereby of a local line such as 232 and thereby a local link such as 761 and connector such as 763 for checking purposes. Checking of the calling party number is effected in the call originating exchange as hereinafter described.

Recorder line relay 520 operates with seizure over any one of the alternative paths 226, 227 and 228 and operates in the manner heretofore described to seize an idle sender and to extend the call over second selector 233. The timing equipment is connected up in preparation to release the connections in the event that a given time period elapses prior to initiation of dialing.

As the calling subscriber now dials the second digit of the trunk code (the first digit having been received in exchange B or C to set up routing to exchange A) the recorder line relay 520 controls the equipment to repeat the digit dialed to the second selector such as 233 and to simultaneously register such digit on the sender register relays, whereby the proper traffic code routing digit or digits will be transmitted thereby. Simultaneously, the equipment is controlled to register the said second trunk code digit on the tape and the sender thereafter operates the stepping magnet to advance the tape a number of steps to separate the exchange identification information recorded from further information on the tape.

It should be noted that the incoming P-wire circuit (507 or 511) is connected over contacts 526, 594, conductor 604, contacts 679′, lead 836, contacts 871 (relay 870 not having operated), 841, 831, 821, conductor 829, and contacts 689 to ground.

As the second counting chain relay 820 operates following said second trunk code digit in the manner heretofore described, it is effective at its contacts 821 to insert a 150 ohm resistance 895 in the calling P wire circuit extending through the recorder 225, and the cut through selector 243 into the trunk circuit 240 (if the call originated in exchange B); (or through recorder 225, cut through selector 247 into the trunk circuit 244 if the call originated in exchange C). Trunk 240 or 244 relays this signal which is the same as answer supervision to trunk 204 or 218 respectively by conventional trunk signaling methods such as the well known composite signalling equipment. That is, the incoming P wire circuit (507 or 511 depending upon the particular exchange which has initiated the call) is now connected over contacts 526, 594, conductor 604, contacts 679′, conductor 836, contacts 871, resistance 895, conductor 829 and contact 689 to ground.

With the reception of this preliminary signal, the trunk equipment (such as 204 in exchange B and 218 in exchange C) is operative to seize a local incoming trunk connector such as 206 or 216 respectively and to condition the trunk for transmission of the calling party's directory number into the incoming trunk connector as well as into the recorder as set forth in more detail in the following trunk circuit description. As the calling subscriber completes the transmission of the fifth digit of the number (the first digit dialed having been trunk digit "8" to route the call to the recorder exchange A, the second digit dialed having been the second trunk code digit, the third digit having been the prefix digit of the calling number, the fourth digit having been the tens digit of the calling number and the fifth digit having been the units digit of the calling number), the counting chain in the sender will be advanced to the fifth counting chain 850 which operates in the manner heretofore described, and in its operation is effective at its contacts 852 to short circuit the 150 ohm resistance 895 connected in the P wire circuit, whereby the distant calling office is signalled to effect engagement of the check tone circuit thereat for the purposes of verifying the calling line number.

In the event that the calling line number has been incorrectly dialed, the tone equipment at the calling exchange operates to interrupt the connection as described more fully hereinafter.

During the period of recording of the calling party number the sender operates in the manner heretofore described to transmit the routing signals comprising one or more digits over the equipment of the predetermined exchanges to establish the connection to the proper switch in the desired one of the exchanges. The recorder and other equipment effects completion of the connection in the manner heretofore described.

The completed connection is timed in the manner of the previously described connections, and release of the equipment is effected in like manner.

A. *Trunk equipment*

The trunk equipment at a recorder station which does not have a non-recorder station associated therewith may comprise any one of a number of commercially available two-way trunk arrangements. The trunk equipment associated with a non-recorder office, such as trunk 204 at exchange B, trunk 218 at exchange C and trunk 423 at exchange F will necessarily include further equipment which is operative with initiation of an interexchange call by a local subscriber to seize and control local equipment in the verification of the calling party number. An economical and practical type trunk adapted for use in these exchanges as well as the other exchanges of the system is set forth in Figure 11.

For simplicity of description it will now be assumed that a call originating in exchange C is being discussed. The trunk 1100, as shown in Figure 11, is connected in the manner of trunk 218 in exchange C, path 213 being connected to trunk conductors 1101, 1102, 1103, path 215 being connected to trunk conductors 1195′, 1196′, and 1197′, and path 217 being connected to trunk conductor 1185.

The details of operation of the trunk signalling relays, such as 1190 in the transmission of signals over the inter trunk path such as 217, are taught in detail in the Patent 2,570,763, which issued to R.T. Campbell on October 9, 1951.

Trunk equipment 1100 when connected in the manner of trunk 218 is operative (*a*) to extend outgoing calls from connector 212 via path 213 over path 217 to an associate trunk 244 in the associated recorder exchange to the recorder equipment thereat. (*b*) to extend incoming calls received over path 217 from the other exchanges to the local switching equipment, such as incoming trunk connector 216 via path 215 and the desired subscriber in the exchange, and (*c*) to extend calling line number verification pulsing from connector 212 via path 213 to the incoming trunk connector 216 via path 215.

With receipt of an incoming call over path 217 from a remote exchange, the trunk equipment 1100 operates in a somewhat conventional manner to seize one of the local switches such as 216 which is accessible thereto, and thereafter repeats the called subscriber impulses received over the incoming path to the seized switch to control same in the selection of the desired party.

The trunk operation in the extension of a call outgoing from the exchange is more involved. It will be recalled that in the initiation of an interexchange call, the subscriber first dials the code number of the desired trunk followed by his own directory number and the directory number of the called subscriber.

Assuming the desired subscriber to be in exchange 81, as the subscriber removes his handset from his substation and dials the first digit (eight), a link such as 210 is seized and controlled to effect extension of the connection over the link connector switch, such as 212, and path 213 to seize the trunk equipment 218 over conductors 1101, 1102 and 1103.

Trunk equipment 1100 with seizure is operative to extend the call via conventional duplex signalling over path 217 to associated trunk 244 in exchange A which in turn extends the connection over cut-through selector 247 and over path 228 to seize an idle one of the associated recorders such as 225. Recorder 225 operates to seize an idle sender such as 231, and to prepare its associated second selector 233 for operation.

Trunk equipment 218 is also operative with seizure by a calling party to effect seizure of a local switch, such as the illustrated incoming trunk connector 216, for the purpose of extending a test connection in accordance with the digits of the directory number as dialed by the calling party. As the calling subscriber now dials the second digit of the trunk number (1 in the present example), the impulses are transmitted over the local equipment to trunk 218 over path 217, trunk 246, cut-through selector 247 to the recorder 225 to control same to record the digit (1) on the tape, to operate the second selector 233 to advance to the first level, and to register the code number on the sender 231 for routing purposes. The trunk 218 is arranged to prevent the pulses which represent such digit from entering connector 216. At the end of this digit the sender 231 signals the trunk 244 via the recorder 225 and cut-through selector 247, which in turn signals trunk 217 by means of duplex signalling to cause the trunk 218 to be conditioned to all pulsing into connector 216.

As the calling party dials his own directory number the impulses are repeated by the trunk to the recorder equipment in exchange A for recording thereat and to the local connector 216 for controlling same in the extension of a test connection for verification purposes.

As the calling subscriber completes dialing of all of the digits except the ring digit of his directory number, the recorder equipment 225 operates to transmit a verification signal over the path 228, cut-through selector 247, trunk 246, path 217 to trunk 218 to control the trunk equipment to seize a local tone circuit 700C for the purpose of checking whether a connection has been established to the line of the calling party. In the event that the calling party has not correctly dialed his own number, this connection will not have been established and relay 1135 is operated; busy tone is returned to the calling party at contacts 1136′; the transmission circuit is held open at contacts 1136; and contacts 1139 maintain connection of the signaling lead 1185 to battery so that any subsequent pulsing by relay 1160 cannot be transmitted over path 217. If the calling party does not hang up, time disconnect in connector 212 releases the connection, placing the calling party on lockout. If the calling party has correctly dialed his own number, relay K will not have been operated at the end of the testing interval, indicating that the connection is verified; the connection to the connector 216 has been released and that dialing can continue. Thus, as the ring digit is subsequently transmitted to the trunk, it is repeated over the connection to the recorder equipment, but is not transmitted to the connecor 216.

During the period that the calling party directory number is being dialed, recorded and the line number is being verified, the sender equipment 231 establishes a connection to the desired exchange, and as the calling subscriber now dials the number of the desired party, the impulses representative of the number are transmitted over the trunk equipment and the established path to the desired exchange to control the switching apparatus thereat to effect extension of the call to the desired party.

B. *Specific operation of trunk equipment*

The specific operation of the trunk apparatus in extending the connection responsive to initiation of an interexchange call is now set forth hereat. As the calling party lifts his handset from this substation, a loop is closed to the associated line circuit 211′ which effects seizure of an idle link, such as 210, comprising line finder 211 and connector 212. The calling party then dials "8" which extends the connection over the multiple of the connector 212 of the seized link and path 213 to the incoming side of an idle trunk such as 218, which is selected by a conventional trunk selection circuit.

With the seizure of an idle trunk, such as 218 shown in detail as 1100, battery is extended over the negative conductor 1102 to operate the line relay 1160 thereat in an obvious manner. Simultaneously the seizing connector switch places 150 ohm ground on the trunk P-wire 1103 to complete an operating circuit for link seizing relay 1120 to battery.

Line relay 1160 operates and at its contacts 1162 prepares an operating circuit for applying battery to the signalling lead 1185 which extends to the signalling relay 1190 and conductor 1185′ which extends over resistor 1198 to one leg of the outgoing path 217 to the distant exchange; whereby signalling may be effected in a duplex composite signalling arrangement; at its contacts 1161 interrupts a point in the energizing circuit for relay 1175; and at its contacts 1164 prepares a pulsing circuit to the positive wire 1195′ of the incoming trunk connector 216 which is seized by the trunk for the purpose of verifying the calling line number.

Link seizing relay 1120 operates, and at its contacts 1121 extends the P-wire ground to its associate relay 1105; at its contacts 1123 prepares an operating circuit for slow to release relay 1150; at its contacts 1125 extends operating battery over lamp 1113, contacts 1162, 1125, 1139′ over the signalling relay 1190 to energize the signal relay in the associated trunk equipment 246 at the recorder exchange A; and at its contacts 1127 places 500 ohm battery through contacts 1153 and 1143 on the positive lead 1195′ and at its contacts 1129 and 1143′ places 500 ohm ground on negative conductor 1196′; which signals extend via path 215 to seize the associated incoming trunk connector 216 for checking purposes; and at its contacts 1131 prepares the test wire 1197′ of the incoming trunk connector for the tone test.

Associate trunk relay 1105 operates and at its contacts 1110 locks to P-wire ground independent of the energizing circuit completed by relay 1120; at its contacts 1109 completes a P-wire ground circuit to the lower winding of relay 1115; at its contacts 1108′ connects direct ground to the upper winding of relay 1115; at its contacts 1108 prepares an operating circuit for trunk relays 1140 and 1175 and a holding circuit for relay 1135 and 1150; and at its contacts 1106 and 1107 steps the automatic trunk selection control circuit. Relay 1115 has two opposed windings. If direct ground is connected to each winding the relay does not operate. With resistance ground connected to the lower winding and direct ground to the upper winding as in the present instance, the upper winding dominates and the relay closes its contacts including contacts 1116 to remove the 600 ohm pad 1190 from the repeat coil 1195 and thereby enable same.

B–1. RECEIPT OF SECOND DIGIT OF CALLED EXCHANGE CODE

As the calling party now dials the second digit of the trunk code number (digit "1" in the present example), the connector is operative to repeat the pulse to the trunk equipment over the negative conductor 1102 to thereby pulse the trunk line relay 1160 in an obvious manner. Trunk line relay 1160 follows the pulses as received and in each operation is effective at its contacts 1162 to repeat the impulses over the signalling conductor 1185 and the outgoing path 217 to the equipment in recorder exchange A, to pulse the equipment thereat. Signal relay 1190 does not respond to these pulses. The recorder equipment registers each impulse as received on the tape member and also on the sender routing register as before described.

With the receipt of the break period of the first incoming impulse of each digit, trunk line relay 1160 at its contacts 1161 completes an operating circuit for digit following relay 1175, the circuit extending from battery over the winding of relay 1175, contacts 1161, 1138 and 1108 to ground.

Digit following relay 1175 operates on receipt of the break period of the first impulse, remains operated during the period that the impulses representing the incoming digit are received, and a predetermined period after receipt of the last impulse thereof (as determined by its slow to release characteristics), relay 1175 restores. Digit following relay 1175 in operating is effective at its contacts 1177 to reinsert the 600 ohm pad in the repeating coil circuit, and at its contacts 1176 and 1178 effects interruption of the speech connection extending over conductors 1180 and 1181 to the distant exchange via the repeat coil 1195 and intervening composite equipment.

Following receipt of each digit, digit following relay 1175 restores and at its contacts 1176 and 1178 connects the speech connection over conductors 1180, 1181 to the distant trunk via the repeat coil, and at its contacts 1177 removes the 600 ohm pad from the repeating coil circuit.

It will be recalled that the recorder counting chain in exchange A counts the digits received from the calling subscriber, and as the second trunk code digit has been received, recorder counting chain relay 820 operates, and at its contacts 821 connects 500 ohm resistor 895 in the P-wire conductor 511 to the P-wire of the trunk 244 in exchange C.

The 500 ohm ground on P-wire 511 is extended over the cut through selector 247 to the P-wire of the trunk 244 (which has an action like that of P-wire 1103 of the illustrated trunk 1100) to operate a differential relay like 1115, which at contacts similar to 1117 effects the application of battery over a circuit similar to the circuit comprising contacts 1118, 1126, 1139' and a signal conductor like 1185 a differential duplex relay like 1190, and the composite leg of a path 217 to the upper winding of signal relay 1190 of trunk 218 in exchange C as shown in Figure 11 to operate same.

Signal relay 1190 in trunk 218 operates, and at its contacts 1191 completes an operating circuit for checking relay 1150 over the circuit extending from negative battery over the winding of relay 1150, and contacts 1142, 1123 and 1191 to ground.

Checking relay 1150 operates and at its contacts 1151 prepares a series operating circuit for associate relay 1140, which is presently shunted by the energizing circuit for relay 1150; at its contacts 1152 transfers over make-before-break contacts from 500 ohm battery through contacts 1143 and 1153, to 500 ohm battery through contacts 1164 and 1152 on the positive wire 1195' of the incoming trunk connector 216, the circuit extending from battery over resistor 1159, contacts 1164, 1152, 1127 to positive conductor 1195' and path 215 to the incoming trunk connector 216. Thus, as the trunk line relay 1160 is operated responsive to receipt of the incoming impulses which are representative of the calling party number, it is effective at its contacts 1164 to repeat the impulse to the incoming trunk connector such as 216 for vertification purposes.

Trunk relay 1150 at its contacts 1154, 1156 and 1158 also prepares the operating circuits for the associated check tone circuit 700C, which may comprise a check tone circuit, such as circuit 700 shown in Figure 7. As shown, conductors 701C, 702C, and 703C in Figure 11 correspond to conductors 701, 702, and 703 of Figure 7.

B–2. RECEIPT OF CALLING PARTY LINE NUMBER

As the calling party now dials the digits of his own number, the impulses as received over conductor 1102 operate the trunk pulsing relay 1160. At its contacts 1162 and 1163 relay 1160 repeats the pulses over the signalling lead 1185 via relay 1190 and the composite legs of the trunk 244 via path 217 and recorder 225 via selector 247 in the associated recorder office A, and at its contacts 1164 transmits the impulses over conductor 1195' to the incoming trunk connector to control same in establishing a test connection to the calling line.

As the prefix, tens, and units digits of the calling party directory number have been dialed the connector 216 will have extended a connection from the trunk P-wire 1197 to the P-wire of the calling line (which is of course busy), through condenser **216*b*** (see Figure 14) and accordingly a spurt of busy tone may be transmitted back to the calling party.

As previously described, the recorder equipment is operative following receipt of all of the digits of the calling party number with the exception of the ring digit, to shunt the 150 ohm resistor 895 in the sender leading to the P-wire 511 leaving direct ground connected thereto, whereby a relay in trunk equipment 244 like relay 1115 illustrated in Figure 11 is restored to effect removal of battery from the signalling lead like 1185 thereat, and the restoration of signal relay 1190 at exchange C. Signal relay 1190 restores and at its contacts 1191 removes the shunt from the test relay 1140 allowing it to operate in series with relay 1150.

Test relay 1140 operates and at its make before break contacts 1141' completes a self holding circuit; at its contact 1143' removes ground from conductor 1196' at its contacts 1143 prepares for the removal of battery from conductor 1195' in preparation for the release of incoming trunk connector 216; at its contacts 1142' interrupts the series energizing circuit for test relay 1150 to restore same; and at its contacts 1144 extends the ground on the connector P-wire 1197' over contacts 1131, 1144 and 1154 to conductor 702C of the check tone circuit to actuate the tone circuit to test the accuracy of the calling party number dialed, it being remembered that the equipment is effective to initiate oscillation of an oscillator circuit as seized and to maintain the oscillations only in the event that the test connection has been completed to the calling line, and accordingly a P-wire verification loop for tone has been thereby established.

Specifically, during the period of time occuring between the operation of the trunk relay 1140 and the release of trunk relay 1150 (which is slow to release) a loop circuit as is first shown in Figure 14 is completed from the calling line P-wire through tens and units relay contacts of line-finder 211, through condenser **212*b* which has been inserted in regular connector 212 between the incoming and outgoing P-wires, units and tens relay contacts of connector 212, trunk conductor 1103 of path 213, contacts 1110, 1145 and 1156, conductor 701C, through the tone circuit 700C, conductor 702C, contacts 1154, 1144 and 1131, conductor 1197' of path 215, incoming P-wire of connector 216, through condenser 216*b* which has been incorporated in incoming trunk connector 216 between the incoming and outgoing P-wires, units and tens relay contacts of connector 216, back to the calling line P-wire. It should be observed that 7 ohm choke coils 212*a*, 212*c*, 216*a*, and 216*c*** (Figure 14) are inserted in the P-wire ground circuits, which isolate the tone from ground to guard against sneak circuits via ground from giving false tone check loops. The loop thus completed maintains the oscillator equipment in the tone circuit energized in the manner heretofore described, and the equipment is normally conditioned for further extension of the call.

In the event that the calling party had failed to dial his directory line number correctly, the loop described would not have been completed, and the oscillator equipment in the tone circuit would have been deenergized to extend P-wire ground over conductor 1197', contacts 1131, 1144, 1154, conductor 702C through the tone circuit to conductor 703C, and contacts 1158 and 1147 to the winding of the call termination relay 1135 to effect the energization thereof. Call termination relay 1135 operates, locks to ground through contacts 1137 and 1108; at its contacts 1136 interrupts the circuit extending over the negative conductor 1102 to thereby effect release of the trunk line pulsing relay 1160 which in turn releases incoming trunk connector 215 at contacts 1164; at its contacts 1136' connects busy tone to conductor 1102 to indicate to the calling subscriber that the connection has been terminated; and at its contacts 1139 extends battery over the signalling lead 1185. As the trunk relay 1150 now restores following the elapse of its predetermined release period, it is effective at its contacts 1152 to further interrupt the holding circuit for the incoming trunk connector 216 to restore same.

As the calling party restores his receiver as a result of the receipt of the signal indicating the call has been terminated, the trunk equipment releases as more fully described hereinafter.

B–3. RECEIPT OF CALLING PARTY RING DIGIT

Assuming that the calling party directory number has been correctly dialed, and the tone circuit so indicates to the equipment, as trunk relay 1150 restores after the elapse of its given time period, it effects at its contacts 1152 the release of the holding circuit for the associated incoming trunk connector 216.

As the calling party now dials the ring digit of the calling number, the digit operates the trunk pulsing relay 1160 to repeat same at its contacts 1163 and 1162 over the signalling conductor 1185 to the trunk associated with the recorder equipment 225 at the recorder office A. It should be observed that the ring digit does not enter connector 216.

B–4. CALLING PARTY DIALS CALLED NUMBER

As the impulses representative of the called party number are now received at the trunk the trunk pulsing relay 1160 pulses and at its contacts 1163 and 1162 repeats the impulses over the signalling conductor 1185 to the equipment at the recorder office. Digit following relay 1175 operates and releases as before with the initiation and termination of receipt of each of the digits.

B–5. ANSWER BY CALLED PARTY

As the called party answers, it will be recalled that the answer supervision relay 580 operates and at its contacts 581 inserts resistance 569 in the P-wire circuit extending to the trunk 244.

A supervision relay in trunk 244 (similar to supervision relay 1115 shown in Figure 11) operates and at contacts like 1117 in Figure 11 effects application of battery to the signal lead such as 1185. The battery signal thus provided is transmitted over path 217 to trunk 218 and the signal relay 1190 shown in Figure 11, which operates and at its contacts 1191 completes an operating circuit for the trunk answer supervision relay 1170, the circuit extending from battery over the winding of relay 1170, the 500 ohm resistance 1174, contacts 1141, 1123 and 1191 to ground.

Trunk answer supervision relay 1170 operates and at its contacts 1171 connects associate relay 1168 to the positive conductor 1101 to effect the operation thereof in series with the answer relay in the calling connector; and at its contacts 1173 completes an obvious operating circuit for slave relay 1165.

Trunk relay 1165 operates and at its contacts 1166 and 1167 connects relays 1160 and contacts 1172 of relay 1170 to various preparatory circuits which are incidental at this time. The trunk equipment holds in this condition for the duration of the call.

B–6. CALLED PARTY RELEASES FIRST

In the event that the called party restores his receiver to his handset prior to restoration by the calling party, a release supervision signal comprising application of direct ground to the incoming P-wire circuit is provided by the called exchange equipment such as connector 426 in the conventional manner which ground signals the trunk equipment such as 423, which in turn passes the signal back through the trunks to trunk 235. Trunk 235 shunts a resistor (not shown) in the trunk placing direct ground on recorder P-wire lead 603 to short the answer supervision relay 580 over the 250 ohm resistance 684 and effect the restoration thereof.

Answer supervision relay 580 restores and at its contacts 581 applies direct ground to the P-wire 511 to restore the supervision relay like 1115 in trunk 244, which restores and at its contacts like 1117 and 1118 removes battery from and places ground on the signalling conductor like 1185 whereby the signal relay 1190 in trunk 218 at exchange C restores.

Relay 1190 in restoring is effective at its contacts 1191 to interrupt the holding circuit for the trunk answer supervision relay 1170 to restore same, which relay in its restoration releases relays 1165 and 1168. A momentary impulse for operating trunk relay 1175 is obtained with restoration of these relays.

As the calling party releases thereafter, the connector of the operative link (link 210 in the present example) opens the circuit extending over negative conductor 1102 to restore the trunk pulsing relay 1160, and simultaneously connects direct ground to the P-wire 1103 to effect the flow of equal currents through the opposed windings of trunk relay 1115 and the restoration thereof. Shortly thereafter the connector operates in a conventional manner to remove ground from the P-wire 1103 to effect the restoration of relays 1105 and 1120. As relay 1105 restores, it is effective at its contacts 1108 to interrupt the holding circuit for relay 1140 which responsively restores.

The non-recorder trunk such as 218, transmits a signal to the recorder office as to its release, the signal being transmitted over the signalling conductor 1185. Specifically, with the restoration of pulsing relay 1160, ground was connected to conductor 1185 over contacts 1163, 1125, 1139' and as the trunk relay 1120 restored thereafter, further ground over the circuit extending over contacts 1118, 1126, 1139' was connected thereto, whereby with continued application of ground to the signalling conductor 1185, the trunk at the recorder office is informed that the non-recorder trunk has restored.

B–7. CALLING PARTY RELEASES FIRST

In the event that the calling party restores his handset to his substation prior to the called party, the circuit over negative conductor 1102 is immediately opened and direct ground is placed on lead 1103 to restore the relays 1160 and 1115, whereby ground is applied over conductor 1185 as just described to signal the recorder end of the connection as to the restoration of the non-recorder trunk. Presently the connector removes ground from lead 1103 and trunk relays 1105 and 1120 are restored as above, relay 1105 being effective in its restoration to restore trunk relay 1140.

As trunk relay 1120 restores, battery through the coil 1168, contacts 1171, lead 1101 and contacts 1128 is placed on lead 1195'; and ground through the coil of relay 1160 and contacts 1166 and 1130 is placed on lead 1196' whereby the incoming trunk connector 216 is seized over path 215. Upon seizure, connector 216 places direct ground on its incoming P-wire which is extended over path 215 to P-wire lead 1197'. This ground through contacts 1132 reoperates relay 1105 which steps the automatic trunk selection at contacts 1106—1107 making it unavailable via the trunk selection circuit and extends this ground through contacts 1110 to P-wire 1103 making the trunk busy to any line number dialing via the connector multiple.

As the called party restores to effect the release of signal relay 1190 and the removal of ground from the signalling conductor 1184, as heretofore described, trunk relay 1170 restores and at its contacts 1171 interrupts the circuit for battery through coil 1168 to lead 1195', releasing incoming trunk connector 216, and at its contacts 1173 restores slow to release relay 1165.

Trunk relay 1165 restores and at its contacts 1166 interrupts the circuit for battery through relay 1160 to lead 1196' releasing relay 1160.

As the incoming trunk connector 216 presently removes ground from P-wire lead 1197′, it effects restoration of trunk relay 1105 which steps the trunk selection circuit and removes ground from lead 1103. The trunk is now restored.

TRUNK OPERATION AT NON-RECORDER EXCHANGE RESPONSIVE TO INCOMING CALLS

A. *Calling party dials called exchange code*

Assuming a calling party at a remote exchange such as exchange A is interested in extending a connection to a subscriber in a non-recorder office, such as exchange C, the trunk equipment illustrated in Figure 11 is effective to receive the incoming call and extend the connection to an idle one of the associated local links. Specifically with the extension of the call to the recorder exchanges and seizure of a trunk such as 244 thereat, the associated trunk 218 in exchange C is seized and the signalling relay 1190 is operated to place ground on signal lead 1184 to thereby operate relay 1170 over the circuit heretofore described.

Trunk relay 1170 operates and at its contacts 1171 connects trunk relay 1168 over the positive conductor 1101, contacts 1128 and the positive conductor 1195′ to seize the incoming trunk connector 216 via path 215. Relay 1170 is also effective at its contacts 1173 to complete an operating circuit for associated relay 1165.

Relay 1165 operates and at its contacts 1166 connects the trunk relay 1160 via contacts 1130 and lead 1196′ via path 215 to the incoming trunk connecter 216. Relay 1160 operates in series with a relay to battery in the incoming trunk connector. At its contacts 1167, relay 1165 prepares an operating circuit for trunk relay 1175. Relay 1160 presently at contacts 1161 opens a circuit to relay 1175.

As a result of the landing in the link for an inward call, ground placed on the P-wire 1197′ by the incoming trunk connector is extended over contacts 1132 to the winding of trunk relay 1105 to effect the operation thereof.

Trunk relay 1105 operates and at its contacts 1106—1107 steps the automatic trunk selection equipment; at its contacts 1108′ and 1109 prepares an operating circuit for supervisory relay 1115, at its contacts 1103 extends the ground on the P-wire 1197′ to the P-wire 1103.

A local link has now been automatically selected and prepared for operation with receipt of the called party number.

At this time the calling party dials his own number but these pulses are not extended beyond the recorder in the connection, and accordingly the trunk does not receive these pulses.

B. *Calling party dials the called number*

As the calling party at the remote exchange dials the number of the called party, the impulses are repeated by the recorder and trunks in the connection to the signalling relay 1190 which extends the impulses over conductor 1184 to the trunk relay 1170 to effect the pulsing thereof.

Trunk relay 1170 follows the incoming pulses and at its contacts 1171 connects and disconnects battery through the coil 1168 over the positive conductor 1101, contacts 1128 and positive conductor 1195′ to the line pulsing relay of the incoming trunk connector to control same to select the desired subscriber in the exchange in the conventional manner.

Relay 1170 at its contacts 1173 completes an operating circuit for the associated relay 1165 which because of its slow to release characteristics does not restore between pulses, but does restore between digits. Relay 1170 in each of its restorations is effective at its contacts 1172 to complete an operating circuit for trunk relay 1175, which is effective at its contacts 1176 and 1178 to hold the transmission circuits open while pulsing is taking place, and at its contacts 1177 is operative to insert a 600 ohm pad in the transmission circuit during the pulsing periods.

C. *Answer by the calling party*

As the called party answers, 150 ohm ground is connected to the P-wire 1197′ by the switching apparatus in the conventional manner, whereby an unbalance is effected in the winding of supervisory relay 1115 to effect the operation thereof. Supervisory relay 1115 operates and at its contacts 1117 connects battery over contacts 1126 and 1139′ to the signalling conductor 1185 and via path 217 to the trunk 244 which in turn extends the answers signal to the calling end of the connection to provide answer supervision thereat in the manner heretofore described.

D. *Called party releases first*

If the called party releases first, the incoming trunk connector places direct ground on lead 1197 via path 215, to release relay 1115, which in turn places ground on lead 1185 to extend same over the winding of relay 1190 and over path 217 to signal the trunk 244 at the recorder exchange A.

When the calling party releases, the trunk 244 extends ground via path 217 to trunk 218 which via lead 1185 releases relay 1190. The release of relay 1190 opens the circuit of relay 1170. Relay 1170 operates relay 1175 and opens the circuit of coil 1168, to release incoming trunk connector 216. Relay 1170 also releases relay 1165 which removes relay 1160 from lead 1196′, and releases relay 1175. When the incoming trunk connector removes ground from P-wire 1197′, relay 1105 releases.

E. *Calling party releases first*

When the calling party releases, the distant trunk 244 places ground on lead 1185′ via path 217 to release relay 1190 which in turn releases relay 1170. Relay 1170 operates relay 1175 to release relay 1165 and disconnect the coil 1168 from positive lead 1195′ and thereby release incoming trunk connector 216. The release of relay 1165 removes relay 1160 from negative lead 1196′ and releases relay 1175. The incoming connector maintains indirect ground on the P-wire 1197′ until release of the hold relay in said connector. When this ground disappears, relay 1105 releases in turn releasing relay 1115. The release of relay 1115 establishes ground through contacts 1118, 1126, 1139′ and relay 1190 via path 217 to trunk 244 in exchange A to thereby signal that trunk 218 has released.

TONE CHECKING WHEN PRIVATE BRANCH EXCHANGE LINES ARE INVOLVED

As is well known in the art, if a calling party makes a call via one of a group of private branch exchange lines, seizing of a line causes the automatic trunk selection circuit to shift so that the next call seizes a different one of the lines. In one known embodiment, after the last line is seized, subsequent calls seize the same line as far as the test wires are concerned and receive a "busytone" indication.

Assuming a subscriber on a private branch exchange line makes a call which is ticketed according to the disclosure of this patent application, the check line or incoming trunk connector is operative in response to the calling party dialing his own number to route the call back to the private branch group via the same trunk selection circuit which ordinarily would route the call to a different line in the group. Referring to Figure 15, if the call were initiated over line 4231, the call might be routed back through the check line or the incoming trunk connector to line 4232. In order that a check tone path might be completed, condenser 1 has been connected between the P-wires of line 4232 and 4231. Similarly a condenser 2 has been connected between the P-wires of line 4233 and 4231. At most, to get from the P-wire of any line to that of any other line only two condensers must be encountered. For example to get from the P-wire of line 4233 to the P-wire of line 4232, it is only necessary to go through condenser 2 to the P-wire of line 1 and then through condenser 1 to the P-wire of line 4232.

GUARDING AGAINST PAYSTATIONS MAKING TOLL TICKETING CALL

As shown in Figures 12 and 14, if an automatic toll ticketing call is attempted from a paystation, successful tone checking is blocked by the insertion of a choke coil in the called P-wire circuit of the paystation at the points indicated, the choke coil in series with the P-wire preventing the tone from getting through the tone test loop.

The operation of the equipment in establishing and ticketing calls originating and terminating at other exchanges is believed to be obvious from the foregoing explanations.

While we have described what we regard to be a preferred embodiment of our invention, it will be apparent that variations, rearrangements, modifications and changes can be made therein without departing from the scope of the present invention as defined by the appended claims.

We claim:

1. In an automatic telephone system having a plurality of exchanges, subscriber lines terminating at said exchanges, switching apparatus including link equipment for setting up connections between said lines, routing means operative to route each interexchange call over said switching apparatus to the desired exchanges in accordance with the nature of a designator signal transmitted by the calling subscriber, recording means for recording certain items of information pertinent to said connections, means operable to transmit the directory number of the calling party to said recording means for registration, vertification means for seizing an idle one of said local links and controlling same to extend a test connection to said calling line for verification purposes, and control means operative to simultaneously initiate operation of said routing means in the transmission of the routing digits, said recording means to record the calling party number, and said verification means in the verification of the calling party number.

2. In an automatic telephone system having a plurality of exchanges, subscriber lines terminating at said exchanges, switching apparatus including link equipment for setting up connections between said lines, routing means operative to route each interexchange call over said switching apparatus to the desired exchanges in accordance with the designator signal transmitted by the calling subscriber, recorder means including recording means for recording certain items of information pertinent to said connections, means operable to transmit the directory number of the calling party to said recording means for registration, verification means for seizing an idle one of said local links and controlling same to extend a test connection to said calling line for verification purposes, and means operative responsive to complete recording of the calling party number prior to routing of the connection to the desired exchange to terminate further extension of the connection.

3. In an automatic telephone system having a plurality of exchanges, subscriber lines terminating at said exchanges, switching apparatus for setting up connections between said lines, a plurality of recorder units in an exchange for recording certain items of information pertinent to said connections, signal transmitting means selectively operable by the calling subscriber to seize an idle one of said recorder means and to transmit thereto exchange designator signals and the directory number of the calling party, a sender unit common to a group of recorder units, signal responsive means in each recording unit operative with seizure thereof to seize the associated sender apparatus as idle to extend the received exchange designator signals thereto, signaling means in said sender apparatus for transmitting signals to control the switching apparatus in the exchanges to route the call in accordance with the exchange designator signals received, and control means operatively controlled by said signal responsive means to initiate operation of said sender means, and simultaneously initiation of the recording of the calling party directory number on said recorder means, and means in said recorder and sender means for releasing the seized sender unit responsive to complete transmission of the routing signals and the recording of the calling party number.

4. An automatic telephone system as set forth in claim 3 which includes means in said recorder for repeating the called party number over the connection as established, and in which said release means for said sender are connected to restore repeating prior to transmission of the called party number.

5. In an automatic telephone system having a plurality of exchanges, subscriber lines terminating at said exchanges, switching apparatus for setting up connections between said lines in said exchanges, routing means for registering the exchange routing signals for each connection as transmitted by the calling one of said lines and thereafter automatically routing the connection in accordance therewith, recorder means for recording certain items of information pertaining to said connections, signal responsive means, recording means operatively controlled by said signal responsive means to record the directory number of the calling party as received thereat, means operatively controlled by said signal responsive means to initiate operation of said routing means in further extending the connection and simultaneously to initiate operation of said means to record the calling party directory number on said recording means, and means in said recorder means operative to terminate the call responsive to complete recordation of the calling party number prior to completion of said routing operation by said routing equipment.

6. In an automatic telephone system having a plurality of exchanges including predetermined paths for connecting the exchanges with one another, subscriber lines terminating at said exchanges, each exchange having a given code number and each subscriber having an assigned directory number, switching apparatus for setting up connections between said lines and between said exchanges, recording means for recording certain items of information pertinent to said connections on associated recording media at spaced intervals, means selectively operable by the calling subscriber to seize said recording means and to control same to record the code number of the desired exchange and the directory number of the calling party as transmitted by the calling party, routing apparatus connected to said recorder means for registering said exchange code signals and for transmitting signals to control the switching apparatus in the exchanges to route the call to the desired exchange, and means in said routing apparatus operative to transmit space control signals to said recorder apparatus to provide given spacing intervals between predetermined different items of the recorded information.

7. In an automatic telephone system having a plurality of exchanges, each exchange having a given code number and each subscriber having an assigned directory number, subscriber lines terminating at said exchanges, switching apparatus for setting up connections between said lines, recorder means for recording certain items of information pertinent to said connections at spaced intervals on associated recording media, including the code number of the desired exchange and the directory number of the calling party, and routing apparatus for transmitting signals to control the switching apparatus in the exchanges to route the call thereover in accordance with the code number transmitted to the recorder means; said routing apparatus including impulsing means, counting chain means, means for controlling said counting chain to register the code number of the called exchange simultaneously with recordation by said recorder means, means including said counting claim for controlling said impulsing means to transmit a number of impulses to control said recorder means to provide a predetermined space interval on said media after recordation of the called exchange number thereon, means including said counting chain for translating said recorder exchange code number into the number and value of digits required to route the call over the switching apparatus to the desired exchange, and means including said counting chain for energizing said impulsing means to transmit a number of impulses to said recorder means to provide a predetermined space interval on said media after recordation of the calling party number thereon.

8. An automatic telephone system having subscriber lines and switching apparatus for setting up connections between said lines over predetermined routes, recorder means for recording on record media certain items of information pertinent to said connections, means for transmitting an exchange designator and signals representative of the number of the calling party thereto for recording purposes, and sender means for routing each connection over the switching apparatus indicated by said designator signals, said sender means comprising counting chain means, means for registering on said counting chain the exchange desired as indicated by the office designator received from the calling subscriber, means for translating said designator into the number and value of digits necessary to operate the switching equipment in the extension of the connection over its predetermined route, impulse transmitting means, means for energizing said impulse transmitting means to transmit a series of impulses indicated by the marking on said counting chain and to effect between digits a pause of a predetermined interval, and means including said counting chain operative firstly responsive to registration of the exchange digit on said recorder and secondly to complete recording of the calling party number to transmit to the recording apparatus control impulses for effecting the imposition of a predetermined spacing interval thereon.

9. An automatic telephone system as set forth in claim 8 which includes means for terminating the connection responsive to completion of the calling party number recordation prior to the complete transmission of the routing digits indicated by the called exchange code number.

10. A telephone system as set forth in claim 8 which includes verification means including a second counting chain, means for controlling same to count the calling party number digits as recorded on the recording media, link seizing means connected for seizure by said counting chain with initiation of a call to cause same to seize an idle link, means for transmitting the calling number as received by the recorder to the link to establish a test connection with the calling line, a tone circuit for testing the accuracy of the number dialled, and means controlled by said counting chain to render said tone circuit effective in performing its test following dialling of the units digit of the calling directory number.

11. An automatic telephone system as set forth in claim 8 wherein each sender unit is common to a number of recorder arrangements, and each sender has an individual check line individual thereto.

12. In an automatic telephone system having subscriber lines, switching apparatus including link equipment for setting up connections between said lines, recording means for recording certain items of information pertinent to said connections, means operable to transmit the directory number of the calling party to said recording means for registration, and verification means for seizing an idle one of said local links via an assigned check line and controlling same to extend a test connection to said calling line for verification purposes, said verification means including an oscillator circuit, means for energizing said oscillator circuit responsive to establishment of a call by a calling party, means for transferring control of the oscillator circuit from the original energizing means to the test connection as established to the calling party line, and means controlled responsive to energization of the oscillator circuit over and during the test connection to continue extension of the call and controlled responsive to deenergization thereof during the test connection to terminate extension of the call.

13. An automatic telephone system as set forth in claim 12 which includes means for disabling said verification means responsive to failure of said oscillator circuit and means for enabling said equipment to extend calls through the system during the period of such failure without requiring verification of the calling party number.

14. In an automatic telephone system having subscriber lines, switching apparatus including local link equipment for setting up connections between said lines, recording means for recording certain items of information pertinent to said connections, means operable to transmit the directory number of the calling party to said recording means for registration, and verification means for seizing an idle one of the local links via an assigned check line and controlling same to extend a test connection to said calling line for verification purposes immediately subsequent to the receipt of the units digit of the calling party number, said verification means including a normally deenergized oscillator circuit having an electronic tube unit connected for oscillation with energization of the circuit, a normally energized relay connected in the output circuit of said electronic tube circuit, a second relay connected for operation with seizure of the verification means, means controlled responsive to operation of said second relay to energize said oscillator circuit and interrupt the energizing circuit for said first relay, a third relay connected for operation responsive to energization of said second relay and release of said first relay operative in conjunction with the completion of the test connection to the calling line to make effective a verification path thereover to maintain said oscillator circuit energized and said first relay restored, thus transferring control of the oscillator circuit from the original energizing means as made effective by operation of the second relay to the test connection as established over the calling line, and means controlled by and responsive to operation of said first, second and third relays to extend a call terminating signal to the recorder equipment.

15. An arrangement as set forth in claim 14 in which said normally operated relay in said oscillator output circuit is connected to be restored responsive to the failure of the tube therein, and which includes alarm means, and means controlled by said relay in its restoration to render the alarm means effective.

16. An automatic telephone system having subscriber lines and switching apparatus for setting up connections between said lines over predetermined routes, recording means for recording on record media certain items of information pertinent to said connections, means for transmitting a call extending designator and signals representative of the number of the calling party thereto for recording as dialed, and sender means accessible from said recording means for routing each connection over the switching apparatus indicated by said call extending designator, said sender comprising means for registering the routing desired as indicated by said designator, means for translating said code into the number and value of digits necessary to operate the switching equipment in the extension of the connection over the given route, and pause determining means operative to examine the designator registered after digit transmission to determine if a further digit is to be transmitted, and means controlled thereby to generate a pause period only in the event that a further digit is to be transmitted.

17. In an automatic telephone system having a plurality of exchanges, subscriber lines terminating at said exchanges, switching apparatus for setting up connections between said subscriber lines, recorder means in certain of said exchanges connected for use by its subscribers and predetermined associated exchanges without recorder equipment to extend connections to certain other exchanges, an individual incoming path for each associated exchange connected to said recorder means, means at each associated exchange for seizing the recorder means over its associated path responsive to the transmission of an exchange designator signal indicating an interexchange call by a subscriber thereat, marking means connected to each of said paths operative with seizure of the path, means in said recorder means for recording the directory number of the calling party responsive to the transmission thereof by the calling party, routing means in the recorder exchange for transmitting signals to extend said connection over said switching apparatus to the desired one of said exchanges indicated by the exchange designator signal, and means including said marking means for transmitting signals to the recorder means responsive to answer by the called party to identify the calling exchange for each connection established thereover.

18. In an automatic telephone system having a plurality of exchanges including predetermined paths for connecting the exchanges with one another, each of said exchanges having a predetermined code number, subscriber lines terminating at said exchanges, switching apparatus for setting up connections between said subscriber lines, recorder means for recording certain items of information pertinent to said connections, a selector switch connected to said recorder means having access to said paths, routing means operative to route each interexchange connection over a corresponding one of said paths, signal transmitting means selectively operable by the calling subscriber for simultaneously seizing said recorder means, its associated selector switch and said routing means for operation, and operable thereafter to transmit to said recorder means the desired exchange code number and thereafter the calling party directory number, signal responsive means in said recorder means for transmitting the called exchange code to associated media for recording thereon and simultaneously transmitting the same to said routing means, a register means in said routing means operative to register the exchange code number and translate same into the digits required to effect extension of the call to the desired exchange, verification control means therein for seizing a local link for checking purposes and transmitting the calling party number thereto as received to establish a connection to the line having the directory number dialed by the calling subscriber, means operatively controlled by said signal responsive means responsive to the receipt of a predetermined digit of the calling subscriber number to initiate digit transmission by said routing means to further extend the connection and concurrently therewith operation of said verification means, and means operative to terminate the further extension of the connection responsive to complete recording of the calling party number on said recorder means prior to completion of the extension of the connection to the called exchange.

19. An automatic telephone system as set forth in claim 16 which includes counting chain means operative responsive to receipt of the call extending designator to effect registration of the code on associated register means, and in which said pause determining means is operative to control said counting chain in the generation of a predetermined pause period whenever a pause period is required.

20. An arrangement as set forth in claim 12 which includes paystation equipment connected to certain of said subscriber lines, and paystation denial means connected in each of said paystation lines operative with the extension of a call therefrom to the recording means to prevent extension of the test connection thereover, whereby use of the toll ticketing equipment by the paystation equipment is prevented.

21. An arrangement as set forth in claim 20 in which said paystation denial means comprise a choke coil connected in each paystation line.

References Cited in the file of this patent

UNITED STATES PATENTS

| | | |
|---|---|---|
| 1,943,130 | MacPherson | Jan. 9, 1934 |
| 2,387,897 | Grandstaff | Oct. 30, 1945 |
| 2,486,722 | Stehlik | Nov. 1, 1949 |
| 2,522,000 | Shepherd | Sept. 12, 1950 |
| 2,535,509 | Ostline | Dec. 26, 1950 |
| 2,586,704 | Ostline | Feb. 19, 1952 |
| 2,599,358 | Cahill et al. | June 3, 1952 |
| 2,629,016 | Gooderham | Feb. 17, 1953 |
| 2,782,257 | Blashfield et al. | Feb. 17, 1957 |

UNITED STATES PATENT OFFICE

CERTIFICATE OF CORRECTION

Patent No. 2,905,764 September 22, 1959

William H. Blashfield et al

It is hereby certified that error appears in the printed specification of the above numbered patent requiring correction and that the said Letters Patent should read as corrected below.

Column 65, line 39, for "vertification" read -- verification --; column 66, line 2, after "idle" insert -- and --; line 19, for "repeating" read -- the sender --; line 25, for "routing" read -- designator --; column 67, line 6, for "claim" read -- chain --.

Signed and sealed this 29th day of March 1960.

(SEAL)
Attest:

KARL H. AXLINE
Attesting Officer

ROBERT C. WATSON
Commissioner of Patents